(12) United States Patent
Awamura et al.

(10) Patent No.: US 9,083,920 B2
(45) Date of Patent: Jul. 14, 2015

(54) INFORMATION PROCESSING APPARATUS, INFORMATION PROCESSING SYSTEM, INFORMATION PROCESSING METHOD, AND COMPUTER-READABLE STORAGE MEDIUM THAT ASSIGN PRIORITY INFORMATION INDICATING PRIORITY BETWEEN AREAS IN AN OVERLAPPING AREA

(71) Applicants: Naoya Awamura, Kanagawa (JP); Yuichi Habu, Ibaraki (JP); Hiroaki Suzuki, Chiba (JP)

(72) Inventors: Naoya Awamura, Kanagawa (JP); Yuichi Habu, Ibaraki (JP); Hiroaki Suzuki, Chiba (JP)

(73) Assignee: RICOH COMPANY, LIMITED, Tokyo (JP)

( * ) Notice: Subject to any disclaimer, the term of this patent is extended or adjusted under 35 U.S.C. 154(b) by 8 days.

(21) Appl. No.: 13/853,243

(22) Filed: Mar. 29, 2013

(65) Prior Publication Data

US 2013/0271792 A1 Oct. 17, 2013

(30) Foreign Application Priority Data

Apr. 11, 2012 (JP) .................................. 2012-090604

(51) Int. Cl.
*H04N 1/40* (2006.01)
*H04N 1/60* (2006.01)
*H04N 1/54* (2006.01)

(52) U.S. Cl.
CPC ............... *H04N 1/6027* (2013.01); *H04N 1/54* (2013.01)

(58) Field of Classification Search
None
See application file for complete search history.

(56) References Cited

U.S. PATENT DOCUMENTS

| 8,819,547 B2 * | 8/2014 | Isoda ............................. 715/255 |
| 2009/0201522 A1 | 8/2009 | Iguchi |
| 2011/0110590 A1 | 5/2011 | Suzuki |
| 2011/0194142 A1 * | 8/2011 | Wakana ....................... 358/1.15 |
| 2011/0267654 A1 * | 11/2011 | Matsunaga .................. 358/3.24 |
| 2012/0062956 A1 | 3/2012 | Kitagawa et al. |
| 2012/0063802 A1 | 3/2012 | Suzuki et al. |
| 2012/0237244 A1 * | 9/2012 | Yoshikawa et al. ............. 399/67 |

FOREIGN PATENT DOCUMENTS

| JP | 2009-190179 | 8/2009 |
| JP | 2011-123473 | 6/2011 |

* cited by examiner

*Primary Examiner* — Steven Kau
(74) *Attorney, Agent, or Firm* — Oblon, McClelland, Maier & Neustadt, L.L.P.

(57) ABSTRACT

An information processing apparatus include a priority information assigning unit configured to assign priority information indicating priority between a first area and a second area of a recording medium in an overlapping area of the areas to at least one of gloss-control plane data and clear plane data. The gloss-control plane data is used for specifying the first area to which a surface effect is to be applied and specifying a density value corresponding to a type of the surface effect. The clear plane data is used for specifying the second area in which a transparent image is to be formed and specifying a density value of the transparent image. The apparatus also includes a clear toner plane generating unit configured to generate clear toner plane clear toner plane data based on the gloss-control plane data and the clear plane data.

9 Claims, 34 Drawing Sheets

COLOR PLANE DATA

| SURFACE EFFECT | GLOSSINESS | DEVIATION |
|---|---|---|
| PREMIUM GLOSS [PG] | Gs≥80 | ΔGs≤10 |
| GLOSS [G] | Gs=Gs (SOLID GLOSSY) | ΔGs≤10 |
| MATTE [M] | Gs=Gs (1C 30% HALFTONE) | ΔGs≤10 |
| PREMIUM MATTE [PM] | Gs≤10 | ΔGs≤10 |

GLOSS-CONTROL PLANE DATA

▨ : PG-SPECIFIED AREA (DENSITY VALUE: 98%)

▧ : G-SPECIFIED AREA (DENSITY VALUE: 90%)

☰ : M-SPECIFIED AREA (DENSITY VALUE: 16%)

CLEAR PLANE DATA

FIG.10

| SURFACE EFFECT TYPE | DENSITY VALUE [%] |
|---|---|
| PG | 98% |
| G | 90% |
| M | 16% |
| PM | 6% |

FIG.11

| DRAWING OBJECT | COORDINATE | DENSITY VALUE |
|---|---|---|
| A, B, C | (x1, y1)-(x2, y2) | 98% |
| (RECTANGLE) | (x3, y3)-(x4, y4) | 90% |
| ... | ... | ... |

FIG.15

| DRAWING OBJECT | COORDINATE | DENSITY VALUE | PRIORITY INFORMATION |
|---|---|---|---|
| A, B, C | (x1, y1)-(x2, y2) | 98% | PRIORITY |
| (RECTANGLE) | (x3, y3)-(x4, y4) | 90% | NON-PRIORITY |
| ... | ... | ... | ... |

FIG.22

| DENSITY [%] | DENSITY REPRESENTATIVE VALUE | VALUE RANGE | | SURFACE EFFECT | GLOSSER ON/OFF | FIRST CLEAR TONER PLANE (PRINTER) | SECOND CLEAR TONER PLANE | THIRD CLEAR TONER PLANE |
|---|---|---|---|---|---|---|---|---|
| 98% | 250 | 248 | 255 | PREMIUM GLOSS TYPE A | ON | INVERSE MASK A | NO DATA | NO DATA |
| 96% | 245 | 243 | 247 | PREMIUM GLOSS TYPE B | ON | INVERSE MASK B | NO DATA | NO DATA |
| 94% | 240 | 238 | 242 | PREMIUM GLOSS TYPE C | ON | INVERSE MASK C | NO DATA | NO DATA |
| 92% | 235 | 233 | 237 | RESERVED | | | | |
| 90% | 230 | 228 | 232 | GLOSS TYPE 1 | OFF | INVERSE MASK 1 | NO DATA | NO DATA |
| 88% | 224 | 222 | 227 | GLOSS TYPE 2 | OFF | INVERSE MASK 2 | NO DATA | NO DATA |
| 86% | 219 | 217 | 221 | GLOSS TYPE 3 | OFF | INVERSE MASK 3 | NO DATA | NO DATA |
| 84% | 214 | 212 | 216 | GLOSS TYPE 4 | OFF | INVERSE MASK 4 | NO DATA | NO DATA |
| 82% | 209 | 207 | 211 | RESERVED | | | | |
| ... | ... | ... | ... | ... | ... | ... | ... | ... |
| 46% | 117 | 115 | 119 | RESERVED | | | | |
| 44% | 112 | 110 | 114 | WATERMARK 3 (XXX) | OFF | NO DATA | TILED TEXT 3 | NO DATA |
| 42% | 107 | 105 | 109 | WATERMARK 2 (NO COPY) | | NO DATA | TILED TEXT 2 | NO DATA |
| 40% | 102 | 100 | 104 | WATERMARK 1 (SAMPLE) | | NO DATA | TILED TEXT 1 | NO DATA |
| 38% | 97 | 95 | 99 | RESERVED | | | | |
| 36% | 92 | 90 | 94 | RESERVED | | | | |
| 34% | 87 | 85 | 89 | BACKGROUND PATTERN 3 (XXX) | | NO DATA | TILED BACKGROUND PATTERN 3 | NO DATA |
| 32% | 82 | 80 | 84 | BACKGROUND PATTERN 3 (MATRIX) | | NO DATA | TILED BACKGROUND PATTERN 2 | NO DATA |
| 30% | 76 | 74 | 79 | BACKGROUND PATTERN 3 (WAVE) | | NO DATA | TILED BACKGROUND PATTERN 1 | NO DATA |
| 28% | 71 | 69 | 73 | RESERVED | | | | |
| 26% | 66 | 64 | 68 | RESERVED | | | | |
| 24% | 61 | 59 | 63 | TEXTURE PATTERN 3 (ROUGH) | | NO DATA | TILED MESH PATTERN 3 | NO DATA |
| 22% | 56 | 54 | 58 | TEXTURE PATTERN 2 (MODERATE) | | NO DATA | TILED MESH PATTERN 2 | NO DATA |
| 20% | 51 | 49 | 53 | TEXTURE PATTERN 1 (DENSE) | | NO DATA | TILED MESH PATTERN 1 | NO DATA |
| 18% | 46 | 44 | 48 | RESERVED | | | | |
| 16% | 41 | 39 | 43 | MATTE TYPE 4 | OFF | NO DATA | HALFTONE 4 | NO DATA |
| 14% | 36 | 34 | 38 | MATTE TYPE 3 | OFF | NO DATA | HALFTONE 3 | NO DATA |
| 12% | 31 | 29 | 33 | MATTE TYPE 2 | OFF | NO DATA | HALFTONE 2 | NO DATA |
| 10% | 25 | 23 | 28 | MATTE TYPE 1 | OFF | NO DATA | HALFTONE 1 | NO DATA |
| 8% | 20 | 18 | 22 | RESERVED | | | | |
| 6% | 15 | 13 | 17 | PREMIUM MATTE TYPE C | ON & OFF | NO DATA | NO DATA | SOLID C |
| 4% | 10 | 8 | 12 | PREMIUM MATTE TYPE B | ON & OFF | NO DATA | NO DATA | SOLID B |
| 2% | 5 | 1 | 7 | PREMIUM MATTE TYPE A | ON & OFF | NO DATA | NO DATA | SOLID A |
| 0% | 0 | 0 | 0 | NOTHING | OFF | NO DATA | NO DATA | NO DATA |

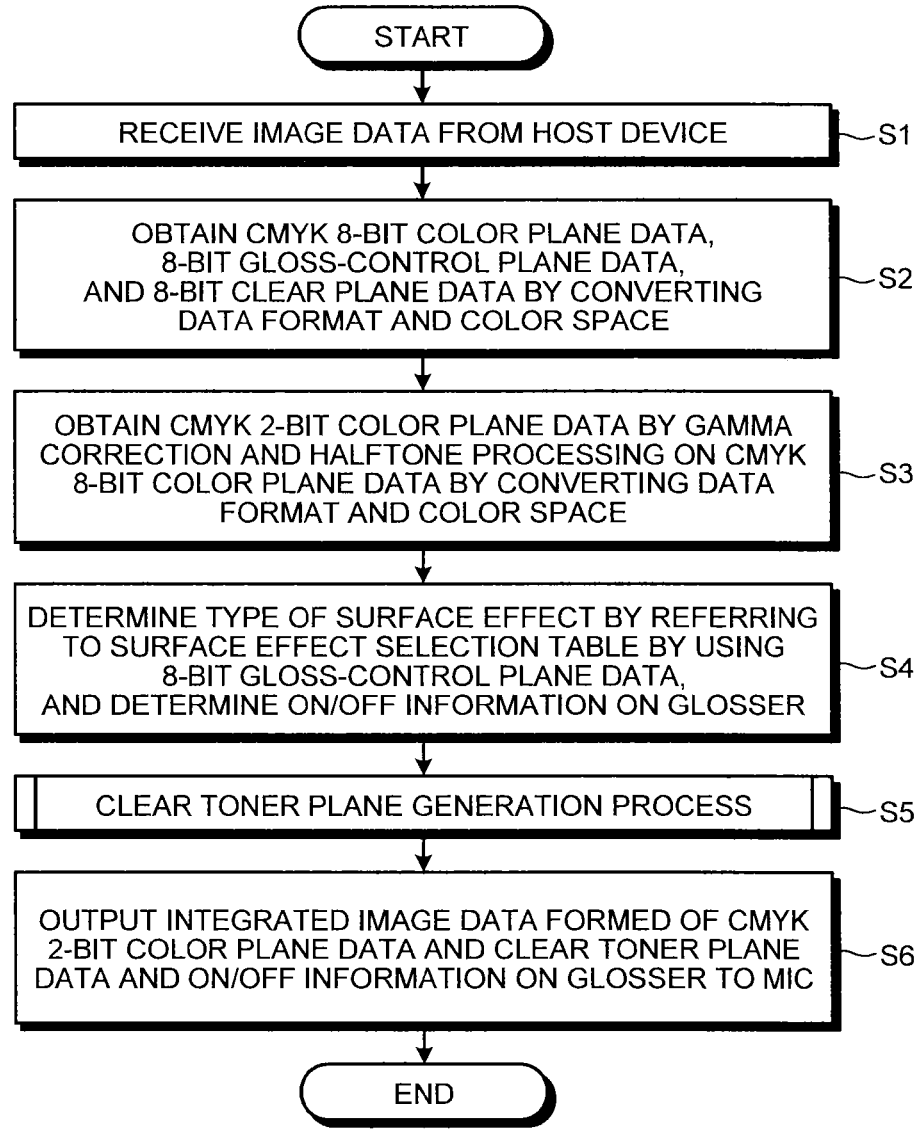

INFORMATION PROCESSING APPARATUS, INFORMATION PROCESSING SYSTEM, INFORMATION PROCESSING METHOD, AND COMPUTER-READABLE STORAGE MEDIUM THAT ASSIGN PRIORITY INFORMATION INDICATING PRIORITY BETWEEN AREAS IN AN OVERLAPPING AREA

CROSS-REFERENCE TO RELATED APPLICATION

The present application claims priority to and incorporates by reference the entire contents of Japanese Patent Application No. 2012-090604 filed in Japan on Apr. 11, 2012.

BACKGROUND OF THE INVENTION

1. Field of the Invention

The present invention relates to an information processing apparatus, an information processing system, an information processing method, and a computer-readable storage medium.

2. Description of the Related Art

Conventionally, there is an image forming apparatus provided with a clear toner that is a colorless toner without a color material, in addition to toners of four colors of C (cyan), M (magenta), Y (yellow), and K (black). A toner image formed with the clear toner is fixed onto a recording medium, such as a sheet of paper, on which an image is already formed with the CMYK toners, so that a visual effect or a tactual effect (hereinafter, referred to as "a surface effect") can be realized on the recording medium.

The surface effect to be realized varies depending on how the clear toner is attached to the recording medium. Some surface effects simply apply glossy and other surface effects reduce glossy. In addition, there are different needs, such as a need to apply the surface effect to the whole surface, a need to apply the surface effect to a part of the surface, and a need to apply a texture or a watermark with the clear toner. There is also a need for surface protection.

Conventionally, there is a technology for obtaining glossy by using a clear toner in an area where glossy cannot be obtained due to unevenness of the adhesion amount of toners. For example, Japanese Patent Application Laid-open No. 2011-123473 discloses a technology for forming a different transparent toner pattern for each of the glossy surface, semi-glossy surface, and non-glossy surface to realize glossy tones.

When a transparent image, such as a character, is formed by using a clear toner, an area where the transparent image is formed and an area where the surface effect, such as glossy, is realized may overlap each other. However, in the conventional technology, an overlapping area with the clear toner has not been coped with.

Therefore, there is a need for an information processing apparatus, an information processing system, an information processing method, and a computer-readable storage medium capable of easily forming a print image as desired by a user even when an area to which a clear toner is applied overlaps other area of the print image.

SUMMARY OF THE INVENTION

It is an object of the present invention to at least partially solve the problems in the conventional technology.

According to an embodiment, there is provided an information processing apparatus connected to a printing apparatus in which color toner and transparent clear toner are loaded. The printing apparatus forms an image on a recording medium based on color plane data for attaching the color toner to the recording medium and clear toner plane data for attaching the clear toner to the recording medium. The information processing apparatus includes a priority information assigning unit configured to assign priority information indicating priority between a first area of a recording medium and a second area of the recording medium in an overlapping area of the first area and the second area to at least one of gloss-control plane data and clear plane data, the gloss-control plane data being used for specifying the first area to which a surface effect is to be applied and specifying a density value corresponding to a type of the surface effect, the clear plane data being used for specifying the second area in which a transparent image is to be formed and specifying a density value of the transparent image; and a clear toner plane generating unit configured to generate clear toner plane data based on the gloss-control plane data and the clear plane data so that data corresponding to the overlapping area is generated by using a density value of the first area or the second area to which priority is given by the priority information and data corresponding to an area other than the overlapping area is generated by using a density value of the first area or the second area in which the density value is specified.

According to another embodiment, there is provided an information processing system that includes a printing apparatus in which color toner and transparent clear toner are loaded, the printing apparatus forming an image on a recording medium based on color plane data for attaching the color toner to the recording medium and clear toner plane data for attaching the clear toner to the recording medium; and an information processing apparatus connected to the printing apparatus. The information processing apparatus includes a priority information assigning unit configured to assign priority information indicating priority between a first area of a recording medium and a second area of the recording medium in an overlapping area of the first area and the second area to at least one of gloss-control plane data and clear plane data, the gloss-control plane data being used for specifying the first area to which a surface effect is to be applied and specifying a density value corresponding to a type of the surface effect, the clear plane data being used for specifying the second area in which a transparent image is to be formed and specifying a density value of the transparent image; and a clear toner plane generating unit configured to generate clear toner plane data based on the gloss-control plane data and the clear plane data so that data corresponding to the overlapping area is generated by using a density value of the first area or the second area to which priority is given by the priority information and data corresponding to an area other than the overlapping area is generated by using a density value of the first area or the second area in which the density value is specified.

According to still another embodiment, there is provided an information processing method implemented by an information processing apparatus connected to a printing apparatus in which color toner and transparent clear toner are loaded, the printing apparatus forming an image on a recording medium based on color plane data for attaching the color toner to the recording medium and clear toner plane data for attaching the clear toner to the recording medium. The information processing method includes assigning priority information indicating priority between a first area of a recording medium and a second area of the recording medium in an overlapping area of the first area and the second area to at least one of gloss-control plane data and clear plane data, the gloss-control plane data being used for specifying the first area to which a surface effect is to be applied and specifying a density value corresponding to a type of the surface effect, the clear plane data being used for specifying the second area in which a transparent image is to be formed and specifying a density value of the transparent image; and generating clear toner plane data based on the gloss-control plane data and the clear plane data so that data corresponding to the overlapping area is generated by using a density value of the first area or the second area to which priority is given by the priority information and data corresponding to an area other than the overlapping area is generated by using a density value of the first area or the second area in which the density value is specified.

According to still another embodiment, there is provided a non-transitory computer-readable storage medium with an executable program stored thereon and executed by a computer connected to a printing apparatus in which color toner and transparent clear toner are loaded, the printing apparatus forming an image on a recording medium based on color plane data for attaching the color toner to the recording medium and clear toner plane data for attaching the clear toner to the recording medium. The program instructs the computer to perform assigning priority information indicating priority between a first area of a recording medium and a second area of the recording medium in an overlapping area of the first area and the second area to at least one of gloss-control plane data and clear plane data, the gloss-control plane data being used for specifying the first area to which a surface effect is to be applied and specifying a density value corresponding to a type of the surface effect, the clear plane data being used for specifying the second area in which a transparent image is to be formed and specifying a density value of the transparent image; and generating clear toner plane data based on the gloss-control plane data and the clear plane data so that data corresponding to the overlapping area is generated by using a density value of the first area or the second area to which priority is given by the priority information and data corresponding to an area other than the overlapping area is generated by using a density value of the first area or the second area in which the density value is specified.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a view illustrating an example of a density value selection table;

FIG. 11 is a view illustrating a correspondence relation between an object, a coordinate, and a density value;

FIG. 15 is a schematic view illustrating an example of the data structure of gloss-control plane data with priority information;

FIG. 22 is a view illustrating an example of the data structure of a surface effect selection table;

FIG. 24 is a flowchart illustrating the flow of a process performed by the DFE;

FIG. 25 is a view illustrating an example of each pixel data of gloss-control plane data with the priority information;

DETAILED DESCRIPTION OF THE PREFERRED EMBODIMENTS

Exemplary embodiments of the present invention will be explained in detail below with reference to the accompanying drawings.

First Embodiment

Figure 1:
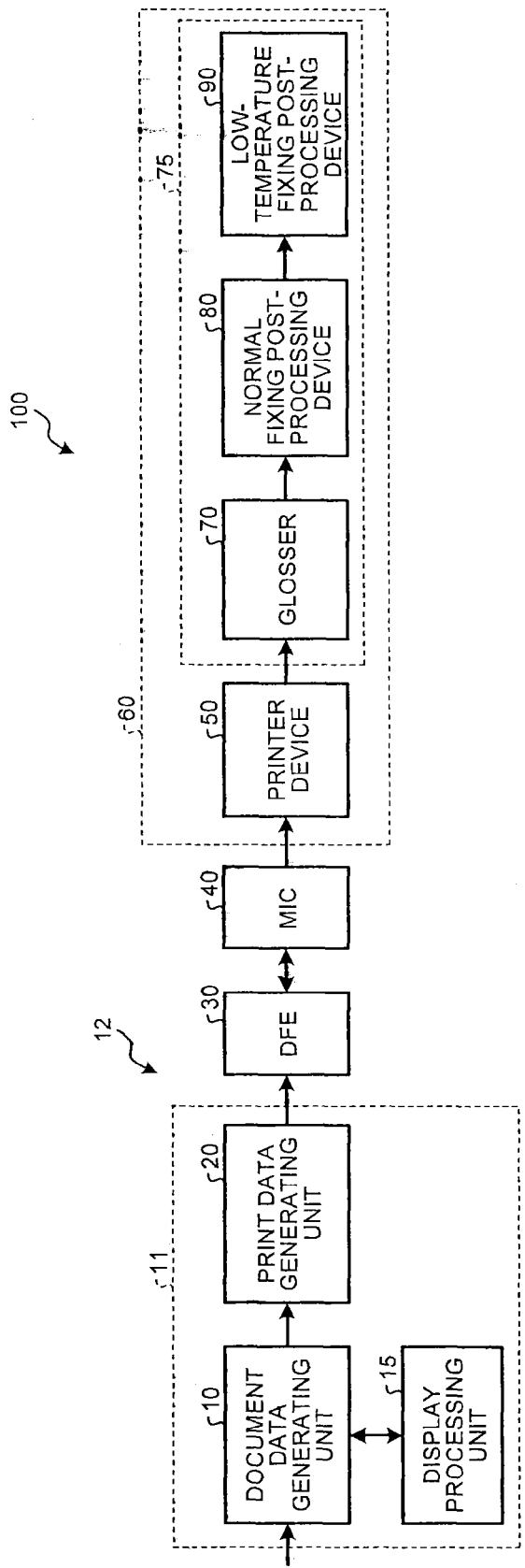
FIG. 1 is a block diagram schematically illustrating a configuration example of an information processing system of a first embodiment.

FIG. 1 is a block diagram schematically illustrating a configuration example of an information processing system 100 according to a first embodiment. As illustrated in FIG. 1, the information processing system 100 includes an information processing apparatus 12 and a printing apparatus 60.

The information processing apparatus 12 includes a host device 11, a printer controller (DFE: digital front end) 30 (hereinafter, referred to as the DFE 30), and an interface controller (MIC: mechanism I/F controller) 40 (hereinafter, referred to as the MIC 40). The printing apparatus 60 includes a printer device 50 and a post-processor 75.

The host device 11, the DFE 30, the MIC 40, and the printing apparatus 60 are connected to one another via a wired or wireless communication line such that they can transmit and receive data to and from one another.

The host device 11 is configured as, for example, a PC (personal computer) or the like, and includes functional units such as a document data generating unit 10, a print data generating unit 20, and a display processing unit 15. In the embodiment, it is explained the host device 11 includes the functional units such as the document data generating unit 10, the print data generating unit 20, and the display processing unit 15. However, the functional units such as the document data generating unit 10, the print data generating unit 20, and the display processing unit 15 do not necessarily have to be integrally provided in a single device, but may be configured as separate parts (for example, they may be installed in separate personal computers).

The host device 11 may be connected to a communication line, such as the Internet, and may be connected to the DFE 30 such that they can transmit and receive data to and from each other via the communication line.

The DFE 30 communicates with the printer device 50 via the MIC 40 and controls image formation in the printer device 50. The DFE 30 is connected to the host device 11, such as a PC. The DFE 30 receives image data from the host device 11 and generates, based on the received image data, image data to be used when the printer device 50 forms toner images of CMYK toners and a clear toner. The DFE 30 transmits the generated image data to the printer device 50 via the MIC 40.

At least the CMYK toners and the clear toner are loaded in the printer device 50. The printer device 50 includes an image forming unit including a photoreceptor, a charger, a developing unit, and a photoreceptor cleaner, an exposing unit, and a fixing unit for each of the toners.

The clear toner is a transparent (colorless) toner containing no color material. The transparent (colorless) indicates that the transmittance is 70% or more, for example.

The printer device 50 radiates a light beam from the exposing unit to the image data transmitted from the DFE 30 via the MIC 40 to thereby form toner images of the respective toners on the photoreceptors, transfers the toner images onto a paper as a recording medium, and fixes the toner images to the recording medium by applying heat and pressure within a predetermined range of temperature (ordinary temperature) by the fixing unit. Therefore, an image is formed on the recording medium. Examples of the recording medium include a synthetic paper, a recycled paper, an OHP sheet, and a vinyl sheet.

In the example in FIG. 1, the post-processor 75 includes a glosser 70 connected to the printer device 50, a normal fixing post-processing device 80 connected to the glosser 70, and a low-temperature fixing post-processing device 90 connected to the normal fixing post-processing device 80.

The glosser 70 is turned on or off based on on/off information designated by the DFE 30. When turned on, the glosser 70 presses the image formed on the recording medium by the printer device 50 at high temperature and high pressure, and thereafter separates the recording medium on which the image is formed from the main body of the glosser 70 by cooling the recording medium. Therefore, a total adhesion amount of the toners at each of pixels to which at least a predetermined amount of toners has been attached is uniformly compressed in the entire image formed on the recording medium.

The normal fixing post-processing device 80 includes an image forming unit including a photoreceptor, a charger, a developing unit, and a photoreceptor cleaner for a clear toner, and also includes an exposing unit and a fixing unit for fixing the clear toner. The normal fixing post-processing device 80 receives clear toner plane data (to be described later) that the DFE 30 has generated to use the normal fixing post-processing device 80. When the DFE 30 generates the clear toner plane data to be used by the normal fixing post-processing device 80, the normal fixing post-processing device 80 generates a clear toner image based on the clear toner plane data, overlaps the clear toner image onto the recording medium pressed by the glosser 70, and fixes the clear toner image to the recording medium by applying ordinary heat or pressure by the fixing unit.

The low-temperature fixing post-processing device 90 includes an image forming unit including a photoreceptor, a charger, a developing unit, and a photoreceptor cleaner for a clear toner, and also includes an exposing unit and a fixing unit for fixing the clear toner. The low-temperature fixing post-processing device 90 receives clear toner plane data (to be described later) that the DFE 30 has generated to use the low-temperature fixing post-processing device 90. When the DFE 30 generates the clear toner plane data to be used by the low-temperature fixing post-processing device 90, the low-temperature fixing post-processing device 90 generates a clear toner image based on the clear toner plane data, overlaps the clear toner image onto the recording medium, and fixes the clear toner image to the recording medium by applying heat or pressure lower than the ordinary heat or pressure by the fixing unit.

Figure 2:
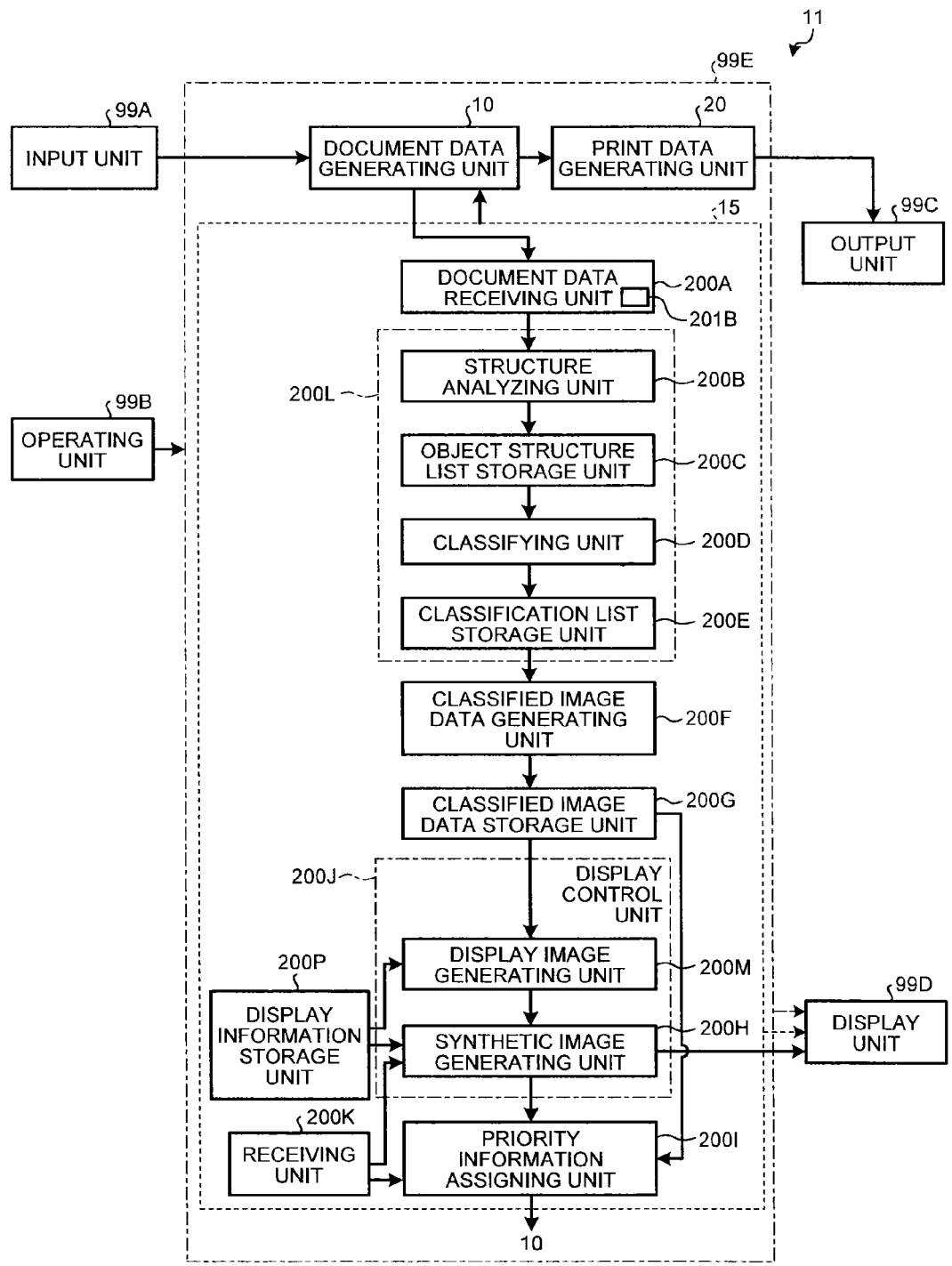
FIG. 2 is a view illustrating a concrete example of a configuration of a host device.

FIG. 2 illustrates a concrete example of a configuration of the host device 11.

As illustrated in FIG. 2, the host device 11 includes an input unit 99A, an operating unit 99B, an output unit 99C, a display unit 99D, and a control unit 99E.

The input unit 99A receives color plane data from an external apparatus, such as a PC, and sends the received color plane data to the control unit 99E. The color plane data may be generated by the control unit 99E. The color plane data is data for attaching a color toner to the recording medium. For example, the color plane data is image data in which a color image to be printed with a color toner is indicated for each drawing area. The color plane data will be explained in detail later.

In the first embodiment, the recording medium is a target medium on which an image is formed by attaching a color toner or a clear toner. Examples of the recording medium include, but not limited to, a paper, a synthetic paper, and a vinyl sheet.

The color toner is a toner containing CMYK color materials. In the first embodiment, a case is explained that a color toner containing the CMYK color materials is used as the color toner by way of example.

The clear toner is a transparent (colorless) toner containing no color material. The transparent (colorless) indicates that the transmittance is 70% or more, for example.

The operating unit 99B is an input device operated by a user for issuing an instruction on various operations. The operating unit 99B may be, for example, a button, a remote receiver, or a card reader that reads information from an IC card or the like. The operating unit 99B may include a keyboard.

The output unit 99C is an interface device for making a communication with the DFE 30. The display unit 99D is a display device for displaying various types of information, and is formed of a known display device.

The control unit 99E is a unit for controlling the entire host device 11, and is a computer including a CPU (Central Processing Unit), a ROM (Read Only Memory), a RAM (Random Access Memory), and the like.

In the first embodiment, as illustrated in FIG. 2, the host device 11 includes, as the functional units of the control unit 99E, the document data generating unit 10, the print data generating unit 20, and the display processing unit 15. The functional units and other functional units included in each of the functional units are realized by causing the CPU of the control unit 99E to load various programs stored in the ROM or the like onto the RAM and to execute the programs. At least a part of the functions may be realized by an individual circuit (hardware).

The document data generating unit 10 receives color plane data. The document data generating unit 10 generates document data containing the color plane data, gloss-control plane data, and clear plane data, and outputs the document data to the print data generating unit 20 and the display processing unit 15. The color plane data may be generated by the document data generating unit 10.

The document data generated by the document data generating unit 10 will be explained in detail below.

The document data generating unit 10 generates the document data by a pre-installed image processing application (an image processing unit 120 and a plane data generating unit 122 to be described later). The image processing application can handle special color plane image data with respect to image data in which a value of the density (density value) of a color of a color plane such as an RGB plane or a CMYK plane is determined for each pixel. The special color plane is image data for attaching a special toner or ink, such as white, gold, or silver, in addition to basic colors such as CMYK or RGB, and is used by a printer in which the special toners or inks are loaded. The special color plane may contain R in addition to the basic colors of CMYK or may contain Y in addition to the basic colors of RGB in order to improve color reproducibility. In general, the clear toner is handled as one of the special colors.

In the first embodiment, a clear toner as the special color is used to form a surface effect that is a visual effect or a tactual effect to be applied to a recording medium, and to form a transparent image, such as a watermark, other than the surface effect as described above on the recording medium.

Therefore, the image processing application of the document data generating unit 10 generates gloss-control plane data and/or clear plane data as the special color plane image data with respect to the input image data, in addition to the color plane data, in response to a designation by a user.

The document data generating unit 10 generates the color plane data, the clear plane data, and the gloss-control plane data in, for example, a PDF (Portable Document Format) form on page-by-page basis. The image processing application of the document data generating unit 10 generates document data containing the clear plane data, the gloss-control plane data, and the color plane data.

The data formats of the clear plane data, the gloss-control plane data, and the color plane data generated by the document data generating unit 10 are not limited to the PDF, and an arbitrary format may be used. In each of the clear plane data, the gloss-control plane data, and the color plane data, a drawing area (hereinafter, may be described as an object) specified by each data is represented in, for example, a vector format.

Specifically, the document data generating unit 10 generates the color plane data that is image data in which density values of colors, such as RGB or CMYK, are defined for each object.

Figures 3, 4:
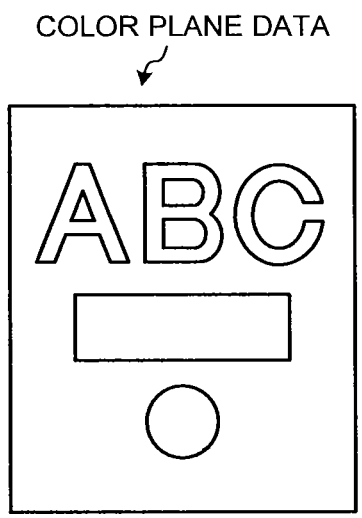
FIG. 3 is an explanatory view illustrating an example of color plane data.
FIG. 4 is a view illustrating an example of types of a surface effect.

FIG. 3 is an explanatory view illustrating an example of the color plane data. In FIG. 3, a density value corresponding to a color designated by a user via the image processing application is applied to each of objects (drawing areas), such as "A", "B", and "C" in the color plane data. The density value of each of the drawing areas is represented from 0% to 100% for example (or may be represented by "0" to "255" for example).

The document data generating unit 10 also generates the gloss-control plane data that is image data specifying a first area to which a surface effect is applied and specifying the type of the surface effect applied to the first area, in order to attach a clear toner based on the surface effect to be applied to the recording medium.

The surface effect is a visual effect or a tactual effect to be applied to the recording medium. A glossy area is realized by applying a transparent developer to the recording medium.

The types of the surface effects are roughly classified into a surface effect relating to presence or absence of gloss, a surface protection, and a watermark in which information is buried. Specifically, the types of the surface effects are roughly classified into four. FIG. 4 is a view illustrating an example of the types of the surface effects. In the example illustrated in FIG. 4, the types of the surface effects include mirror-surface glossy (PG: Premium Gloss), solid glossy (G: Gloss), halftone matte (M: Matte), and delustered (PM: Premium Matte), in descending order of degree of gloss (glossiness). Hereinafter, the mirror-surface glossy may be denoted by "PG", the solid glossy by "G", the halftone matte by "M", the delustered by "PM".

The mirror-surface glossy and the solid glossy apply a high degree of gloss. On the other hand, the halftone matte and the delustered are used to suppress gloss. In particular, the delustered realizes the glossiness lower than the glossiness of a normal recording medium. In FIG. 4, the mirror-surface glossy has a glossiness (Gs) of 80 or higher, and the solid glossy has a glossiness (Gs) in a primary color or a secondary color. The halftone matte has a glossiness (Gs) of 30% halftone dots in a primary color, and the delustered has a glossiness (Gs) of 10% or lower.

The deviation in the glossiness is represented by ΔGs and is set to 10 or smaller with respect to the glossiness of all of the four types of the surface effects. In the first embodiment, a higher density value is associated with a surface effect that applies a higher degree of gloss among all of the types of the surface effects. Furthermore, a lower density value is associated with a surface effect that further suppresses gloss.

Therefore, the type of the surface effect is specified by the density value. A correspondence relation between the density values and the types of the surface effects will be explained later. The document data generating unit 10 sets a type of a surface effect that is designated for an object by a user via the image processing application, as a density value corresponding to the type of the surface effect, and generates the gloss-control plane data in the vector format.

The density value is represented by a value in a range from "0" to "255", and a type of a surface effect is associated with the density value. The density value may be represented by a 16-bit value, a 32-bit value, or a value from 0% to 100%. The same density value is set for a range to which the same surface effect is applied. Therefore, even when data indicating a position and a range of the first area to which a surface effect is applied on the recording medium is not provided, it is possible to specify the position and the range of the first area designated by the gloss-control plane data according to the density value designated by the gloss-control plane data if needed. Namely, the type of the surface effect and the first area to which the surface effect is applied can be specified by the gloss-control plane data. The gloss-control plane data may be provided with data indicating the position and the range of the first area to which the surface effect is applied.

Figure 5:
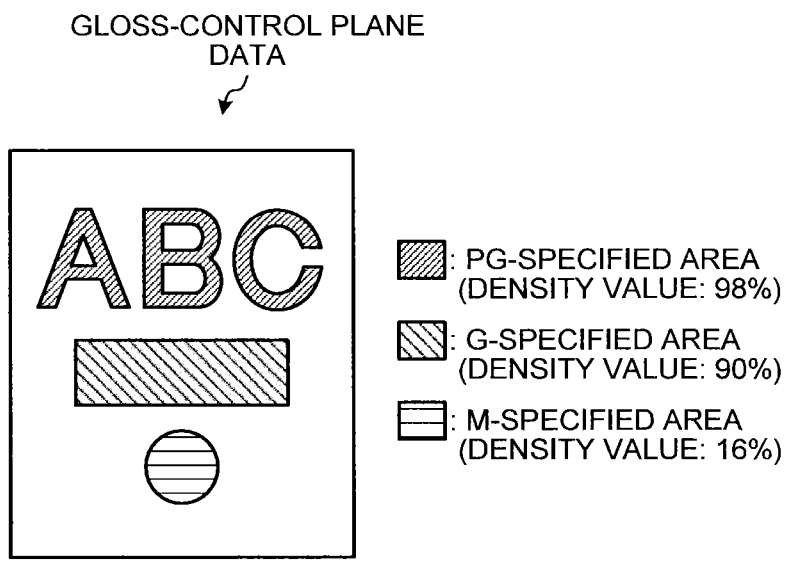
FIG. 5 is an explanatory view illustrating an example of gloss-control plane data.

FIG. 5 is an explanatory view illustrating an example of the gloss-control plane data. In FIG. 5, an example is illustrated in which a user applies the surface effect "PG (mirror-surface glossy)" to an object "ABC", applies the surface effect "G (solid glossy)" to an object "rectangular figure", and applies the surface effect "M (halftone matte)" to an object "circular figure" in the gloss-control plane data. The density values set for the respective surface effects are determined according to the types of the surface effects in a density value selection table (see FIG. 10) to be described later.

The document data generating unit 10 generates the clear plane data that is image data in which a second area as a drawing area of a transparent image and a density value of the second area are specified, in order to attach a clear toner based on the transparent image to be formed on the recording medium. The density value of the second area is set according to the amount of a clear toner to be attached to the second area.

Figure 6:
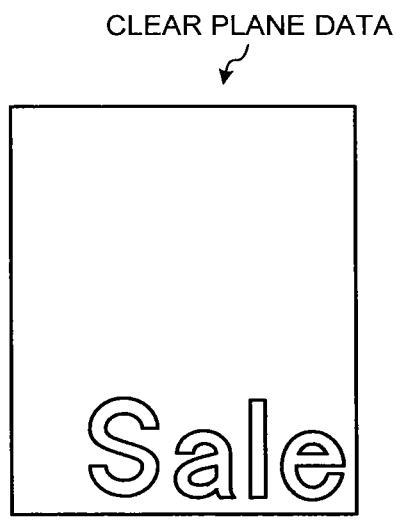
FIG. 6 is a schematic view illustrating an example of clear plane data.

FIG. 6 is a schematic view illustrating an example of the clear plane data. In the example in FIG. 6, a watermark "Sale" is specified as a transparent image in the clear plane data.

As described above, the gloss-control plane data and the clear plane data that are the special color plane image data are generated as planes separate from the color plane data by the image processing application of the document data generating unit 10.

Figure 7:
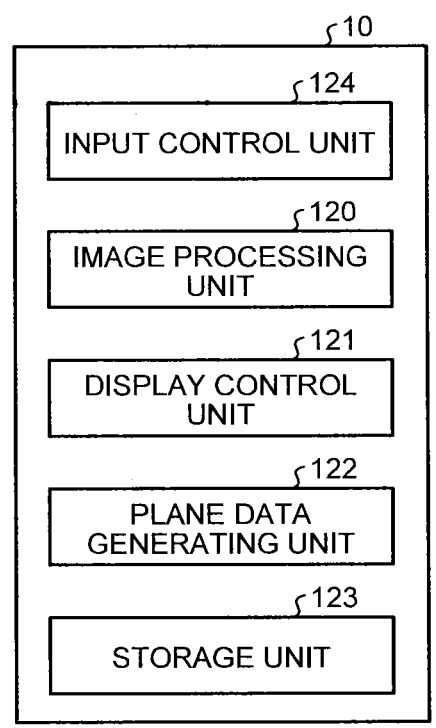
FIG. 7 is a block diagram illustrating a functional configuration of a document data generating unit.

The document data generating unit 10 that generates the document data containing the color plane data, the clear plane data, and the gloss-control plane data will be explained in detail below. FIG. 7 is a block diagram illustrating a functional configuration of the document data generating unit 10.

As illustrated in FIG. 7, the document data generating unit 10 includes an input control unit 124, the image processing unit 120, a display control unit 121, the plane data generating unit 122, and a storage unit 123. Of these units, the input control unit 124 and the display control unit 121 are realized by causing the CPU of the document data generating unit 10 to read and load an operating system program stored in the ROM or the like onto the RAM and execute the program.

The plane data generating unit 122 is provided as a plug-in function installed in the image processing application for example. At least a part of the units may be realized by an individual circuit (hardware).

The storage unit 123 is a storage medium, such as a hard disk drive (HDD) or a memory, for storing various types of data.

The input control unit 124 controls input by receiving various types of input from the operating unit 99B (see FIG. 2). For example, a user inputs image designation information via the input unit 99A by operating the operating unit 99B. The image designation information is information for specifying color plane data to be a target for which a surface effect or a transparent image is formed (hereinafter, may be described as a "target image"), among pieces of the color plane data received from an external apparatus. The user may input, in advance, the image designation information for specifying color plane data to be a target for which a surface effect or a transparent image is formed among one or a plurality of types of color plane data stored in the storage unit 123. The input control unit 124 controls input of the image designation information. The method to input the image designation information is not limited to the above example, and an arbitrary method may be used.

The image processing unit 120 performs various types of image processing on the color plane data specified as a target for which a surface effect or a transparent image is formed, on the basis of an instruction received from the user via the operating unit 99B.

The display control unit 121 controls display of various types of information on the display unit 99D. In the first embodiment, when the input control unit 124 receives the image designation information, the display control unit 121 reads color plane data specified by the image designation information from the storage unit 123, and causes the display unit 99D to display an image of the read color plane data on a screen.

The user can input designation information for specifying a first area to which a surface effect is applied, a type of the surface effect, a second area in which a transparent image is formed, the density of the second area, and the like by operating the operating unit 99B while checking the image of the color plane data displayed on the display unit 99D. The method to input the designation information is not limited to the above example, and an arbitrary method may be used.

Figure 8:
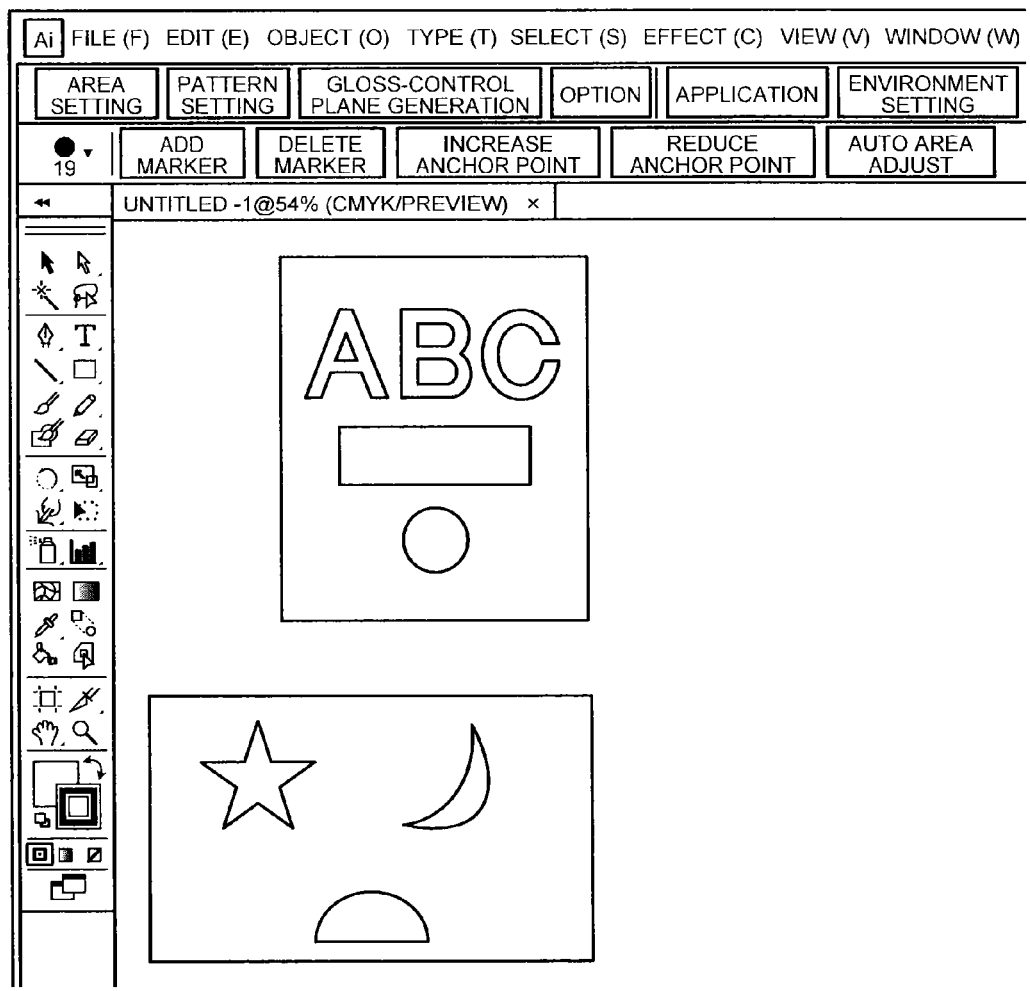
FIG. 8 is a view illustrating an example of a display screen.

More specifically, the display control unit 121 displays a screen as illustrated by example in FIG. 8 on the display unit 99D. FIG. 8 illustrates an example of a screen to be displayed when a plug-in is incorporated into Illustrator® marketed by Adobe System Inc. In the screen illustrated in FIG. 8, an image of the color plane data to be processed is displayed. The user presses a marker add button or the like via the operating unit 99B to perform an input operation for specifying a first area to which the surface effect is applied or a second area in which a transparent image is formed. Accordingly, the first area to which the surface effect is applied or the second area in which the transparent image is formed can be specified. The user performs the input operation on all of the first areas to which the surface effects are applied. The user also performs the input operation on all of the second areas that are formation areas in which transparent images as objects are formed.

Figure 9:
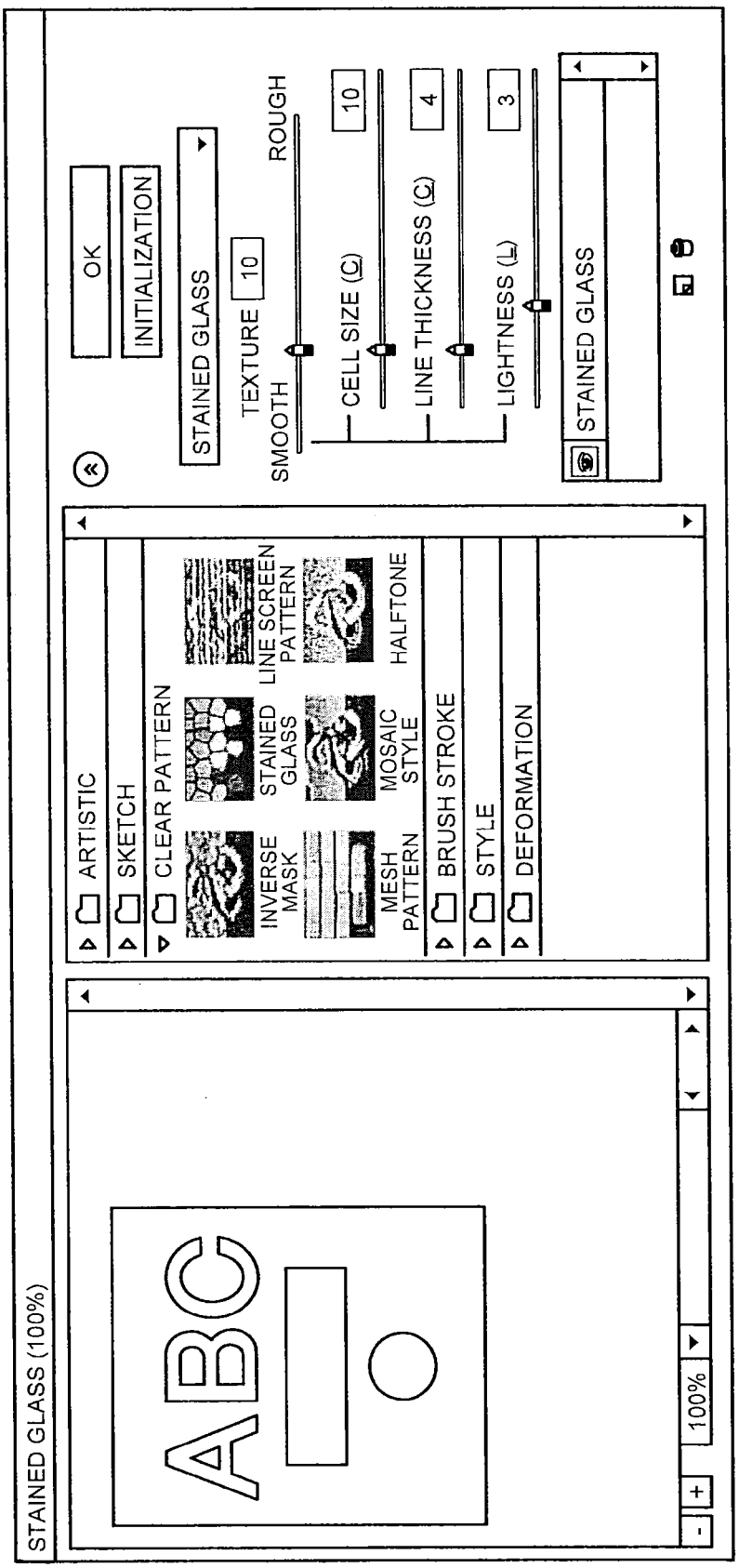
FIG. 9 is a view illustrating an example of a display screen.

The display control unit 121 displays, for example, a screen as illustrated by example in FIG. 9 on the display unit 99D for each of the specified first areas. In the screen illustrated in FIG. 9, images of the first areas are displayed in the respective first areas specified as the areas to which the surface effects are applied. If the user performs an input operation for specifying the type of a surface effect to be applied to a displayed image by issuing an operation instruction via the operating unit 99B, the type of the surface effect to be applied to the area is specified.

As the types of the surface effects, the mirror-surface glossy and the solid glossy in FIG. 4 are represented as "inverse mask" in FIG. 9, and the other effects except for the mirror-surface glossy and the solid glossy illustrated in FIG. 4 are represented as stained glass, a line screen pattern, a halftone pattern, a mosaic style, and halftone in FIG. 9. Namely, it is illustrated in FIG. 9 that various surface effects can be specified.

Referring back to FIG. 7, the plane data generating unit 122 generates the color plane data, the gloss-control plane data, and the clear plane data. Specifically, when the input control unit 124 receives designation of a color of an object of a target image from the user, the plane data generating unit 122 generates color plane data according to the designated color.

Furthermore, when the input control unit 124 receives the designation information on a transparent image (the second area to which the transparent image is applied and a density value of the transparent image (the adhesion amount of a clear toner)), the plane data generating unit 122 generates clear plane data for specifying the transparent image, the second area to which the transparent image is applied, and the adhesion amount (the density value) of the clear toner based on the designation information.

Furthermore, when the input control unit 124 receives the designation information on the surface effect (the first area to which a surface effect is applied and the type of the surface effect), the plane data generating unit 122 generates gloss-control plane data for specifying the first area to which the surface effect is applied on the recording medium and the type of the surface effect based on the designation information.

Specifically, the plane data generating unit 122 generates the gloss-control plane data, in which an area to which the surface effect of the type corresponding to the density value is to be applied is specified for each object of the color plane data.

The storage unit 123 stores therein the density value selection table containing the types of the surface effects and the density values corresponding to the respective types of the surface effects. FIG. 10 is a view illustrating an example of the density value selection table. In the example in FIG. 10, a density value of the surface effect "PG" (mirror-surface glossy) is 98%, a density value of the surface effect "G" (solid glossy) is 90%, a density value of the surface effect "M" (halftone matte) is 16%, and a density value of the surface effect "PM" (delustered) is 6%. The types of the surface effect may further be divided. The density values associated with the respective types of the surface effects are described by way of example and not limited to those illustrated in FIG. 10.

The density value selection table is the same data as a surface effect selection table (to be described later) stored in the DFE 30. The document data generating unit 10 acquires the surface effect selection table at a predetermined timing, generates the density value selection table based on the acquired surface effect selection table, and stores the density value selection table in the storage unit 123. The document data generating unit 10 may store the surface effect selection table acquired from the DFE 30 as it is, as the density value selection table, in the storage unit 123.

The surface effect selection table may be stored in a storage server (cloud system) on a network, such as the Internet. In this case, the document data generating unit 10 may acquire the surface effect selection table from the server and generate the density value selection table based on the acquired surface effect selection table. However, the surface effect selection table stored in the DFE 30 and the surface effect selection table stored in the storage unit 123 need to be the same data.

Referring back to FIG. 7, the plane data generating unit 122 sets the density value of an object for which a predetermined surface effect has been designated by the user to a value corresponding to the designated surface effect by referring to the density value selection table illustrated in FIG. 10, to thereby generate the gloss-control plane data.

For example, it is assumed that a user designates "PG" for an area displaying "ABC", designates "G" for a rectangular area, and designates "M" for a circular area in the color plane data illustrated in FIG. 3. In this case, the plane data generating unit 122 sets the density value of the object ("ABC") for which "PG" is designated by the user to 98%, sets the density value of the object ("rectangle") for which "G" is designated to 90%, and sets the density value of the object ("circle") for which "M" is designated to 16%, to thereby generate the gloss-control plane data.

The gloss-control plane data generated by the plane data generating unit 122 is data in the vector format, which is represented as a set of coordinates of points, a parameter of an equation of a line or a plane connecting the points, and objects indicating a fill and a special effect. FIG. 5 is a view illustrating an image of the gloss-control plane data.

FIG. 11 is a view illustrating a correspondence relation between the object, the coordinate, and the density value in the gloss-control plane data illustrated in FIG. 5.

The plane data generating unit 122 generates document data by integrating the gloss-control plane data, the color plane data, and the clear plane data, and sends the document data to the display processing unit 15 and the print data generating unit 20 illustrated in FIG. 2.

Referring back to FIG. 2, the print data generating unit 20 will be explained below.

The print data generating unit 20 generates print data based on the received document data. The print data contains the document data and a job command specified for a printer. Examples of the job command include setting of a printer, setting of aggregation, and setting of duplex printing. The print data may be converted into a page description language (PDL), such as PostScript, or may remain in the PDF if the DFE 30 can handle the PDF.

Figure 12:
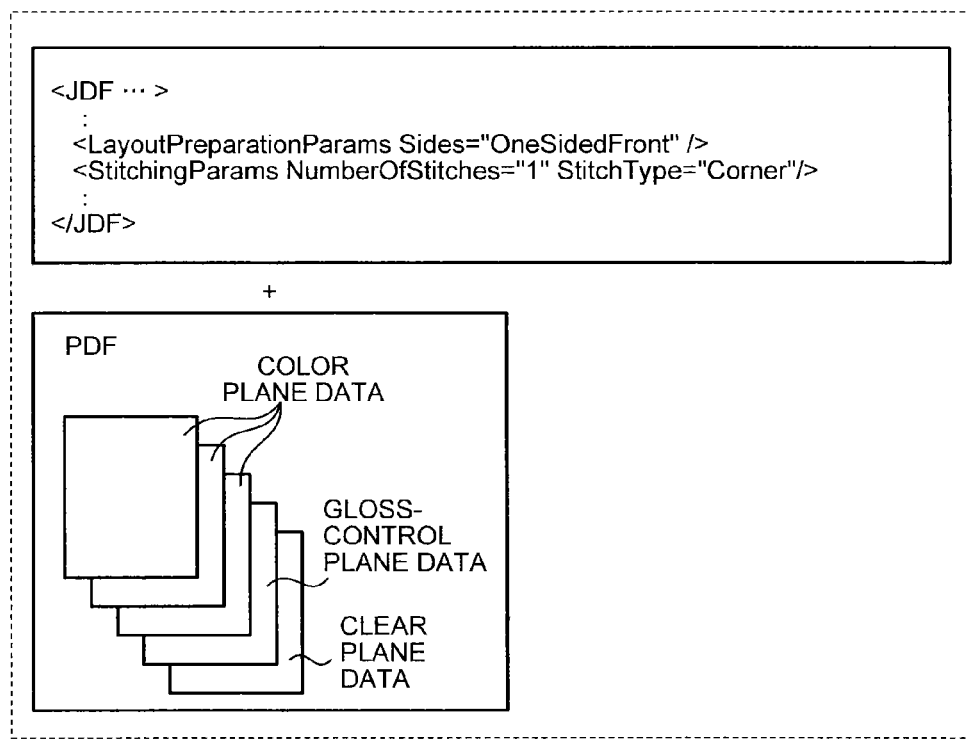
FIG. 12 is a schematic view illustrating an example of the structure of print data.

FIG. 12 is a schematic view illustrating an example of the structure of the print data. In the example in FIG. 12, JDF (Job Definition Format) is used as the job command. However, the job command is not limited to this example. The JDF illustrated in FIG. 12 is a command for designating "single-sided printing and stapling" as the setting of aggregation. The print data may be converted into the PDL, such as PostScript, or may remain in the PDF if the DFE 30 can handle the PDF.

In some cases, the first area, to which a surface effect is applied and which is specified by the gloss-control plane data generated by the document data generating unit 10, and the second area, to which a transparent image is applied and which is specified by the clear plane data generated by the document data generating unit 10, may be set in an overlapping manner.

Figure 13:
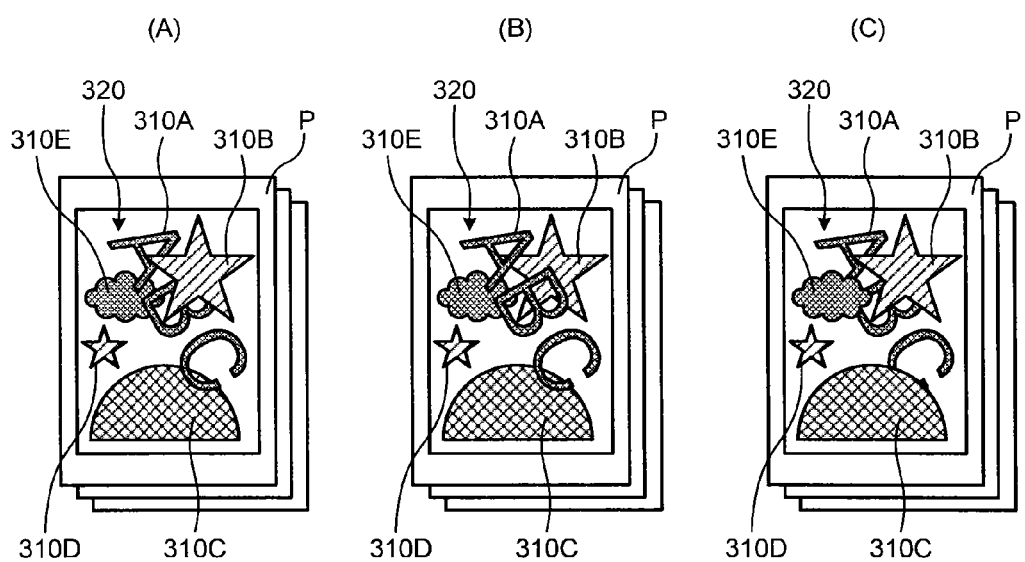
FIG. 13 illustrates examples of images in which a first area to which a surface effect is applied and a second area to which a transparent image is applied are set in an overlapping manner.

FIG. 13 illustrates examples of images in that the first area to which a surface effect is applied and the second area to which a transparent image is applied are set in an overlapping manner. In some cases, a user may desire to form the second area with a transparent image in priority to the first area with a surface effect in the overlapping area on the recording medium. In some other cases, the user may desire to form the first area with a surface effect in priority to the second area with a transparent image in the overlapping area on the recording medium. Besides, when the user forms a plurality of the first areas to which different types of surface effects are applied in the same page, the user may desire to form the first areas in priority to the second area with a transparent image according to the types of the surface effects or according to each object to which the surface effect is applied.

However, in the conventional technology, no consideration is given to the case as illustrated in FIG. 13, in which the first area to which a surface effect is applied and the second area to which a transparent image is applied are set in an overlapping manner. Therefore, it has been difficult to perform printing according to setting such as priority of areas to be printed or priority of objects to be printed.

Specifically, illustrated in (A) of FIG. 13 is an image in which an object 310E, an object 310B, an object 310D, and an object 310C are set as a plurality of the first areas with different types of surfaces effects in the same page, and of all the objects overlapping a transparent image 310A, the object 310B is formed in priority to the transparent image 310A while the object 310E and the object 310C are formed without priority to the transparent image 310A on the recording medium P.

Illustrated in (b) of FIG. 13 is an image in which the object 310B, the object 310E, and the object 310C overlapping the transparent image 310A are formed without priority to the transparent image 310A on the recording medium P.

Illustrated in (C) of FIG. 13 is an image in which the object 310B, the object 310E, and the object 310C overlapping the transparent image 310A are formed in priority to the transparent image 310A on the recording medium P.

As described above, in the conventional technology, no consideration is given to the overlapping area in which areas formed with a clear toner overlap each other as illustrated in FIG. 13.

Referring back to FIG. 2, a host device 110 according to the first embodiment includes the display processing unit 15 to provide priority information on the overlapping area. The display processing unit 15 receives the document data from the document data generating unit 10, generates a preview image of an estimated print result of the document data, and displays the preview image on the display unit 99D. The display processing unit 15 assigns, to the gloss-control plane data, the priority information indicating priority between the first area, to which a surface effect is applied and which is specified by the gloss-control plane data, and the second area, to which a transparent image is formed and which is specified by the clear plane data, in the overlapping area of the first area and the second area.

In the first embodiment, a case will be explained that the display processing unit 15 assigns the priority information to the gloss-control plane data. However, it is sufficient to assign designated priority information to at least one of the clear plane data and the gloss-control plane data.

The display processing unit 15 sends the gloss-control plane data with the priority information to the document data generating unit 10. When receiving the gloss-control plane data with the priority information from the display processing unit 15, the document data generating unit 10 sends the document data containing the gloss-control plane data with the priority information instead of the gloss-control plane data without the priority information to the print data generating unit 20 (details will be described later).

Specifically, the display processing unit 15 includes a document data receiving unit 200A, an analyzing unit 200L, a classified image data generating unit 200F, a classified image data storage unit 200G, a display image generating unit 200M, a display information storage unit 200P, a display control unit 200J, a receiving unit 200K, and a priority information assigning unit 200I.

The analyzing unit 200L includes a structure analyzing unit 200B, an object structure list storage unit 200C, a classifying unit 200D, and a classification list storage unit 200E.

Figure 14:
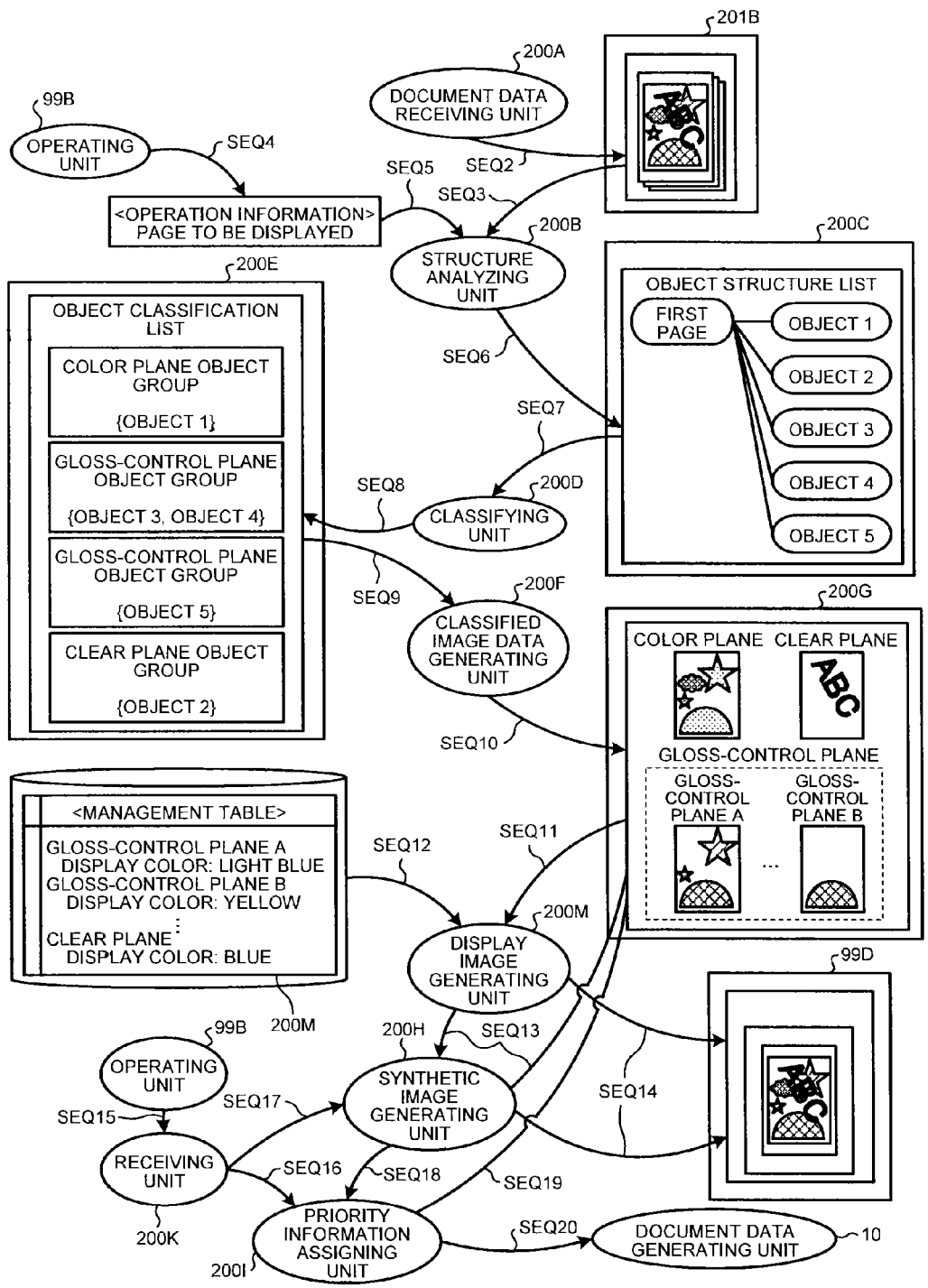
FIG. 14 is a sequence diagram illustrating the flow of an image display process performed by a display processing unit.

FIG. 14 is a sequence diagram illustrating the flow of an image display process performed by the display processing unit 15. The functional units of the display processing unit 15 will be explained with reference to the sequence diagram in FIG. 14.

The document data receiving unit 200A receives document data from the document data generating unit 10 (see FIG. 2). The document data receiving unit 200A makes the document data available to view on the display processing unit 15.

Specifically, the document data receiving unit 200A determines whether the display processing unit 15 can handle the file format of the document data by referring to a file extension or a file header of a page of the document data specified as a subject to be previewed.

The document data receiving unit 200A releases file locking for example to make it possible to handle the document data. The document data receiving unit 200A loads the document data on a temporary memory 201B provided in the document data receiving unit 200A (SEQ2).

The structure analyzing unit 200B analyzes a data structure of the document data loaded on the temporary memory 201B, and generates an object structure list indicating drawing areas contained in each page of the document data.

Specifically, when a user selects a display target page by providing an operation instruction via the operating unit 99B (SEQ4), the structure analyzing unit 200B reads document data of the page corresponding to the selection result from the temporary memory 201B and analyzes the document data (SEQ3 and SEQ5).

The structure analyzing unit 200B stores the object structure list that is the analysis result in the object structure list storage unit 200C (SEQ6).

The object structure list is information indicating a list of drawing areas contained in each page of the document data. For example, the object structure list represents objects contained in a page of the document data by a tree structure. Specifically, the structure analyzing unit 200B analyzes one or a plurality of objects that are drawing areas contained in each of the color plane data, the gloss-control plane data, and the clear plane data of the document data, and generates the object structure list representing drawing information (e.g., the position, the color space, and the density of the drawing area) for each object.

The classifying unit 200D classifies each of the objects (drawing areas) listed in the object structure list into a drawing area group of color images specified by the color plane data, a drawing area group of transparent images specified by the clear plane data, or a drawing area group specified by the gloss-control plane data, and generates the object classification list (SEQ7). The classifying unit 200D stores the generated object classification list in the classification list storage unit 200E (SEQ8).

The object classification list is a list of pointers from each of the object groups to corresponding objects stored in the object structure list storage unit 200C, and actual drawing information is stored in the object structure list storage unit 200C. The classification list storage unit 200E stores therein the object classification list.

The classified image data generating unit 200F integrates and rasterizes the drawing area groups of color images listed in the object classification list to generate second color plane data. The classified image data generating unit 200F integrates and rasterizes the drawing area groups of transparent images listed in the object classification list to generate second clear plane data. The classified image data generating unit 200F integrates and rasterizes the drawing area groups of glossy areas to generate second gloss-control plane data. Thus, the classified image data generating unit 200F generates the second color plane data, the second gloss-control plane data, and the second clear plane data (SEQ9 and SEQ10).

The second color plane data is obtained by converting the color plane data into image data in a displayable format for display on the display unit 99D. For example, the second color plane data is in a raster format represented by 8 bits per pixel converted from the color plane data.

The second clear plane data is image data obtained by converting the clear plane data into image data in a displayable format for display on the display unit 99D. For example, the second clear plane data is in a raster format represented by 8 bits per pixel converted from the clear plane data.

The second gloss-control plane data is image data obtained by converting the gloss-control plane data into image data in a displayable format for display on the display unit 99D. For example, the second gloss-control plane data is in a raster format represented by 8 bits per pixel converted from the gloss-control plane data.

The classified image data storage unit 200G stores therein the second color plane data, the second clear plane data, and pieces of the second gloss-control plane data for respective types of surface effects, all of which are generated by the classified image data generating unit 200F as image data to be displayed.

The classified image data generating unit 200F may generate the image data to be displayed (the second color plane data, the second clear plane data, and the second gloss-control plane data) for each drawing area (object) of each plane.

The display information storage unit 200P stores therein a management table. The management table contains display management information corresponding to the first area to which a surface effect is applied and display management information corresponding to a transparent image.

The display management information is information indicating a display color of each of the glossy area and the transparent image displayed on the display unit 99D. The display management information is input by an operation instruction issued by a user via the operating unit 99B, and is stored in advance in the display information storage unit 200P.

For example, information indicating "light blue" that is color information indicating a display color of a transparent image to be displayed is stored, as the display management information, in the management table in association with information on the transparent image. For another example, pieces of information indicating different colors such as "blue" and "yellow" that are pieces of color information indicating display colors are stored, as the display management information, in the management table for the respective types of surface effects to be applied to the first area, in association with pieces of information on the respective types of surface effects.

The first area to which a surface effect is applied and the second area to which a transparent image is applied after printing with a clear toner on a recording medium are colorless and transparent. Therefore, the display image generating unit 200M converts a color of the first area of the second gloss-control plane data stored in the classified image data storage unit 200G into a display color indicated by the display color information that is stored in the display information storage unit 200P in association with the type of the surface effect applied to the first area (SEQ11 and SEQ12).

Similarly, the display image generating unit 200M converts a color of the second area of the second clear plane data, to which a transparent image is applied and which is stored in the classified image data storage unit 200G, into a display color indicated by the display color information that is stored in the display information storage unit 200P in association with the transparent image (SEQ11 and SEQ12).

A synthetic image generating unit 200H synthesizes the second clear plane data and the second gloss-control plane data, the colors of which are converted to the display colors by the display image generating unit 200M, and the second color plane data stored in the classified image data storage unit 200G, to thereby generate a synthetic image representing a preview image of an estimated print result of the document data (SEQ13).

The display control unit 200J displays the synthetic image generated by the synthetic image generating unit 200H and displays the second clear plane data and the second gloss-control plane data, the colors of which are converted to the display colors by the display image generating unit 200M, on the display unit 99D (SEQ14).

The receiving unit 200K displays, on the input unit 99A, an input screen for assigning the priority information, and receives, from the operating unit 99B, the priority information indicating priority between the second area to which a transparent image is applied and the first area to which a surface effect is applied in the overlapping area of the first area and the second area (SEQ16). The priority information is provided by an operation instruction issued by the user via the operating unit 99B (SEQ15).

In this case, the synthetic image generating unit 200H may also receive the priority information (SEQ17). When receiving the priority information, the synthetic image generating unit 200H re-generates a synthetic image so that a priority area can be displayed on top of other areas, and displays the synthetic image on the display unit 99D.

The priority information assigning unit 200I assigns the priority information received by the receiving unit 200K to the gloss-control plane data. Specifically, the priority information assigning unit 200I assigns, to the gloss-control plane data, the priority information indicating priority between the first area, to which the surface effect is applied and which is specified by the gloss-control plane data, and the second area, in which a transparent image is formed and which is specified by the clear plane data, in the overlapping area of the first area and the second area (SEQ18 and SEQ19).

FIG. 15 is a schematic view illustrating an example of a data structure of the gloss-control plane data with the priority information. As illustrated in FIG. 15, the priority information indicating priority or non-priority with respect to an overlapping transparent image is assigned to each object of the gloss-control plane data.

Referring back to FIG. 14, the priority information assigning unit 200I sends the gloss-control plane data with the priority information to the document data generating unit 10 (SEQ20).

When receiving the gloss-control plane data with the priority information, the document data generating unit 10 sends the document data containing the gloss-control plane data with the priority information, instead of the document data containing the gloss-control plane data without the priority information, to the print data generating unit 20. Therefore, when the display processing unit 15 assigns the priority information to the gloss-control plane data, the document data generating unit 10 sends the gloss-control plane data with the priority information to the print data generating unit 20.

In the first embodiment, a case is explained that the display processing unit 15 assigns the priority information to the gloss-control plane data. However, it is sufficient to assign designated priority information to at least one of the clear plane data and the gloss-control plane data.

As described above, the print data generating unit 20 generates print data based on the received document data. Therefore, when the received document data contains the gloss-control plane data with the priority information, the print data generating unit 20 generates the print data based on the document data containing the gloss-control plane data with the priority information. The print data generating unit 20 sends the generated print data to the DFE 30 via the output unit 99C.

A document data generation process performed by the document data generating unit 10 will be explained in detail below.

Figure 16:
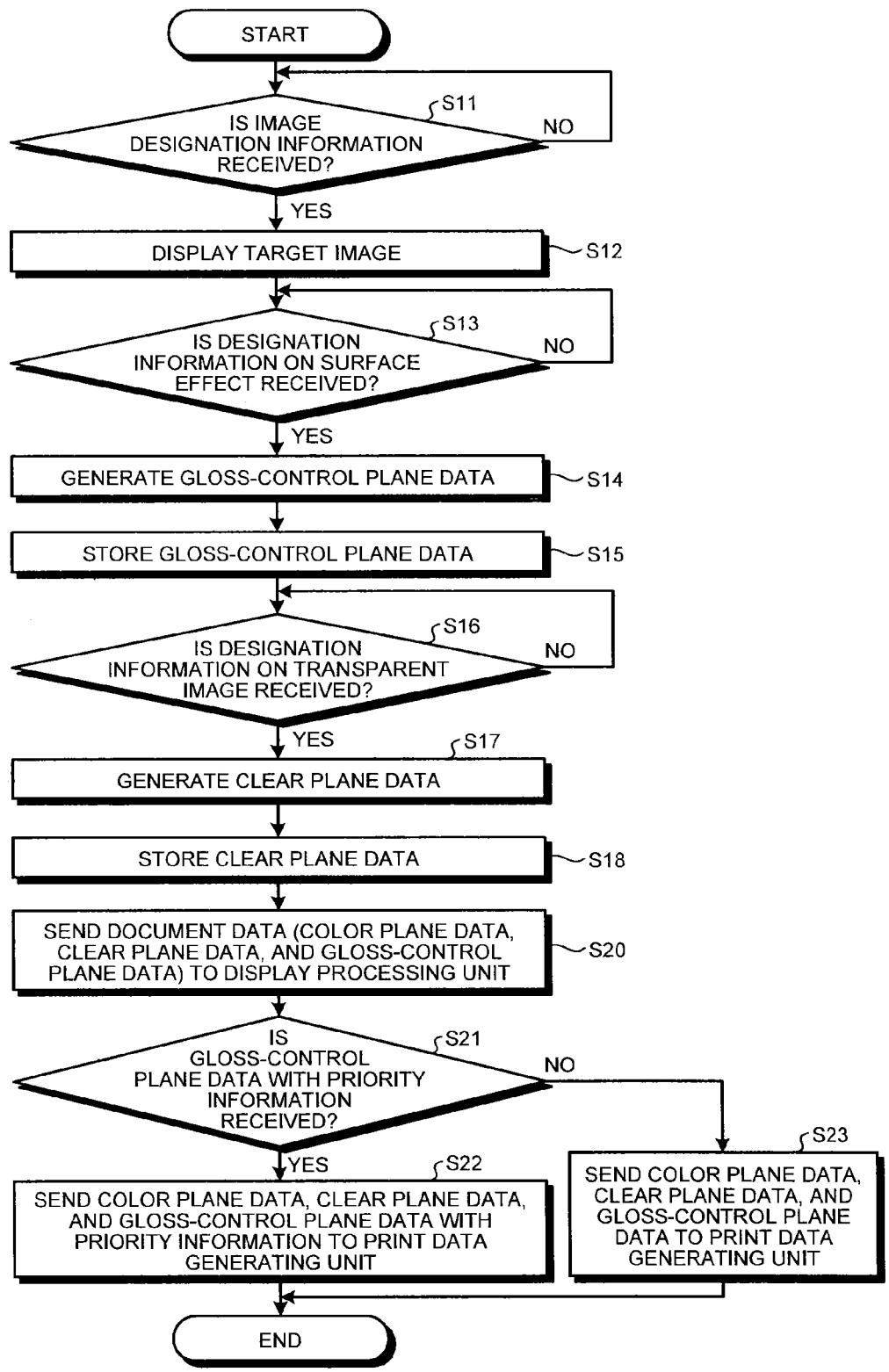
FIG. 16 is a flowchart illustrating the flow of a document data generation process.

FIG. 16 is a flowchart illustrating the flow of the document data generation process performed by the document data generating unit 10 according to the first embodiment. In the first embodiment, a case will be explained that both of the clear plane data and the gloss-control plane data are generated.

When the input control unit 124 receives image designation information (Step S11: YES), the display control unit 121 causes the display unit 99D to display an image designated by the received image designation information (Step S12). When the input control unit 124 receives the designation information on a surface effect (Step S13: YES), the plane data generating unit 122 sequentially registers pieces of information as described below in gloss-control plane data (initially, blank data) based on the received designation information, thereby generating the gloss-control plane data (Step S14).

Specifically, at Step S14, the plane data generating unit 122 specifies an object of a target image to which a surface effect is applied by the designation information and specifies a coordinate of the object. For example, the object and the coordinate of the object are specified by using a drawing command provided by an operating system that allows the image processing unit 120 to draw an object in the target image and by using a coordinate value set by the drawing command.

The plane data generating unit 122 determines a density value corresponding to the surface effect specified by the user by the designation information, with reference to the density value selection table stored in the storage unit 123. The plane data generating unit 122 registers the specified object and the density value that is determined according to the surface effect in gloss-control plane data (initially, blank data) in an associated manner. Thus, the gloss-control plane data is generated by the plane data generating unit 122.

The plane data generating unit 122 stores the generated gloss-control plane data in the storage unit 123 (Step S15).

When the input control unit 124 receives the designation information on the transparent image (Step S16: YES), the plane data generating unit 122 sequentially registers pieces of information as described below in clear plane data (initially, blank data) based on the received designation information, thereby generating the clear plane data (Step S17).

Specifically, at Step S17, the plane data generating unit 122 specifies an object that is specified as a transparent image by the designation information and specifies a coordinate of the object. For example, the object and the coordinate of the object are specified by using a drawing command provided by an operating system that allows the image processing unit 120 to draw an object in the target image and by using a coordinate value set by the drawing command. In this case, it may be possible to input, as the designation information on the transparent image, a density value indicating the adhesion amount of a clear toner on the object specified as the transparent image. It may also be possible to set the density value corresponding to the adhesion amount of a clear toner to a predetermined value when an object of the transparent image is specified.

The plane data generating unit 122 registers the specified object and the specified or predetermined density value of the transparent image in clear plane data (initially, blank data) in an associated manner. Thus, the clear plane data is generated by the plane data generating unit 122.

The plane data generating unit 122 stores the generated clear plane data in the storage unit 123 (Step S18).

The process from Step S13 to Step S15 and the process from Step S16 to Step S18 can be performed in random order.

The document data generating unit 10 sends the document data containing the color plane data, the generated gloss-control plane data, and the generated clear plane data to the display processing unit 15 (Step S20).

The document data generating unit 10 determines whether the gloss-control plane data with the priority information is received from the display processing unit 15 (Step S21). When it is determined that the gloss-control plane data with the priority information is received at Step S21 (Step S21: YES), the process goes to Step S22. At Step S22, the document data generating unit 10 sends the document data containing the color plane data, the clear plane data, and the gloss-control plane data with the priority information received from the display processing unit 15 to the print data generating unit 20 (Step S22). Then, the routine is finished.

On the other hand, when it is determined that the gloss-control plane data with the priority information is not received at Step S21 (Step S21: NO), the process goes to Step S23. At Step S23, the document data generating unit 10 sends the document data containing the color plane data, the generated clear plane data, and the generated gloss-control plane data to the print data generating unit 20 (Step S23). Then, the routine is finished.

Figure 17:
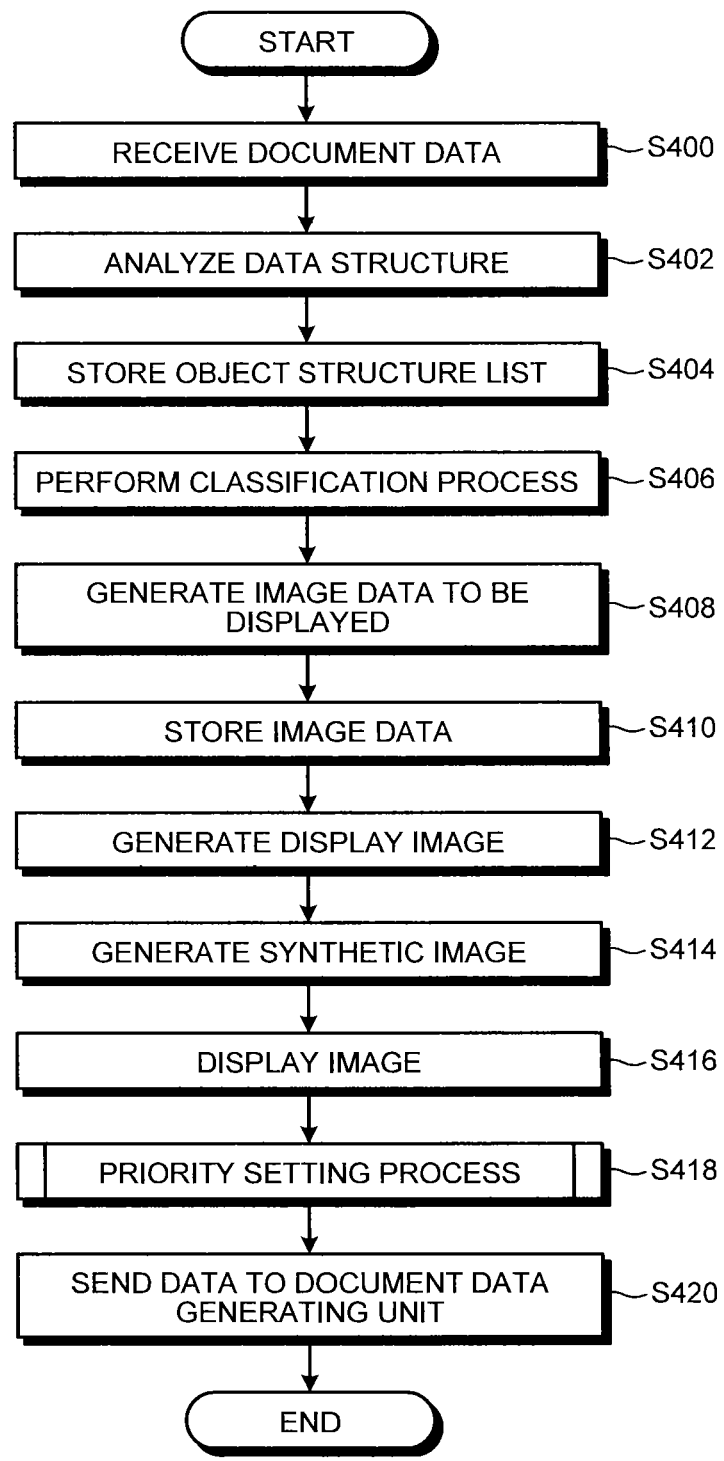
FIG. 17 is a flowchart illustrating the flow of a priority information assigning process.

A priority information assigning process performed by the display processing unit 15 will be explained below. FIG. 17 is a flowchart illustrating the flow of the priority information assigning process performed by the display processing unit 15.

The document data receiving unit 200A receives document data (Step S400). The structure analyzing unit 200B analyzes the data structure of the document data, and generates an object structure list representing objects contained in each page of the document data (Step S402). The structure analyzing unit 200B stores the object structure list in the object structure list storage unit 200C (Step S404).

The classifying unit 200D performs a document data classification process and generates an object classification list (Step S406).

The classified image data generating unit 200F generates second color plane data, second gloss-control plane data, and second clear plane data as image data to be displayed, and stores all pieces of the data in the classified image data storage unit 200G (Step S408 and Step S410).

The display image generating unit 200M converts the color of the first area of the second gloss-control plane data and the color of the second area of the second clear plane data into display colors specified by corresponding display color information stored in the display information storage unit 200P, to thereby generate a display image (Step S412).

The synthetic image generating unit 200H performs a synthetic image generation process for generating a synthetic image representing an estimated print result of the document data (Step S414).

The display control unit 200J displays the synthetic image generated at Step S414 and the display image generated at Step S408 on the display unit 99D (Step S416).

The priority information assigning unit 200I performs a priority setting process to assign the priority information to the gloss-control plane data (Step S418) (details will be described later).

The priority information assigning unit 200I sends the gloss-control plane data with the priority information to the document data generating unit 10 (Step S420), and the routine is finished.

Figure 18:
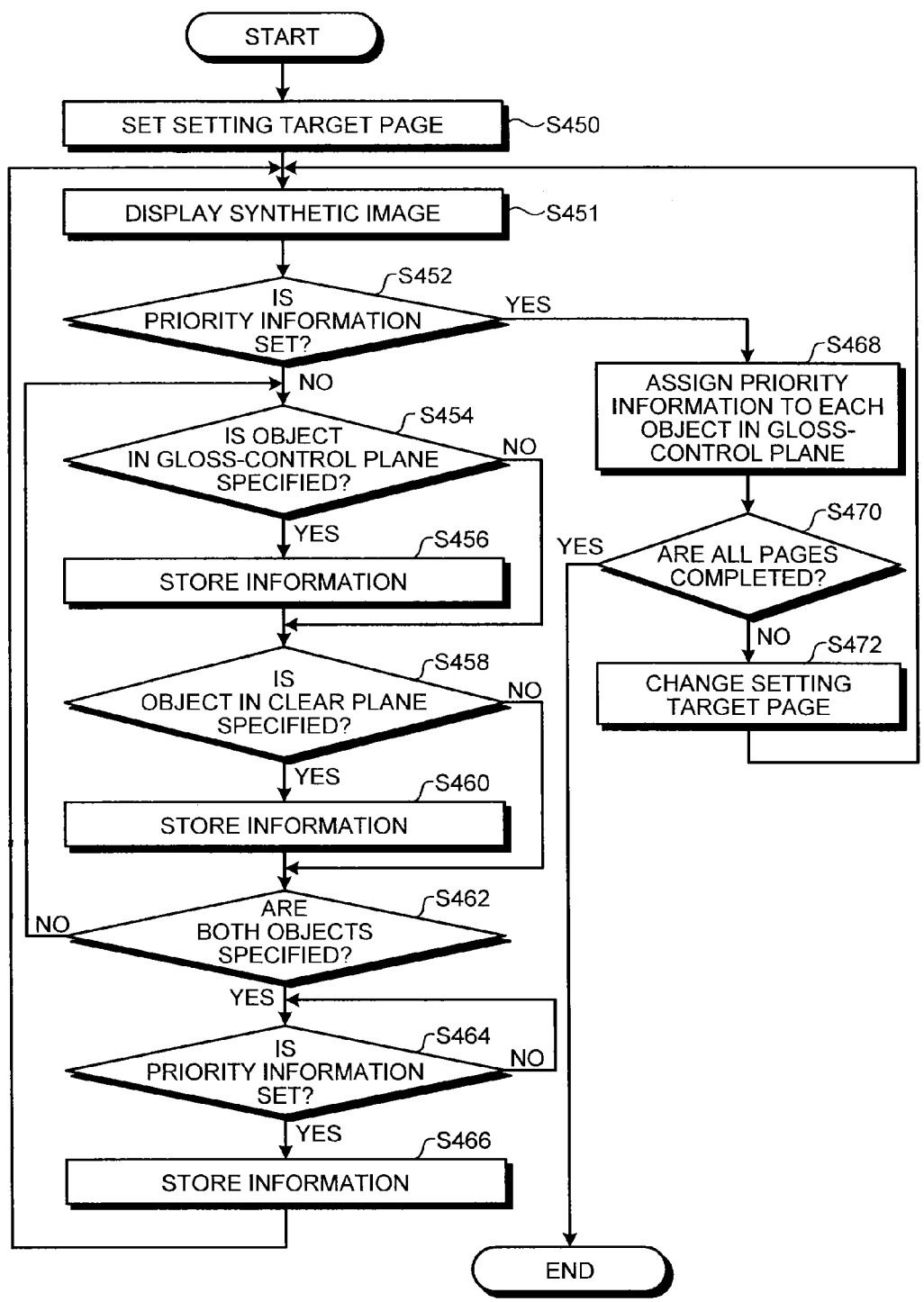
FIG. 18 is a flowchart illustrating the flow of a priority setting process.

The priority setting process at Step S418 will be explained in detail below. FIG. 18 is a flowchart illustrating the flow of the priority setting process.

As described above, the gloss-control plane data and the clear plane data are generated on page-by-page basis. The priority information assigning unit 200I sets a setting target page for which priority information is to be set (Step S450). For example, the priority information assigning unit 200I sets the first page as initial information. The priority information assigning unit 200I turns one setting page every time the priority information assigning unit 200I receives an instruction to change the setting target page from the operating unit 99B via the receiving unit 200K.

The priority information assigning unit 200I displays, on the display unit 99D, the synthetic image (the preview image, in which the second clear plane data and the second gloss-control plane data whose colors are converted to display colors and the second color plane data are synthesized and which represents an estimated print result of the document data) received from the synthetic image generating unit 200H (Step S451).

Figure 19:
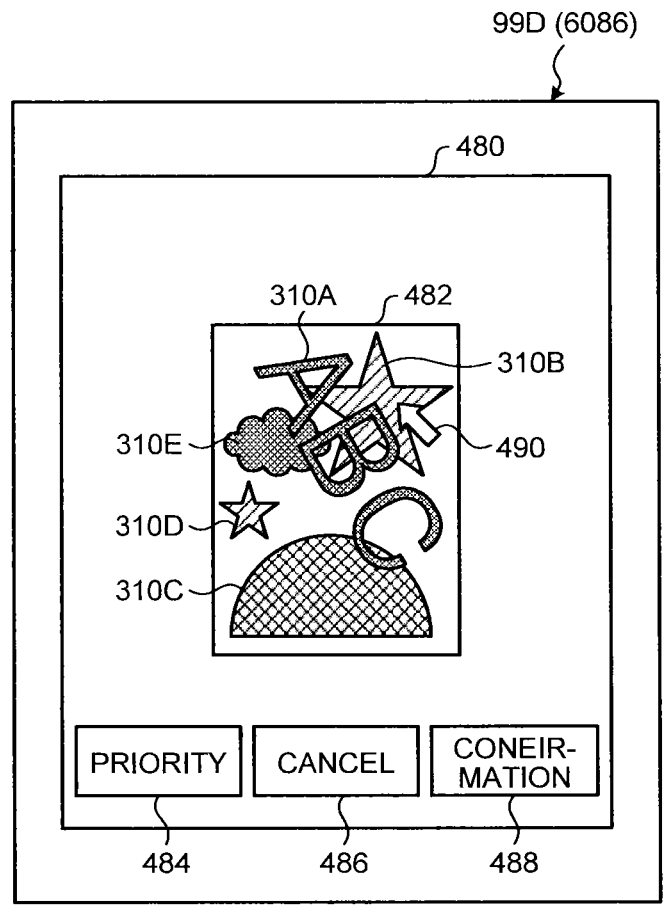
FIG. 19 is a schematic view illustrating an example of a synthetic image.

FIG. 19 is a schematic view illustrating an example of the synthetic image displayed on the display unit 99D.

As illustrated in FIG. 19, for example, a display screen 480 containing a synthetic image 482 is displayed on the display unit 99D by the process at Step S451. In the example illustrated in FIG. 19, the synthetic image 482 contains the object 310E, the object 310B, the object 310D, and the object 310C that are set as a plurality of the first areas with different types of surface effects, and contains the transparent image 310A on the display unit 99D. In the synthetic image 482, a color drawing area specified by the color plane data may be displayed or may not be displayed.

In the display screen 480, a pointer 490 is displayed for allowing a user to specify any object on the display screen by an operation instruction via the operating unit 99B. The pointer 490 moves on the display screen according to the operation instruction of the operating unit 99B, such as a mouse.

The display screen 480 contains a "priority" button 484 for giving priority to an object specified by the pointer 490 over other objects overlapping the specified object, a "cancel" button 486 for cancelling priority setting, and a "confirmation" button 488 for confirming priority information.

When the pointer 490 is moved to a display position of any of the buttons according to the operation instruction by the user via the operating unit 99B and then confirmation is given by the operation instruction of the operating unit 99B, a signal indicating "priority", "cancel", or "confirmation" is input to the priority information assigning unit 200I via the receiving unit 200K in accordance with each button.

Referring back to FIG. 18, at Step S452, the priority information assigning unit 200I determines whether the priority information is set for all of the objects contained in the setting target page of the gloss-control plane data (Step S452). For example, it is determined whether information indicating priority or non-priority is associated, as the priority information, with information on all of the objects contained in the setting target page, as a determination process at Step S452.

When it is determined that the priority information is not set for all of the objects at Step S452 (Step S452: NO), the priority information assigning unit 200I determines whether at least one of the objects in the setting target image of the gloss-control plane data is specified (Step S454). For example, it is determined whether any of the object 310E, the object 310B, the object 310D, and the object 310C that are the first areas with different types of surface effects is specified, via the pointer 490, by the operation instruction by the user via the operating unit 99B, as a determination process at Step S454.

When it is determined that at least one of the objects is specified at Step S454 (Step S454: YES), the process goes to Step S456. When it is determined that at least one of the objects is not specified at Step S454 (Step S454: NO), the process goes to Step S458.

At Step S456, the priority information assigning unit 200I stores information indicating the object that is specified in setting target page of the gloss-control plane data at Step S454 in a memory (not illustrated) of the priority information assigning unit 200I (Step S456).

The priority information assigning unit 200I determines whether at least one of the objects in the setting target page of the clear plane data is specified (Step S458). For example, it is determined whether the object 310A that is the second area of the transparent image is specified, via the pointer 490, by the operation instruction by the user via the operating unit 99B, as a determination process at Step S458.

When it is determined that at least one of the objects is specified at Step S458 (Step S458: YES), the process goes to Step S460. When it is determined that at least one of the objects is not specified at Step S458 (Step S458: NO), the process goes to Step S462.

At Step S460, the priority information assigning unit 200I stores information indicating the object specified in the setting target page of the clear plane data at Step S458 in the memory (not illustrated) of the priority information assigning unit 200I (Step S460).

The priority information assigning unit 200I determines whether both of the object of the gloss-control plane data and the object of the clear plane data are already specified (Step S462). For example, it is determined whether the objects specified at Step S454 and Step S458 are stored in the memory (not illustrated) of the priority information assigning unit 200I, as a determination process at Step S462.

When it is determined that not both of the objects are specified at Step S462, the process returns to Step S454. When it is determined that both of the objects are specified at Step S462, the process goes to Step S464.

At Step S464, it is determined whether the priority information, which indicates priority between areas (objects) in the overlapping area of the object (the first area) of the gloss-control plane data and the object (the second area) of the clear plane data specified through the process from Step S454 to Step S462, is specified (Step S464).

Specifically, as a determination process at Step S464, the priority information assigning unit 200I determines whether a display area of the "priority" button 484 in the display screen 480 displayed on the display unit 99D as illustrated in FIG. 19 is specified by the operation instruction by the user via the operating unit 99B and thereafter a display area of the "confirmation" button 488 is specified.

In the first embodiment, a case is explained that the priority information is set when a preview screen, such as the synthetic image, is displayed on the display unit 99D. However, the priority information may be set when the clear plane data or the gloss-control plane data is generated.

In this case, the input screen for inputting the priority information is displayed on the display unit 99D when the clear plane data or the gloss-control plane data is generated. Specifically, the input screen for inputting the priority information may be displayed when the display control unit 121 displays the screen as illustrated in FIG. 8 on the display unit 99D and the user performs an input operation to specify the first area to which a surface effect is applied or the second area in which a transparent image is formed by pressing a marker add button or the like via the operating unit 99B.

Figure 20:
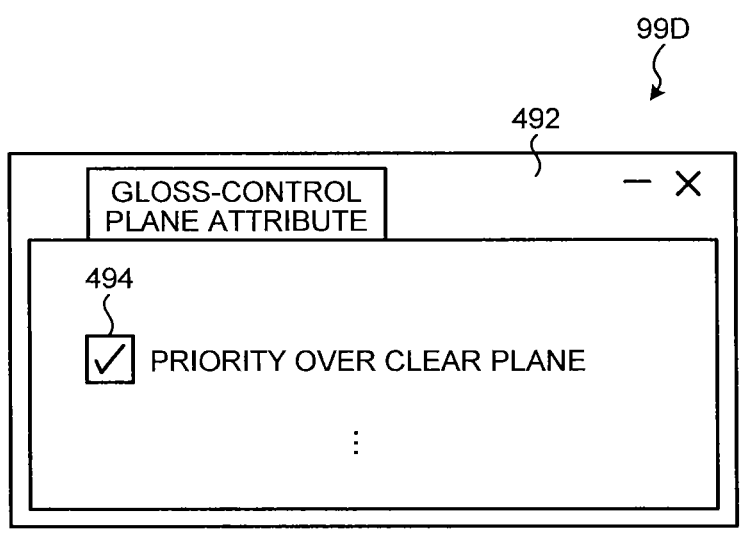
FIG. 20 is a schematic view illustrating an example of an input screen for inputting the priority information.

FIG. 20 is a schematic view illustrating an example of the input screen displayed on the display unit 99D for inputting the priority information.

As illustrated in FIG. 20, for example, when the user sets an object of the gloss-control plane data and an object of the clear plane data and if there is an overlapping area of the objects, an input screen 492 illustrated in FIG. 20 is additionally displayed on the display unit 99D.

The input screen 492 contains a check box 494, as the attribute of a gloss-control plane, that indicates whether priority is given to a selected object of the gloss-control plane data over a selected object of the clear plane data. When the user ticks the check box 494 by the operation instruction via the operating unit 99B, gloss-control plane data with the priority information is generated so that priority is given to the first area that is the object of the gloss-control plane data in the overlapping area of the gloss-control plane data.

Referring back to FIG. 18, as a determination process at Step S464, the priority information assigning unit 200I determines whether either the priority information indicating priority of the first area or the priority information indicating non-priority of the first area is received from the operating unit 99B.

The priority information assigning unit 200I continues to determine that the priority information is not received (Step S464: NO) until it determines that the priority information is received at Step S464 (Step S464: YES). When it is determined that the priority information is received at Step S464 (Step S464: YES), the process goes to Step S466. Then, information indicating the object (the first area) of the gloss-control plane data specified at Step S454, information indicating the object (the second area) of the clear plane data specified at Step S458, and the priority information indicating whether priority is given (or not) to the second area over the first area (non-priority) are stored in the memory (not illustrated) (Step S466), and the process returns to Step S451.

On the other hand, when it is determined that the priority information is set for all of the objects at Step S452 (Step S452: YES), the process goes to Step S468. At Step S468, the priority information assigning unit 200I assigns the priority information to each object (the first area) of the gloss-control plane data (Step S468).

Specifically, at Step S468, the priority information assigning unit 200I assigns corresponding priority information (priority information indicating priority or non-priority) to information indicating each object of the setting target page of the gloss-control plane data, based on the information stored in the memory at Step S466. Therefore, the priority information indicating priority or non-priority with respect to an overlapping transparent image is assigned to each object of the setting target page of the gloss-control plane data (also see FIG. 15).

The priority information assigning unit 200I determines whether the priority information is assigned to all of the pages of the gloss-control plane data to determine whether the process is completed on all the pages (Step S470). When it is determined that the process is not completed on all of the pages at Step S470 (Step S470: NO), the process goes to Step S472. At Step S472, a target page for which the priority information is to be set is changed to a page different from the previous target page (Step S472). Then, the process returns to Step S451. When it is determined that the process is completed on all of the pages at Step S470 (Step S470: YES), the routine is finished.

Through the process from Step S450 to Step S472, the priority information is assigned to each object (the first area) contained in the gloss-control plane data of each page contained in the document data.

The DEF30 will be explained in detail below.

The DFE 30 receives print data from the host device 11, and generates image data for forming toner images corresponding to CMYK toners and a colorless (transparent) clear toner based on the print data. The DFE 30 transmits the generated image data to the printing apparatus 60 via the MIC 40.

Figure 21:
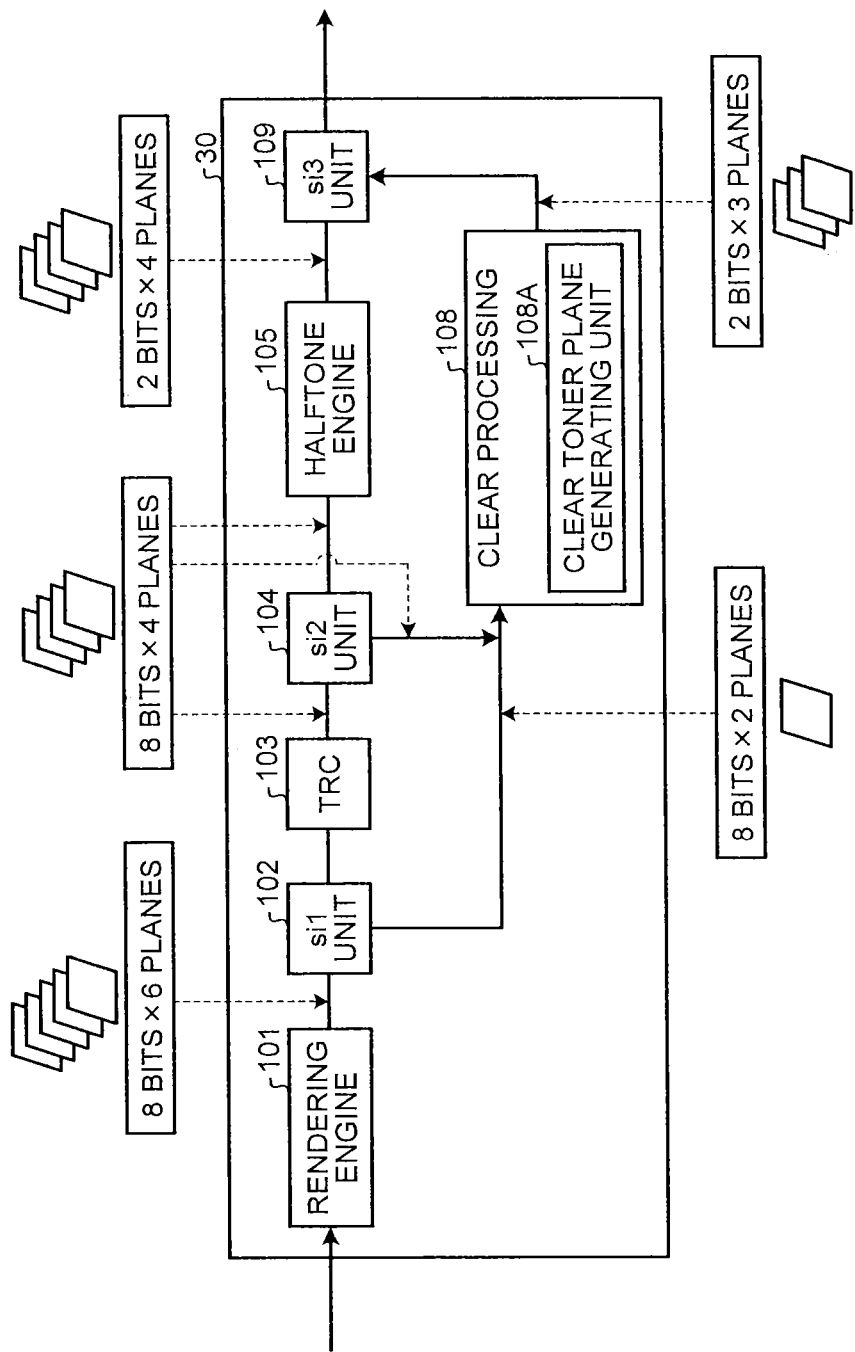
FIG. 21 is a schematic view illustrating a functional configuration a DFE.

FIG. 21 is a schematic view illustrating a functional configuration of the DFE 30.

As illustrated by example in FIG. 21, the DFE 30 includes a rendering engine 101, an si1 unit 102, a TRC (Tone Reproduction Curve) 103, an si2 unit 104, a halftone engine 105, a clear processing 108, an si3 unit 109, and a surface effect selection table (not illustrated).

The rendering engine 101, the si1 unit 102, the TRC 103, the si2 unit 104, the halftone engine 105, the clear processing 108, and the si3 unit 109 are realized by causing a control unit of the DEF 30 to execute various programs stored in a main storage unit or an auxiliary storage unit. Each of the si1 unit 102, the si2 unit 104, and the si3 unit 109 has a function to separate image data (separation) and a function to integrate image data (integration). The surface effect selection table is stored in, for example, the auxiliary storage unit.

The rendering engine 101 receives print data (image data) transmitted by the host device 11. The rendering engine 101 interprets the language of the input image data, converts the image data represented in the vector format into image data in the raster format, converts a color space based on the RGB color model into a color space based on the CMYK color model, and outputs CMYK 8-bit color plane data, 8-bit gloss-control plane data, and 8-bit clear plane data.

The si1 unit 102 outputs the CMYK 8-bit color plane data to the TRC 103 and outputs the 8-bit gloss-control plane data and the 8-bit clear plane data to the clear processing 108. The DFE 30 converts the gloss-control plane data in the vector format output by the host device 11 into gloss-control plane data in the raster format. Therefore, the DFE 30 sets the type of a surface effect to be applied to an object specified by the user via the image processing application as a density value for each pixel, and outputs the gloss-control plane data with the density values.

The TRC 103 receives the CMYK 8-bit color plane data via the si1 unit 102. The TRC 103 performs gamma correction on the received 8-bit color plane data by using a gamma curve of one-dimensional lookup table (1D_LUT) generated by calibration. Total amount control of toner may be performed as image processing, in addition to the gamma correction. The total amount control is a process for limiting the CMYK 8-bit color plane data after the gamma correction because the amount of toner that the printer device 50 can adhere to one pixel on the recording medium is limited. If printing is performed beyond the total amount control, the image quality is reduced due to a transfer failure or a fixing failure. In the first embodiment, only related gamma correction will be explained.

The si2 unit 104 outputs the CMYK 8-bit color plane data subjected to the gamma correction by the TRC 103 to the clear processing 108 as data for generating an inverse mask (to be described later). The halftone engine 105 receives the CMYK 8-bit color plane data subjected to the gamma correction via the si2 unit 104. To output the input color plane data to the printer device 50, the halftone engine 105 performs halftone processing for converting the received color plane data into image data in a certain data format, such as CMYK 2-bit color plane data. The halftone engine 105 outputs the CMYK 2-bit color plane data subjected to the halftone processing. The 2-bit data is described by way of example only, and the present invention is not limited to this example.

The clear processing 108 receives the 8-bit gloss-control plane data and the 8-bit clear plane data that are converted by the rendering engine 101 via the si1 unit 102. The clear processing 108 also receives the CMYK 8-bit color plane data subjected to the gamma correction by the TRC 103 via the si2 unit 104.

The clear processing 108 determines a surface effect corresponding to the density value (pixel value) of each pixel of the gloss-control plane data by referring to the surface effect selection table (to be described later) based on the received gloss-control plane data, and determines whether to turn on or off the glosser 70 based on the determined surface effect.

The clear processing 108 includes a clear toner plane generating unit 108A. When the position of a pixel of the 8-bit gloss-control plane data and the position of a pixel of the 8-bit clear plane data overlap each other, the clear toner plane generating unit 108A excludes a pixel other than the pixel having priority in units of pixels based on the priority information, and employs a density value of the one of the pixels as the density value at the position of the overlapping pixels (details will be described later).

Through the exclusive process, when the priority information indicating priority of the gloss-control plane data is set for a pixel located in the overlapping area of the second area to which a transparent image is applied and the first area to which a surface effect is applied, the clear toner plane generating unit 108A converts 8-bit pixel data of the gloss-control plane data into 2-bit pixel data for the pixel at this position. On the other hand, when the priority information indicating non-priority of the gloss-control plane data is set for a pixel located in the overlapping area, the clear toner plane generating unit 108A converts 8-bit pixel data of the clear plane data 2-bit pixel data for the pixel at this position. The exclusive process will be explained in detail later.

The clear toner plane generating unit 108A of the clear processing 108 appropriately generates an inverse mask or a solid mask by using the plane data generated by integration of the 8-bit clear plane data and the 8-bit gloss-control plane data by the exclusive processes, and by using the CMYK 8-bit color plane data, thereby generating 2-bit clear toner plane data for attaching a clear toner.

Depending on the determination result of the surface effect, the clear processing 108 appropriately generates and outputs clear toner plane data to be used by the printer device 50, clear plane data to be used by the normal fixing post-processing device 80, and clear plane data used by the low-temperature fixing post-processing device 90, and also outputs on/off information indicating on or off of the glosser 70.

The inverse mask is used to equalize the total adhesion amount of CMYK toners and a clear toner on each pixel of a target area to which a surface effect is applied. Specifically, image data obtained by adding up the density values of all pixels of the target area of the CMYK plane image data and by subtracting a predetermined value from the total amount of the density values serves as the inverse mask. For example, an inverse mask 1 to be described later is represented by Equation (1) below:

$$\text{Clr}=100-(C+M+Y+K) \qquad (1)$$

when Clr<0, Clr=0.

In Equation (1), Clr, C, M, Y, and K represent the density ratios converted from the respective density values of a clear toner and toners of C, M, Y, and K at each pixel. Specifically, by Equation (1), the total adhesion amount of toner obtained by adding the adhesion amount of the clear toner to the total adhesion amount of the toners of C, M, Y, and K is set to 100% at all of the pixels of the target area to which the surface effect is applied. If the total adhesion amount of the toners of C, M, Y, and K is 100% or greater, the clear toner is not attached and the density ratio of the clear toner is set to 0%. This is because a portion where the total adhesion amount of the toners of C, M, Y, and K exceeds 100% is smoothed by a fixing process. In this way, by setting the total adhesion amount to 100% at all of the pixels of the target area to which the surface effect is applied, it becomes possible to reduce surface irregularities due to a difference between the total adhesion amounts of toner in the target area. Therefore, it is possible to generate gloss by specular reflection of light. The inverse mask may be obtained by Equation other than Equation (1), and various types of inverse masks may be applicable.

For example, the inverse mask may be configured to uniformly attach a clear toner to each pixel. The inverse mask of this type is called a solid mask and is represented by Equation (2) below:

$$\text{Clr}=100 \qquad (2)$$

It may be possible to assign the density ratio other than 100% to any of target pixels to which the surface effect is applied. Therefore, solid masks of various patterns may be applicable.

For another example, the inverse mask may be obtained by multiplication of background color exposure rates of the respective colors. The inverse mask of this type is represented by, for example, Equation (3) below:

$$\text{Clr}=100\times\{(100-C)/100\}\times\{(100-M)/100\}\times\{(100-Y)/100\}\times\{(100-K)/100\} \qquad (3)$$

In Equation (3), (100−C)/100 represents the background exposure rate of C, (100−M)/100 represents the background exposure rate of M, (100−Y)/100 represents the background exposure rate of Y, and (100−K)/100 represents the background exposure rate of K.

For still another example, the inverse mask may be obtained by a method based on the assumption that the halftone dot with the largest area ratio regulates the smoothness. The inverse mask of this type is represented by, for example, Equation (4):

$$\text{Clr}=100-\max(C,M,Y,K) \qquad (4)$$

In Equation (4), max(C, M, Y, K) indicates that the density value of a color having the greatest density value among CMYK serves as a representative value.

Namely, the inverse mask represented by any of Equation (1) to Equation (4) is applicable.

The surface effect selection table is a table representing a correspondence relation between the density value as a gloss control value indicating a surface effect and the type of the surface effect, and a correspondence relation between control information on a post-processor based on the configuration of the information processing system, clear toner plane image data used by the printer device 50, and clear toner plane image data used by the post-processor. The configuration of the information processing system differs in various ways.

In the first embodiment, the glosser 70, the normal fixing post-processing device 80, and the low-temperature fixing post-processing device 90 are connected, as the post-processors, to the printer device 50. Therefore, the control information on the post-processor based on the configuration of the information processing system is the on/off information indicating on or off of the glosser 70. The clear toner plane image data used by the post-processor include clear toner plane data used by the normal fixing post-processing device 80 and clear toner plane data used by the low-temperature fixing post-processing device 90.

FIG. 22 is a view illustrating an example of the data structure of the surface effect selection table. The surface effect selection table may be configured to represent a correspondence relation between the control information on the post-processor, first clear toner plane data used by the printer device 50, second clear toner plane data used by the normal fixing post-processing device 80, third clear toner plane data used by the low-temperature fixing post-processing device 90, the density value, and the type of the surface effect, for each information processing system having a different configuration.

In FIG. 22, a data structure corresponding to the configuration of the information processing system of the first embodiment is illustrated by way of example. In the correspondence relation between the type of the surface effect and the density value in FIG. 22, an individual type of a surface effect is associated with each range of the density values. Each of the types of the surface effect is associated with a percentage of the density (the density ratio) converted from a value (representative value) representing each of the ranges of the density values, for every 2% change in the density ratio. Specifically, the surface effect for applying gloss (the mirror-surface effect and the solid effect) is associated with a range of the density values ("212" to "255") with the density ratios of 84% or greater, and the surface effect for reducing gloss (the halftone matte and the delustered) is associated with a range of the density values ("1" to "43") with the density ratios of 16% or smaller. A surface effect, such as a texture or a background watermark, is associated with a range of the density values with the density ratios of 20% to 80%.

In particular, the mirror-surface glossy (PM: Premium Gross) is associated, as the surface effect, with the pixel values of "238" to "255" for example. Different types of the mirror-surface glossy are associated with three respective ranges of the pixel values of "238" to "242", the pixel values of "243" to "247", and the pixel values of "248" to "255".

The solid glossy (G: Gross) is associated with the pixel values of "212" to "232". Different types of the solid glossy are associated with four respective ranges of the pixel values of "212" to "216", the pixel values of "217" to "221", the pixel values of "222" to "227", and the pixel values of "228" to "232". The halftone matte (M: Matt) is associated with the pixel values of "23" to "43". Different types of the halftone matte are associated with four respective ranges of the pixel values of "23" to "28", the pixel values of "29" to "33", the pixel values of "34" to "38", and the pixel values of "39" to "43".

The delustered (PM: Premium Matt) is associated with the pixel values of "1" to "17". Different types of the delustered are associated with tree respective ranges of the pixel values of "1" to "7", the pixel values of "8" to "12", and the pixel values of "13" to "17".

The different types of the same surface effect are based on different equations that are applied to obtain clear toner plane image data used by the printer device 50 or by the low-temperature fixing post-processing device 90, but the operations of a printer main-body or the post-processor are the same. No surface effect is associated with the density value of "0".

In FIG. 22, the on/off information indicating on or off of the glosser 70, the first clear toner plane image data used by the printer device 50, the second clear toner plane data used by the normal fixing post-processing device 80, and the third clear toner plane data used by the low-temperature fixing post-processing device 90 are also indicated in association with the pixel values and the surface effects.

For example, when the surface effect is the mirror-surface glossy, it is indicated that the glosser 70 is to be turned on, the first clear toner plane image data used by the printer device 50 is an inverse mask, and there are no second clear toner plane data and third clear toner plane data respectively used by the normal fixing post-processing device 80 and the low-temperature fixing post-processing device 90. The inverse mask is obtained by, for example, Equation (1) described above.

When the density value is in the range from "228" to "232" and the surface effect is the solid glossy, it is indicated that the glosser 70 is to be turned off, the first clear toner plane image data used by the printer device 50 is the inverse mask 1, and there is no second clear toner plane image data used by the low-temperature fixing post-processing device 90.

In this case, the inverse mask 1 may be any inverse mask represented by one of Equation (1) to Equation (4). This is because, because the glosser 70 is off, the total adhesion amount of toners to be smoothed varies and the surface irregularity increases due to the mirror-surface glossy. Therefore, the solid glossy with the lower glossiness than that of the mirror-surface glossy can be obtained. When the surface effect is the halftone matte, it is indicated that the glosser 70 is to be turned off, the first clear toner plane image data used by the printer device 50 is halftone (halftone dot), and there are no second clear toner plane data and third clear toner plane data respectively used by the normal fixing post-processing device 80 and the low-temperature fixing post-processing device 90.

When the surface effect is the delustered, it is indicated that the glosser 70 can be turned on or off, there is no first clear toner plane data used by the printer device 50, there is no second clear toner plane data used by the normal fixing post-processing device 80, and the third clear toner plane data used by the low-temperature fixing post-processing device 90 is a solid mask. The solid mask is obtained by, for example, Equation (2) described above.

Referring back to FIG. 21, the clear processing 108 determines the surface effect associated with each pixel of the gloss-control plane data by referring to the surface effect selection table as described above, and also determines on or off of the glosser 70 and clear toner plane data to be used by each of the printer device 50, the normal fixing post-processing device 80, and the low-temperature fixing post-processing device 90. The clear processing 108 determines on or off of the glosser 70 for each page. As described above, the clear processing 108 appropriately generates and outputs the clear toner plane data according to the determination result, and outputs the on/off information on the glosser 70.

The si3 unit 109 integrates the CMYK 2-bit color plane data subjected to the halftone processing and the 2-bit clear toner plane data generated by the clear processing 108, and outputs the integrated image data to the MIC 40.

In some cases, the clear processing 108 may not generate at least one of the clear toner plane data used by the printer device 50, the clear toner plane data used by the normal fixing post-processing device 80, and the clear toner plane data used by the low-temperature fixing post-processing device 90. Therefore, when the si3 unit 109 integrates the clear toner plane data generated by the clear processing 108 and the clear processing 108 does not generate the clear toner plane data, the si3 unit 109 outputs the image data in which the CMYK 2-bit color plane data is integrated. Therefore, the DFE 30 outputs four to seven pieces of 2-bit image data to the MIC 40.

The si3 unit 109 also outputs the on/off information on the glosser 70, which is output by the clear processing 108, to the MIC 40.

The MIC 40 is connected to the DFE 30 and the printer device 50. The MIC 40 outputs device configuration information indicating the configuration of a device installed as the post-processor 75 to the DEF 30. The MIC 40 receives the color plane data and the clear toner plane data from the DFE 30, allocates each piece of the image data to a corresponding device, and controls the post-processor 75.

Figure 23:
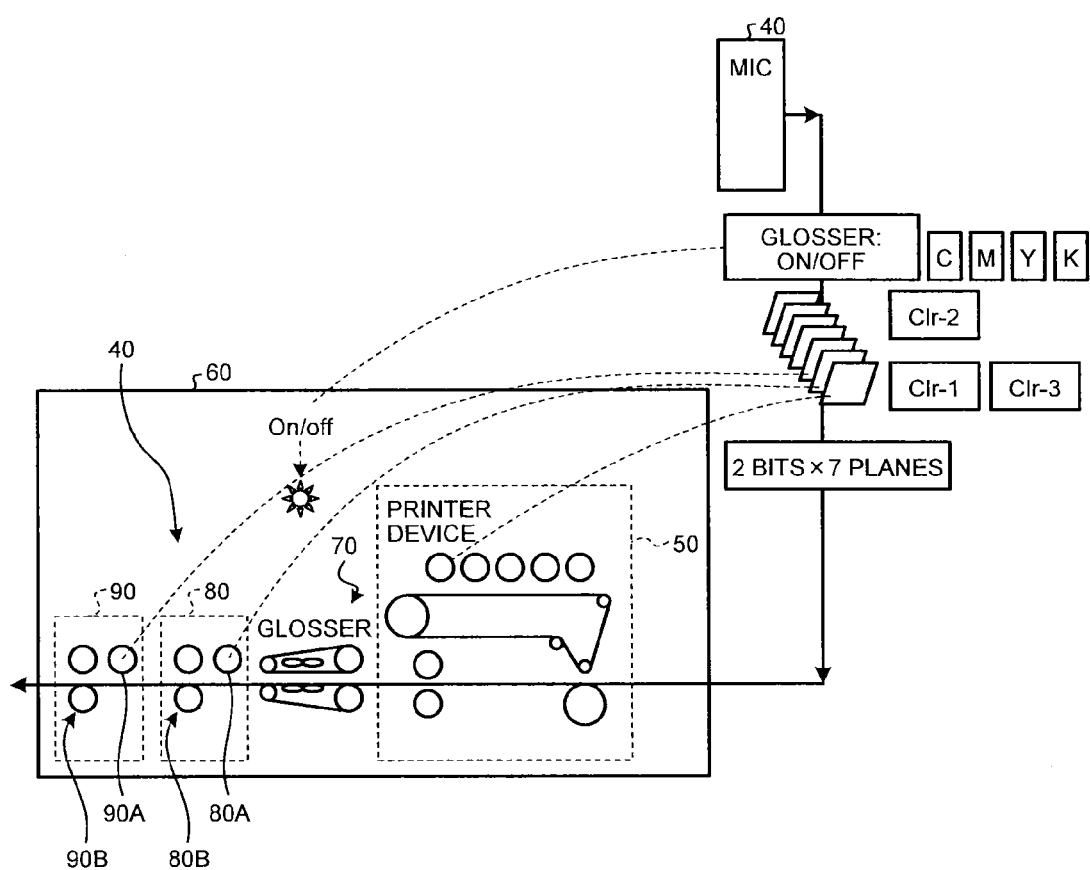
FIG. 23 is a schematic view illustrating a configuration of a printer.

Specifically, as illustrated by example in FIG. 23, the MIC 40 outputs the CMYK color plane data among the pieces of the image data output by the DFE 30 to the printer device 50. When there is clear toner plane data used by the printer device 50, the MIC 40 also outputs the clear toner plane data to the printer device 50, and turns on or off the glosser 70 according to the on/off information output by the DFE 30. When there is clear toner plane data used by the normal fixing post-processing device 80, the MIC 40 outputs the clear toner plane data to the normal fixing post-processing device 80. When there is clear toner plane data used by the low-temperature fixing post-processing device 90, the MIC 40 outputs the clear toner plane data to the low-temperature fixing post-processing device 90.

The glosser 70 may switch between a pathway in which fixing is performed and a pathway in which fixing is not performed, based on the on/off information. The normal fixing post-processing device 80 and the low-temperature fixing post-processing device 90 may switch between on and off based on presence or absence of the clear toner plane data or may switch between pathways similarly to the glosser 70.

As illustrated in FIG. 23, the printer device 50 includes a plurality of photoreceptors 51B of an electrophotographic system, a transfer belt 51C on which toner images formed on the photoreceptors 51B are transferred, a transfer device 51D that transfers the toner image formed on the transfer belt 51C onto a recording medium, and a fixing device 51A that fixes the toner image to the recording medium. The normal fixing post-processing device 80 includes a photoreceptor 80A of an electrophotographic system and a fixing device 80B that fixes a toner image transferred from the photoreceptor 80A to a recording medium. The low-temperature fixing post-processing device 90 includes a photoreceptor 90A of an electrophotographic system and a fixing device 90B that fixes a toner image transferred from the photoreceptor 90A to a recording medium. The recording medium is conveyed by a conveying member (not illustrated) so as to sequentially pass by the positions of the printer device 50, the normal fixing post-processing device 80, and the low-temperature fixing post-processing device 90 in this order. The above devices sequentially perform processes to form an image and apply a surface effect onto the recording medium.

The flow of a process performed by the DFE 30 according to the first embodiment will be explained below.

FIG. 24 is a flowchart illustrating the flow of the process performed by the DFE 30.

The DFE 30 receives image data from the host device 11 (Step S1). The rendering engine 101 interprets the language of the image data, converts the image data represented in the vector format into image data in the raster format, and converts a color space based on the RGB color model into a color space based on the CMYK color model to thereby obtain CMYK 8-bit color plane data, 8-bit gloss-control plane data, and 8-bit clear plane data (Step S2).

At Step S2, the rendering engine 101 converts gloss-control plane data in which a density value specifying a surface effect is assigned to each object into gloss-control plane data in which a density value is assigned to each pixel of the object.

When the priority information is assigned to the gloss-control plane data, the rendering engine 101 converts gloss-control plane data in which a density value specifying a surface effect is assigned to each object into gloss-control plane data in which a density value and the priority information are assigned to each pixel of the object.

FIG. 25 is a view illustrating an example of each pixel data of the gloss-control plane data with the priority information. Each pixel data contains the position coordinate of each pixel, the density value of each pixel, and the priority information. The priority information may be contained in a tag bit.

The tag bit will be briefly explained below with examples of gloss-control plane data and clear plane data. For example, it is assumed that a 1-bit gloss-control plane tag bit is separately provided for each 8-bit pixel of the gloss-control plane data such that pixels at which priority is given to the gloss-control plane data over the clear plane data are set to "1" and the other pixels are set to "0". With reference to each pixel of the gloss-control plane data, the clear plane data, and the gloss-control plane tag bit, priority is given to the gloss-control plane data when the gloss-control plane tag bit is "1" and priority is given to the clear plane data when the gloss-control plane tag bit is "0", so that a desired image can be obtained.

Referring back to FIG. 24, the TRC 103 of the DFE 30 performs gamma correction on the CMYK 8-bit color plane data using a gamma curve of 1D_LUT generated by calibration. The halftone engine 105 performs halftone processing to convert the color plane data subjected to the gamma correction into image data in a data format of CMYK 2-bit color plane data to be output to the printer 70, and obtains the CMYK 2-bit color plane data subjected to the halftone processing (Step S3).

The clear processing 108 of the DFE 30 determines a surface effect specified for each pixel of the gloss-control plane data by referring to the surface effect selection table according to the 8-bit gloss-control plane data. The clear processing 108 performs the determination on all pixels of the gloss-control plane data.

The gloss-control plane data basically represents the same range of density values at all pixels in an area to which each of the surface effects is applied. Therefore, the clear processing 108 determines that a neighboring pixel determined as having the same surface effect is contained in an area to which the same surface effect is to be applied. In this way, the clear processing 108 determines an area to which a surface effect is applied and the type of the surface effect applied to the area. Subsequently, the clear processing 108 determines on or off of the glosser 70 according to the above determination (Step S4).

The clear processing 108 of the DFE 30 appropriately generates 2-bit clear toner plane data for attaching a clear toner (Step S5) (details will be described later).

The si3 unit 109 of the DFE 30 integrates the CMYK 2-bit color plane data obtained by the halftone processing at Step S3 and the 2-bit clear toner plane data generated at Step S5, and outputs the integrated image data and the on/off information indicating on or off of the glosser 70 determined at Step S4 to the MIC 40 (Step S6).

Then, the routine is finished.

The clear toner plane generation process at Step S5 will be explained below.

Figure 26:
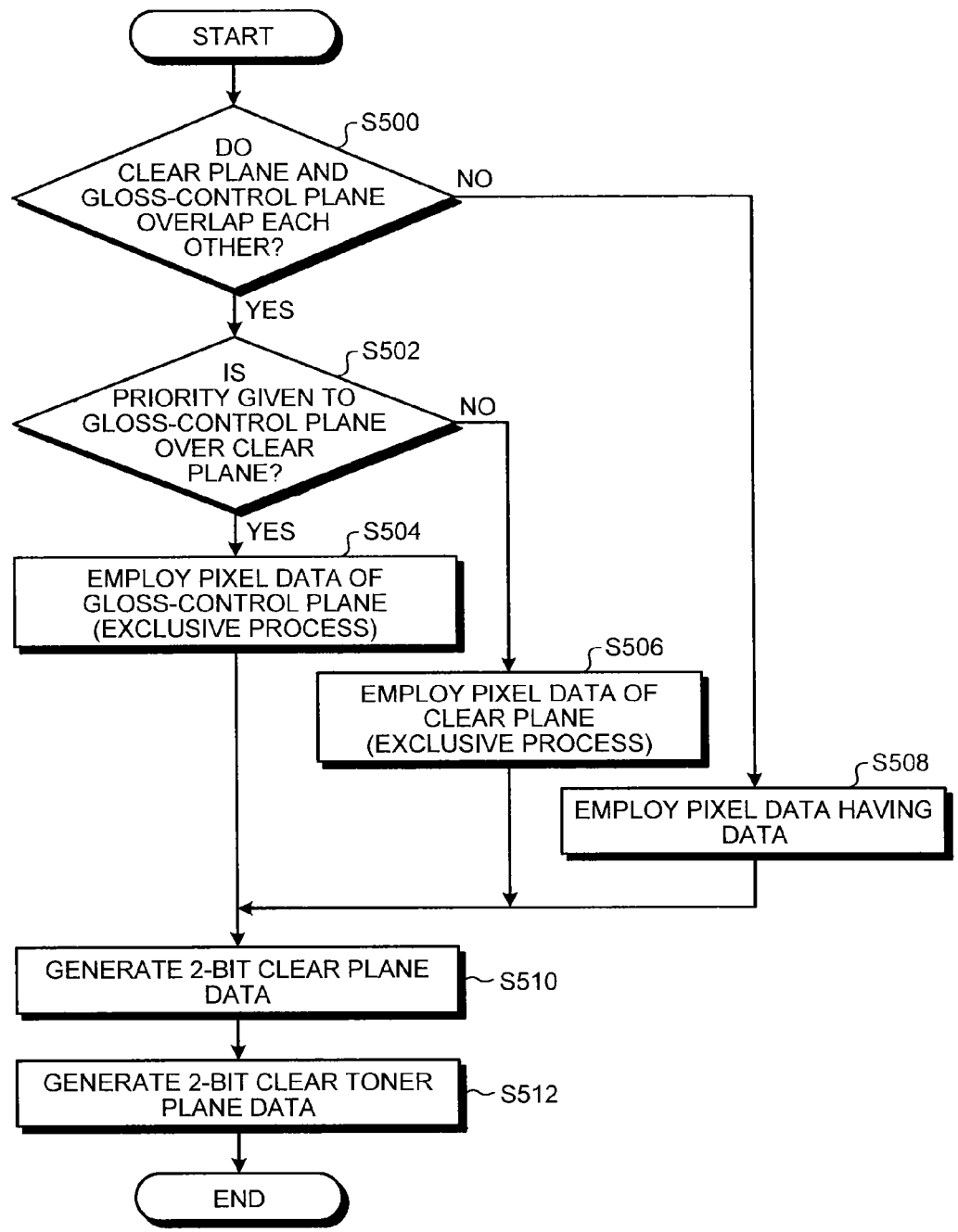
FIG. 26 is a flowchart illustrating the flow of a clear toner plane generation process.

FIG. 26 is a flowchart illustrating the flow of the clear toner plane generation process.

The clear toner plane generating unit 108A determines whether the clear plane data and the gloss-control plane data overlap each other for each pixel at the same pixel position on page-by-page basis (Step S500). At Step S500, the clear toner plane generating unit 108A determines whether a density value is set for each of a pixel of the clear plane data and a pixel of the gloss-control plane data at the same position, as a determination process at Step S500.

The clear toner plane generating unit 108A determines whether priority is given to the gloss-control plane data over the clear plane data for the pixel at the overlapping pixel position determined at Step S500 (Step S502). The clear toner plane generating unit 108A determines whether information indicating "priority" is contained as the priority information in the pixel data of the gloss-control plane data at the overlapping pixel position determined at Step S500, as a determination process at Step S502.

When it is determined that priority is given to the gloss-control plane data at Step S502 (Step S502: YES), the process goes to Step S504. At Step S504, the clear toner plane generating unit 108A employs pixel data at a corresponding pixel position of the gloss-control plane data as the pixel data at the overlapping pixel position determined at Step S500 through an exclusive process (Step S504). Then, the process goes to Step S510 to be described below.

On the other hand, when it is determined that priority is not given to the gloss-control plane data at Step S502 (Step S502: NO), the process goes to Step S506. At Step S506, the clear toner plane generating unit 108A employs pixel data at a corresponding pixel position of the clear plane data as the pixel data at the overlapping pixel position determined at Step S500 through an exclusive process (Step S506). Then, the process goes to Step S510 to be described below.

At Step S500, when it is determined that the clear plane data and the gloss-control plane data do not overlap each other (Step S500: NO), pixel data having a density value (greater than zero) from among the pixel data of the gloss-control plane data and the pixel data of the clear plane data is employed as the pixel data at the overlapping pixel position determined at Step S500 (Step S508). Then, the process goes to Step S510 as described below.

At Step S510, the clear toner plane generating unit 108A converts 8-bit pixel data formed of the pixel data at each pixel position employed through the process from Step S500 to Step S508 for attaching a clear toner into 2-bit pixel data, thereby generating 2-bit clear plane data (Step S510).

The clear toner plane generating unit 108A appropriately generates an inverse mask or a solid mask by using the plane data generated by the above exclusive processes and the CMYK 8-bit color plane data, thereby generating 2-bit clear toner plane data for attaching a clear toner (Step S512). Then, the routine is finished.

The MIC 40 outputs, to the printer device 50, the CMYK color plane data being image data output by the DFE 30, the clear toner plane data to be used by the printer device 50 for an area where the solid glossy is specified, and the clear toner plane data to be used by the printer device 50 for an area where the mirror-surface glossy is specified, and turns off the glosser 70 by using the on/off information output by the DFE 30. The MIC 40 also outputs, to the normal fixing post-processing device 80, the clear toner plane data to be used by the normal fixing post-processing device 80 for an area where a watermark text, a background pattern, a tactual pattern, or halftone matte is specified among the pieces of image data output by the DFE 30. The MIC 40 also outputs, to the low-temperature fixing post-processing device 90, the clear toner plane data to be used by the low-temperature fixing post-processing device 90 for an area where delustered is specified among the pieces of the image data output by the DFE 30.

The printer device 50 forms an image by attaching the CMYK toners and the clear toner onto a recording medium based on the CMYK color plane data output by the MIC 40, the clear toner plane data for use by the printer device 50 for the area where the mirror-surface glossy is specified, and the clear toner plane data for use by the printer device 50 for the area where the solid glossy is specified.

The normal fixing post-processing device 80 forms a toner image of a corresponding area with the clear toner based on the clear toner plane data output by the MIC 40 for the area where a watermark text, a background pattern, a tactual pattern, or the like is specified. The normal fixing post-processing device 80 superimposes the clear toner image onto the recording medium and fixes the clear toner image to the recording medium by applying heat and pressure at low temperature.

The low-temperature fixing post-processing device 90 forms a toner image of a delustered area with the clear toner based on the clear toner plane data output by the MIC 40 for the area where the delustered is specified. The low-temperature fixing post-processing device 90 superimposes the clear toner image onto the recording medium and fixes the clear toner image to the recording medium by applying heat and pressure at low temperature.

As a result, the color toners and the clear toner adhere to the recording medium and an image is formed.

As described above, in the information processing apparatus 12 according to the first embodiment, the priority information assigning unit 200I provided in the host device 11 assigns, to the gloss-control plane data, the priority information indicating priority between the first area specified by the gloss-control plane data and the second area specified by the clear plane data in the overlapping area of the first area and the second area. The clear toner plane generating unit 108A generates clear toner plane data by using a density value of either the gloss-control plane data or the clear plane data having priority according to the priority information for the overlapping area, and by using a density value of either the gloss-control plane data or the clear plane data having the density value for an area other than the overlapping area.

Therefore, according to the first embodiment, it is possible to easily form a print image as desired by a user even when an area to which the clear toner is attached overlaps on a recording medium.

Second Embodiment

In the first embodiment, a case is explained that the display processing unit 15 is provided in the host device 11. However, the display processing unit 15 may be provided in the DFE 30.

Figure 27:
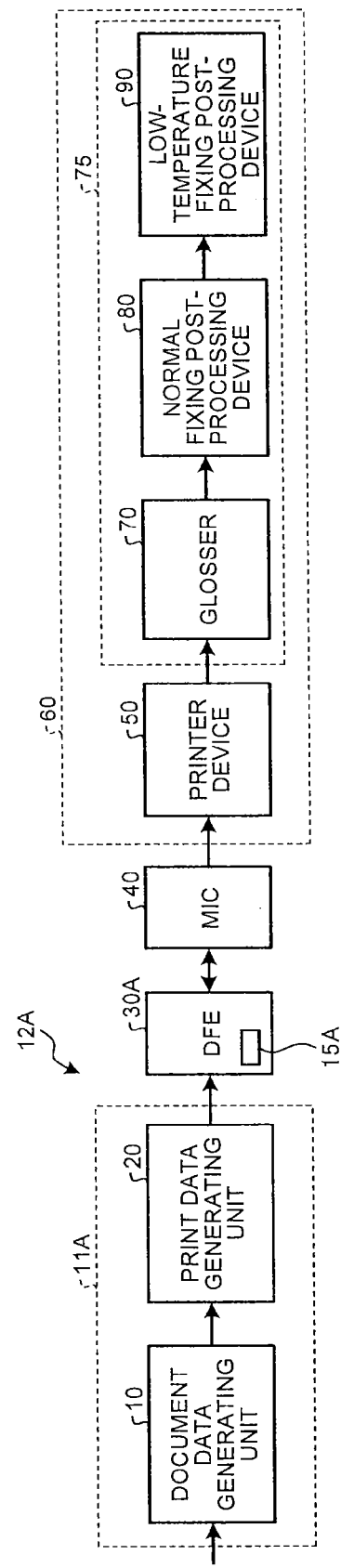
FIG. 27 is a block diagram schematically illustrating a configuration example of an information processing system.

FIG. 27 is a block diagram schematically illustrating a configuration example of an information processing system 100A according to a second embodiment. As illustrated in FIG. 27, the information processing system 100A includes an information processing apparatus 12A and the printing apparatus 60.

The information processing apparatus 12A includes a host device 11A, a printer controller (DFE: Digital Front End) 30A, and the MIC 40. The MIC 40 and the printing apparatus 60 are the same as those of the first embodiment.

The host device 11A includes the document data generating unit 10 and the print data generating unit 20. The host device 11A has the same configuration as that of the host device 11 of the first embodiment except that the host device 11A does not include the display processing unit 15.

The DFE 30A is substantially the same as the DFE 30 of the first embodiment except that the DFE 30A includes a display processing unit 15A corresponding to the display processing unit 15 explained in the first embodiment.

Figure 28:
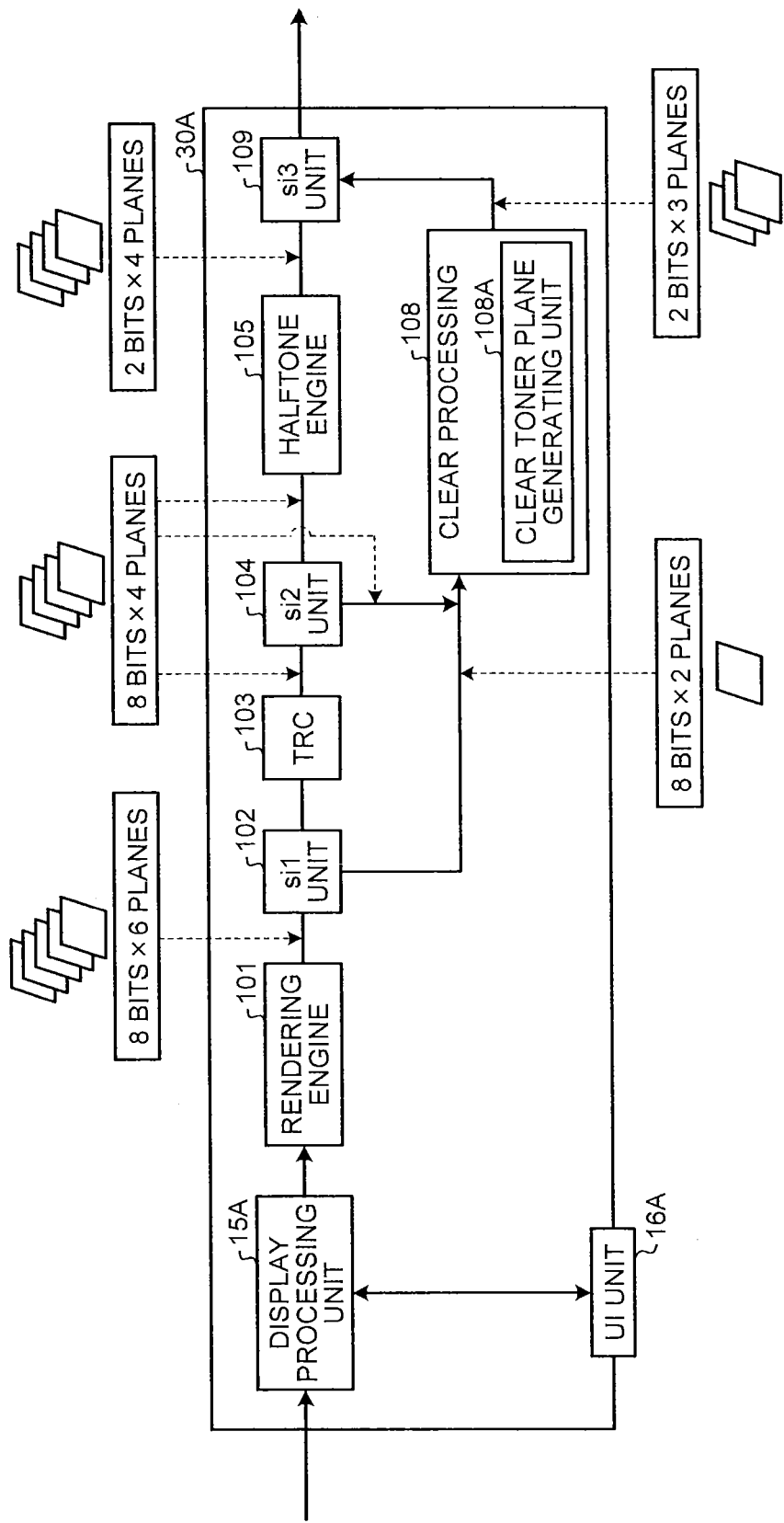
FIG. 28 is a schematic view illustrating a functional configuration of a DFE.

FIG. 28 is a schematic view illustrating a functional configuration of the DFE 30A according to the second embodiment.

As illustrated by example in FIG. 28, the DFE 30A includes the display processing unit 15A, an UI unit 16A, the rendering engine 101, the si1 unit 102, the TRC 103, the si2 unit 104, the halftone engine 105, the clear processing 108, the si3 unit 109, and the surface effect selection table (not illustrated).

The rendering engine 101, the si1 unit 102, the TRC 103, the si2 unit 104, the halftone engine 105, the clear processing 108, the si3 unit 109, and the surface effect selection table are the same as those of the first embodiment.

Figure 29:
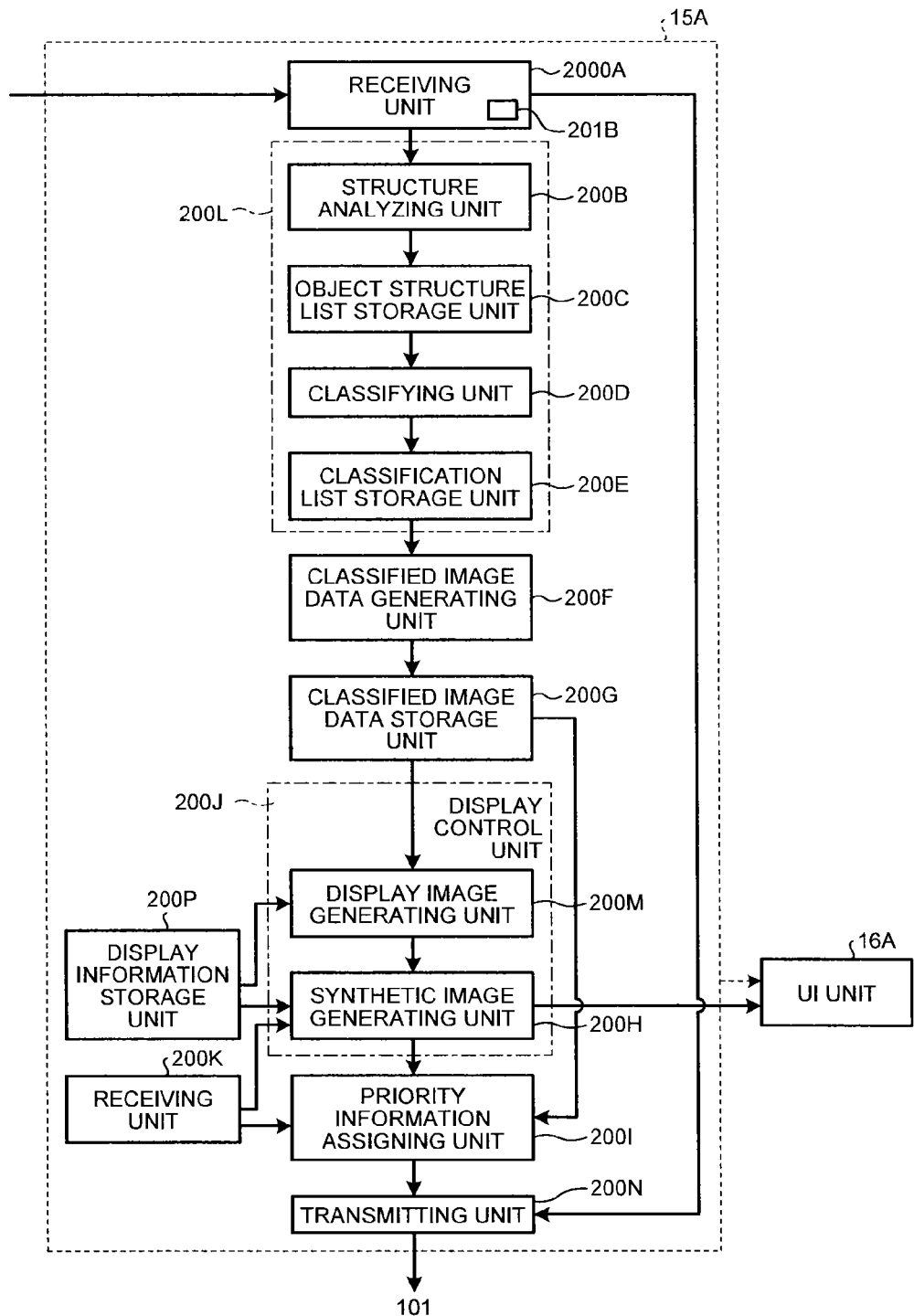
FIG. 29 is a functional block diagram of a display processing unit.

FIG. 29 is a functional block diagram of the display processing unit 15A and the UI unit 16A.

The display processing unit 15A has the same configuration as that of the display processing unit 15 of the first embodiment except that the display processing unit 15A includes a receiving unit 2000A instead of the document data receiving unit 200A, includes the UI unit 16A instead of the display unit 99D, and further includes a transmitting unit 200N connected to the priority information assigning unit 200I.

The UI unit 16A displays and receives various types of information. The UI unit 16A may have the functions of both of the operating unit 99B and the display unit 99D of the first embodiment.

The receiving unit 2000A receives print data from the host device 11A, and outputs gloss-control plane data, clear plane data, and color plane data contained in the print data to the analyzing unit 200L. The transmitting unit 200N outputs information (e.g., clear plane data, color plane data, and JDF) other than the gloss-control plane data to which the priority information is assigned by the priority information assigning unit 200I and the gloss-control plane data received by the receiving unit 2000A to the rendering engine 101.

In the second embodiment, the display processing unit 15A displays and inputs various types of information via the UI unit 16A.

As described above, the DFE 30A may include the display processing unit 15A.

With the above configuration according to the second embodiment, the DFE 30A can set the priority information.

It may be possible to provide the display processing unit 15A in both of the host device 11A and the DFE 30A.

Third Embodiment

In a third embodiment, a case will be explained that the clear processing of the DFE 30 sets information on the order of priority.

Figure 30:
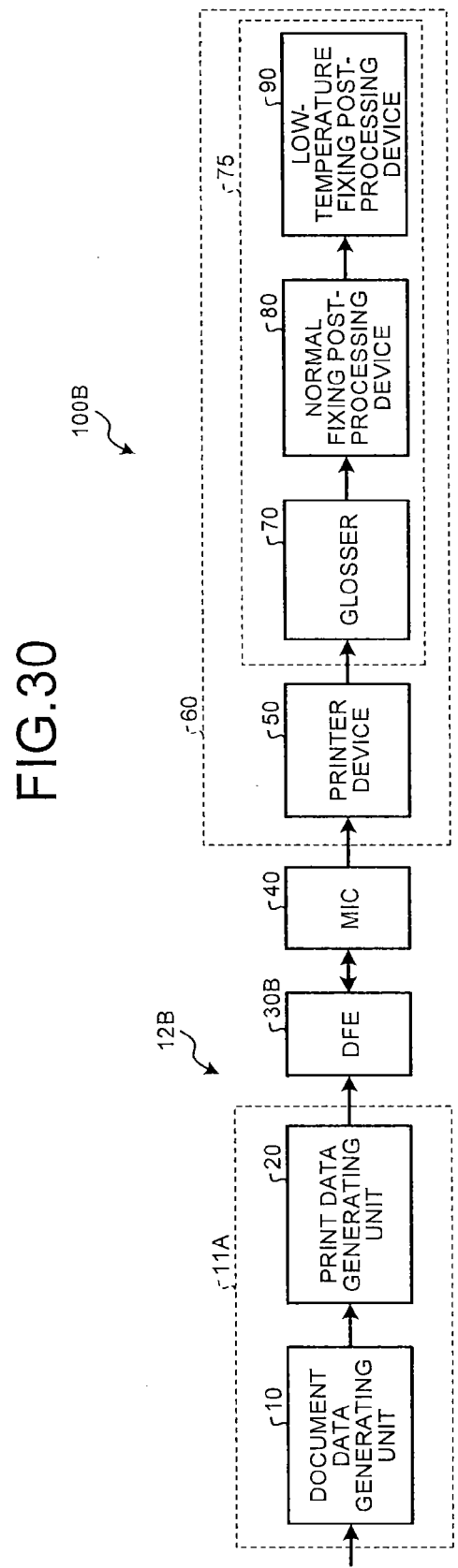
FIG. 30 is a block diagram schematically illustrating a configuration example of an information processing system.

FIG. 30 is a block diagram schematically illustrating a configuration example of an information processing system 100B according to the third embodiment. As illustrated in FIG. 30, the information processing system 100B includes an information processing apparatus 12B and the printing apparatus 60.

The information processing apparatus 12B includes the host device 11A, a printer controller (DFE: Digital Front End) 30B, and the MIC 40. The MIC 40 and the printing apparatus 60 are the same as those of the first embodiment. The host device 11A is the same as that of the second embodiment.

Figure 31:
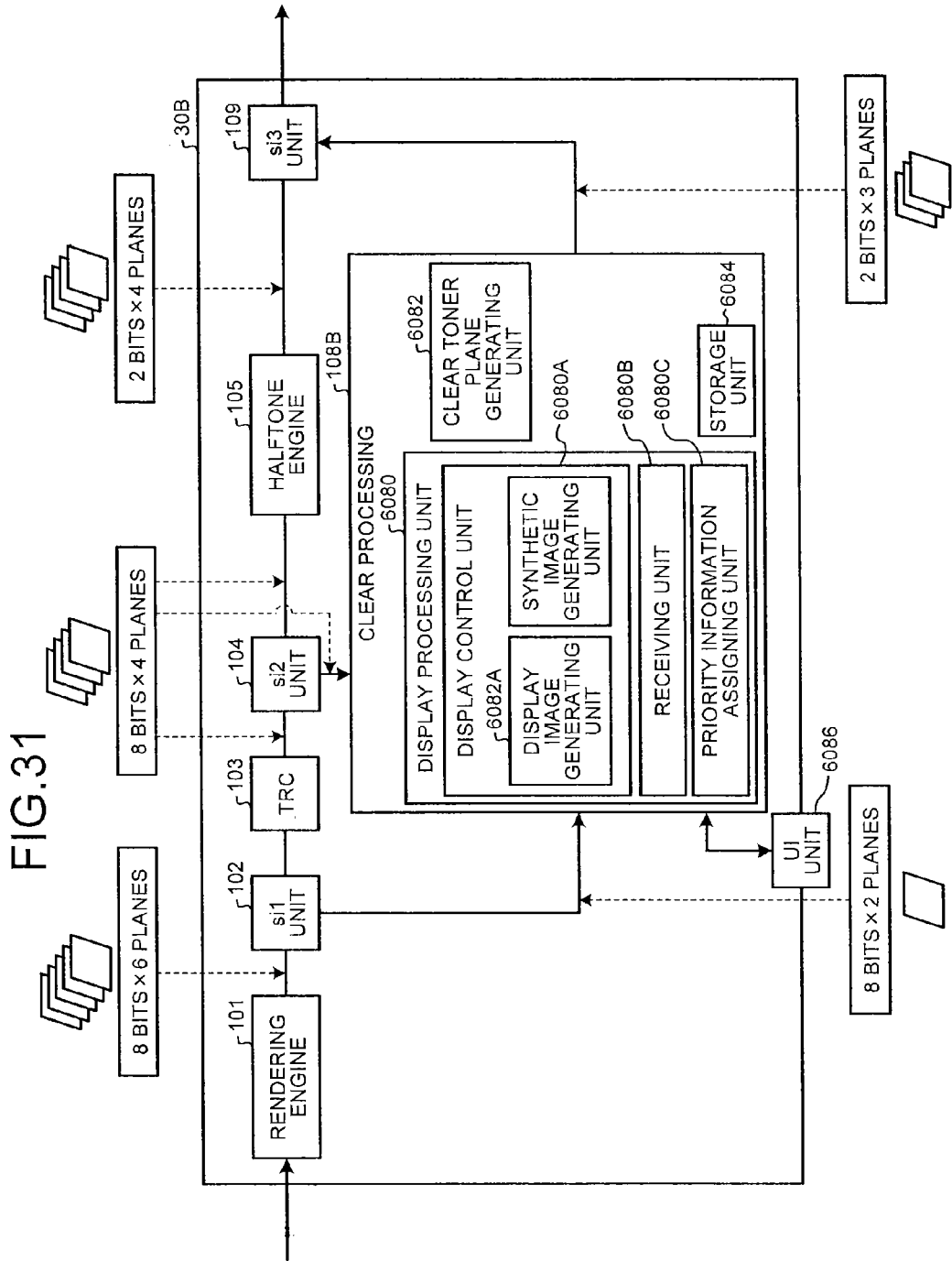
FIG. 31 is a schematic view illustrating a functional configuration of a DFE.

FIG. 31 is a schematic view illustrating a functional configuration of the DFE 30B according to the third embodiment.

As illustrated by example in FIG. 31, the DFE 30B includes a UI unit 6086, the rendering engine 101, the si1 unit 102, the TRC 103, the si2 unit 104, the halftone engine 105, a clear processing 108B, the si3 unit 109, and the surface effect selection table (not illustrated). The UI unit 6086 is the same as the UI unit 16A of the second embodiment.

The DFE 30B is the same as the DFE 30 of the first embodiment except that the DFE 30B includes the clear processing 108B instead of the clear processing 108.

The clear processing 108B determines a surface effect corresponding to the density value (the pixel value) of each pixel of the gloss-control plane data by referring to the surface effect selection table according to the gloss-control plane data, and determines on or off of the glosser 70 according to the above determination.

The clear processing 108B includes a display processing unit 6080, a storage unit 6084, and a clear toner plane generating unit 6082. The clear toner plane generating unit 6082 is the same as the clear toner plane generating unit 108A of the first embodiment except that the clear toner plane generating unit 6082 uses gloss-control plane data with the priority information received from the display processing unit 6080.

The storage unit 6084 stores therein various types of data. The display processing unit 6080 includes a display control unit 6080A, a receiving unit 6080B, and a priority information assigning unit 6080C.

The display control unit 6080A includes a display image generating unit 6082A and a synthetic image generating unit 6084A. The display image generating unit 6082A generates a display image to be displayed by the UI unit 6086 based on the 8-bit gloss-control plane data and the 8-bit clear plane data received by the clear processing 108B, and displays the display image on the UI unit 6086. The display image generating unit 6082A generates the second clear plane data and the second gloss-control plane data by converting the color of an area where the clear toner is attached into a display color, such as light blue or blue, to generate the display image similarly to the display image generating unit 200M of the first embodiment.

The synthetic image generating unit 6084A displays a synthetic image, in which the color plane data, the second clear plane data, and the second gloss-control plane data are synthesized, on the UI unit 6086 similarly to the synthetic image generating unit 200H of the first embodiment.

Therefore, the UI unit 6086 displays the synthetic image as illustrated in FIG. 19 for example, similarly to the first embodiment.

The priority information assigning unit 6080C assigns the priority information received by the receiving unit 6080B via the UI unit 6086 to the gloss-control plane data, similarly to the priority information assigning unit 200I of the first embodiment. Specifically, pixel data at each pixel position of the gloss-control plane data is converted to pixel data containing the designated priority information so that the priority information can be assigned.

Therefore, each pixel data of the gloss-control plane data with the priority information has the data structure as illustrated in FIG. 25 as explained in the first embodiment. The priority information may be contained in a tag bit.

Referring back to FIG. 31, the clear toner plane generating unit 6082 of the clear processing 108B generates clear toner plane data based on the gloss-control plane data in which the priority information is assigned to each pixel by the display processing unit 6080 and based on the clear plane data and the color plane data that are received from the si1 unit 102 and the si2 unit 104.

Figure 32:
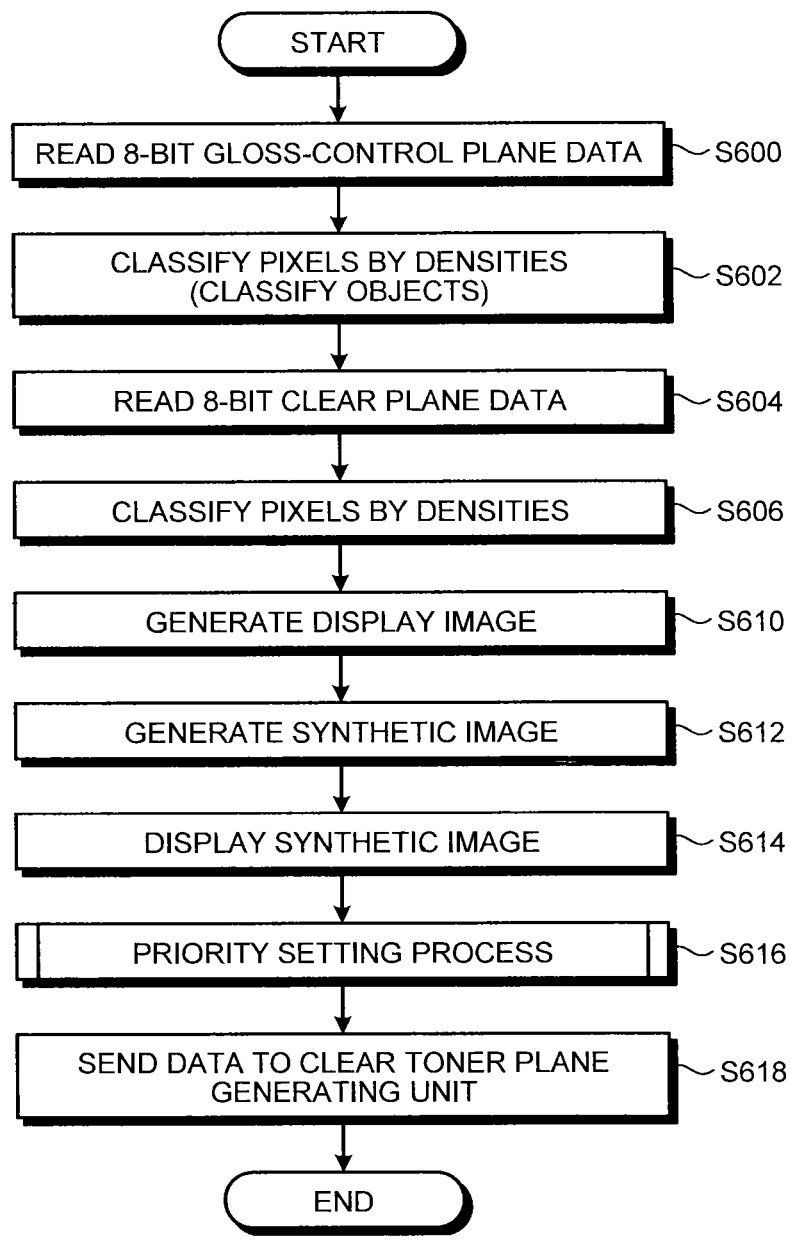
FIG. 32 is a flowchart illustrating the flow of a priority information assigning process.

A priority information assigning process performed by the display processing unit 6080 will be explained below. FIG. 32 is a flowchart illustrating the flow of the priority information assigning process performed by the display processing unit 6080.

The display processing unit 6080 reads the 8-bit gloss-control plane data received from the si1 unit 102 (Step S600).

The display image generating unit 6082A classifies pixels of the read 8-bit gloss-control plane data according to the same density, to thereby classify objects of the gloss-control plane data according to the same type of the surface effect specified for each of the objects (Step S602).

The display processing unit 6080 reads the 8-bit clear plane data received from the si1 unit 102 (Step S604).

The display image generating unit 6082A classifies pixels of the read 8-bit clear plane data by the densities, to thereby classify objects (transparent images) of the clear plane data by the types of the surface effect specified for the objects (Step S606).

The display image generating unit 6082A generates the second clear plane data and the second gloss-control plane data by converting the color of each of areas (objects) classified at Step S602 and Step S606 into a display color, such as light blue or blue, set in advance as a display color corresponding to each density value, to generate the display image similarly to the display image generating unit 200M of the first embodiment (Step S610).

The synthetic image generating unit 6084A displays a synthetic image, in which the color plane data, the second clear plane data, and the second gloss-control plane data are synthesized, on the UI unit 6086, similarly to the synthetic image generating unit 200H of the first embodiment (Step S612, Step S614).

The priority information assigning unit 6080C performs the priority setting process for assigning the priority information to the gloss-control plane data (Step S616). Therefore, the priority information is assigned to the pixel data of each of pixels of the gloss-control plane data (details will be described later).

The priority information assigning unit 6080C sends the gloss-control plane data with the priority information to the clear toner plane generating unit 6082 (Step S618), and the routine is finished.

Figure 33:
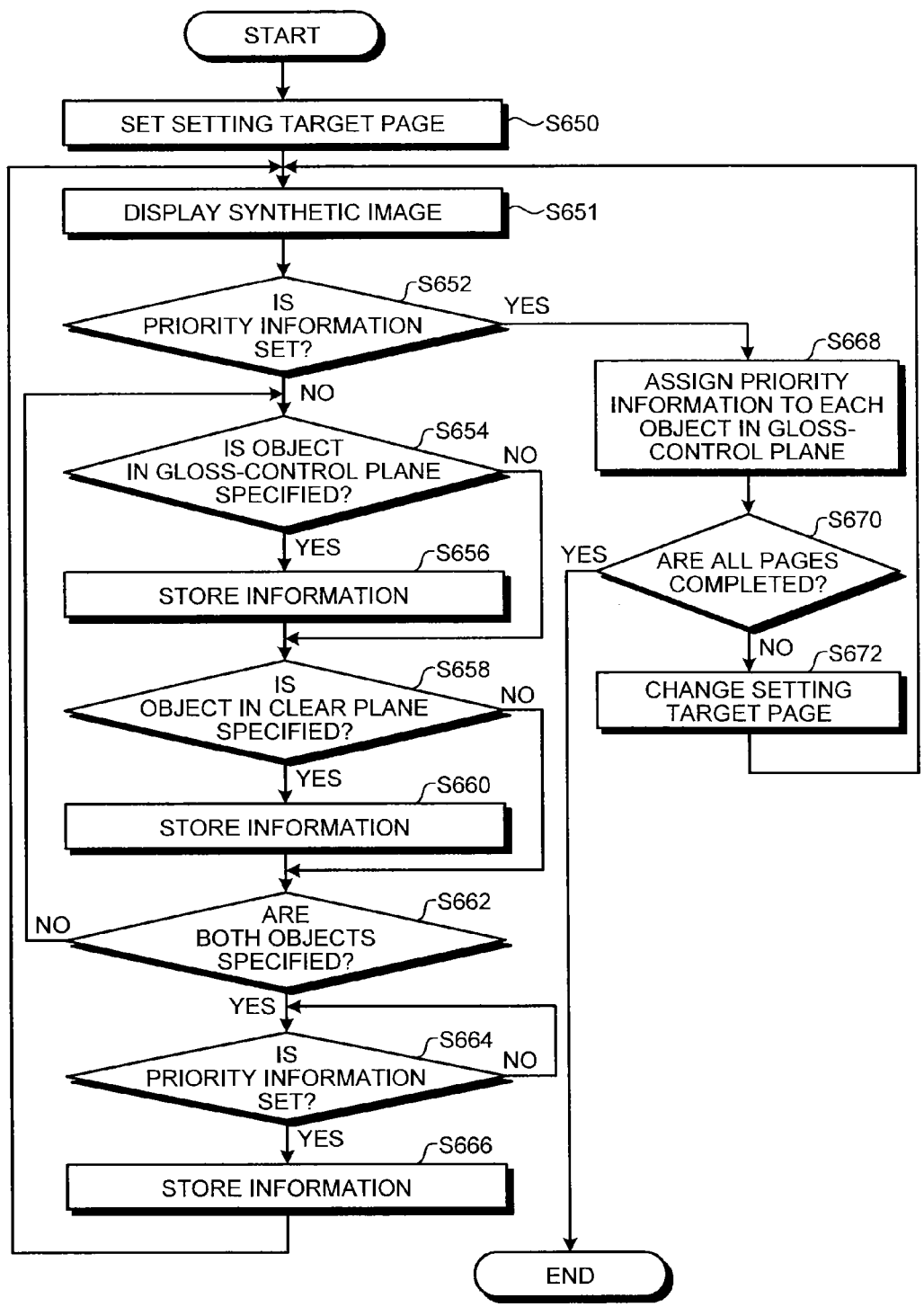
FIG. 33 is a flowchart illustrating the flow of a priority setting process.

The priority setting process at Step S616 will be explained in detail below. FIG. 33 is a flowchart illustrating the flow of the priority setting process.

The priority information assigning unit 6080C performs the priority setting process similarly to the priority information assigning unit 200I of the first embodiment.

Specifically, the priority information assigning unit 6080C displays the synthetic image received from the synthetic image generating unit 6084A on the UI unit 6086 (Step S651).

Therefore, similarly to the first embodiment, the synthetic image as illustrated in FIG. 19 is displayed on the UI unit 6086.

Referring back to FIG. 33, at Step S652, the priority information assigning unit 6080C determines whether the priority information is set for all of the objects (areas classified to have the same density value) contained in the setting target page of the gloss-control plane data (Step S652).

When it is determined that the priority information is not set for all of the objects at Step S652 (Step S652: NO), the priority information assigning unit 6080C determines whether at least one of the objects in the setting target page of the gloss-control plane data is specified (Step S654). When it is determined that at least one of the objects is specified at Step S654 (Step S654: YES), the process goes to Step S656. When it is determined that at least one of the objects is not specified at Step S654 (Step S654: NO), the process goes to Step S658.

At Step S656, the priority information assigning unit 6080C stores information indicating the pixel position of an area corresponding to the object that is specified in the setting target page of the gloss-control plane data at Step S654 in the memory (not illustrated) (Step S656).

The priority information assigning unit 6080C determines whether at least one of the objects (areas classified to have the same density values) in the setting target page of the clear plane data is specified (Step S658).

When it is determined that at least one of the objects is specified at Step S658 (Step S658: YES), the process goes to Step S660. When it is determined that at least one of the objects is not specified at Step S658 (Step S658: NO), the process goes to Step S662.

At Step S660, the priority information assigning unit 6080C stores information indicating the pixel position of an area corresponding to the object specified in the setting target page of the clear plane data at Step S658 in the memory (not illustrated) (Step S660).

The priority information assigning unit 6080C determines whether both of the object (area classified to have the same density value) of the gloss-control plane data and the object (area classified to have the same density value) of the clear plane data are already specified (Step S662).

When it is determined that not both of the objects are specified at Step S662, the process returns to Step S654. When it is determined that both of the objects are specified at Step S662, the process goes to Step S664.

At Step S664, it is determined whether the priority information, which indicates priority between areas (objects) in the overlapping area of the object (the first area) of the gloss-control plane data and the object (the second area) of the clear plane data specified through the process from Step S654 to Step S662, is specified (Step S664).

The priority information assigning unit 6080C continues to determine that the priority information is not specified (Step S664: NO) until it determines that the priority information is specified at Step S664 (Step S664: YES). When it is determined that the priority information is specified at Step S664 (Step S664: YES), the process goes to Step S666. Then, information indicating the object (the first area) of the gloss-control plane data specified at Step S654, information indicating the object (the second area) of the clear plane data specified at Step S658, and the priority information indicating whether priority is given (or not) to the second area over the first area in the memory (not illustrated) (Step S666), and the process returns to Step S651.

On the other hand, when it is determined that the priority information is set for all of the objects at Step S652 (Step S652: YES), the process goes to Step S668. At Step S668, the priority information assigning unit 6080C assigns the priority information to each of the objects (the first area or an area classified to have the same density) of the gloss-control plane data (Step S668).

Specifically, at Step S668, the priority information assigning unit 6080C assigns, as a tag bit for example, corresponding priority information (priority information indicating priority or non-priority) to the pixel data of each pixel of each area (the first area or the object) classified to have the same density in the setting target page of the gloss-control plane data, based on the information stored in the memory at Step S666. Therefore, the priority information indicating priority or non-priority with respect to an overlapping transparent image is assigned to each pixel of the setting target page of the gloss-control plane data.

The priority information assigning unit 6080C determines whether the priority information is assigned to all of the pages of the gloss-control plane data to determine whether the process is completed on all of the pages (Step S670). When it is determined that the process is not completed on all of the pages at Step S670 (Step S670: NO), the process goes to Step S672. At Step S672, a target page for which the priority information is to be set is changed to a page different from the previous target page (Step S672). Then, the process returns to Step S651. When it is determined that the process is completed on all of the pages at Step S670 (Step S670: YES), the routine is finished.

Through the process from Step S650 to Step S672, the priority information is assigned to each pixel of an object (the first area) contained in the gloss-control plane data.

The clear toner plane generation process performed by the clear toner plane generating unit 6082 of the third embodiment will be explained below. The clear toner plane generating unit 6082 performs the same process as performed by the clear toner plane generating unit 108A of the first embodiment (see FIG. 26) to generate clear toner plane data. The process of the third embodiment is different in that the clear toner plane generating unit 6082 generates the clear toner plane data by using the gloss-control plane data with the priority information received from the display processing unit 6080.

Figure 34:
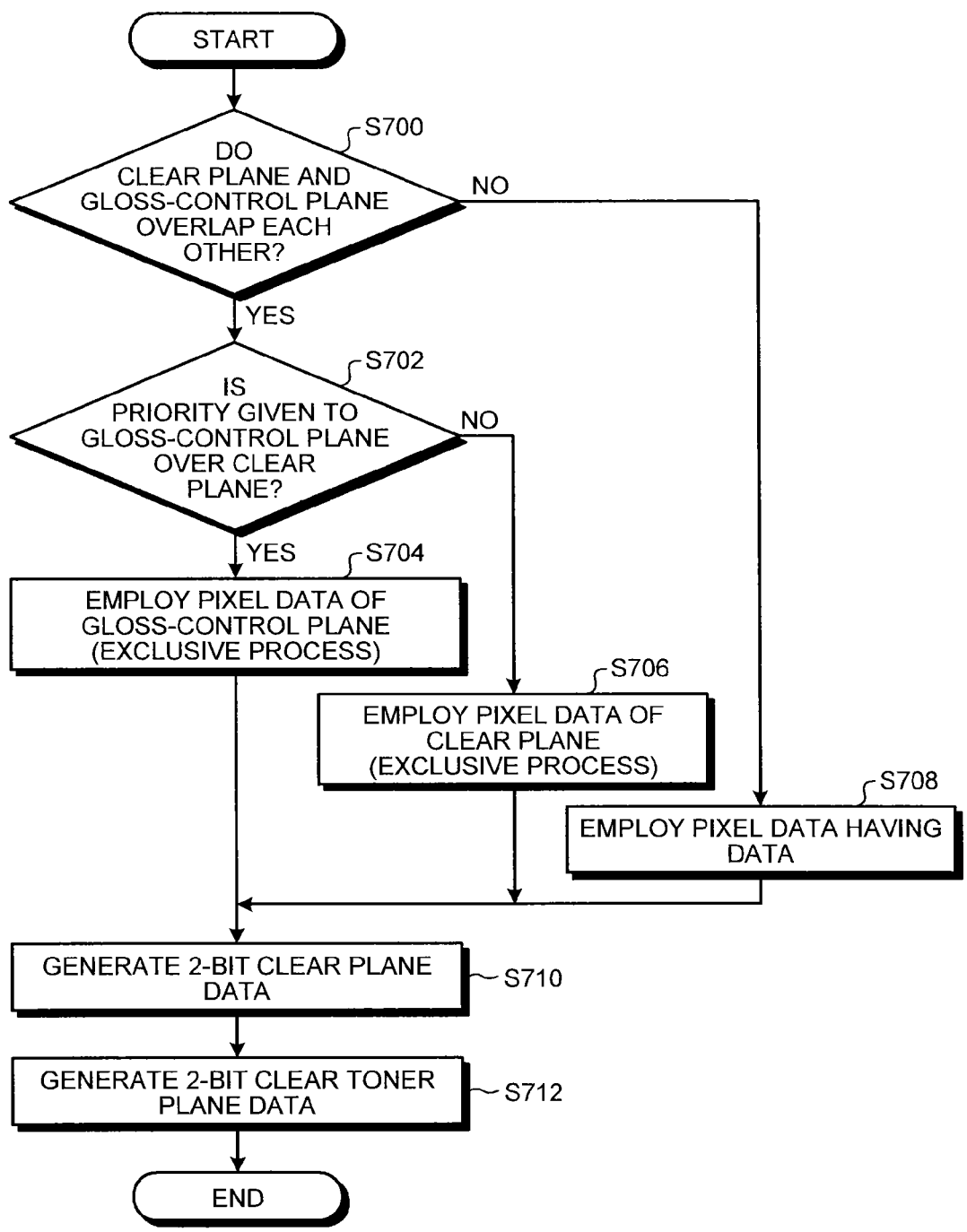
FIG. 34 is a flowchart illustrating the flow of a clear toner plane generation process.

FIG. 34 is a flowchart illustrating the flow of the clear toner plane generation process performed by the clear toner plane generating unit 6082 according to the third embodiment.

The clear toner plane generating unit 6082 determines whether the clear plane data and the gloss-control plane data overlap each other for each pixel at the same pixel position on page-by-page basis, similarly to the process at Step S500 (Step S700).

The clear toner plane generating unit 6082 determines whether priority is given to the gloss-control plane data over the clear plane data for the pixel at the overlapping pixel position determined at Step S700 (Step S702). The clear toner plane generating unit 6082 determines whether information indicating "priority" is contained as the priority information in the pixel data of the gloss-control plane data at the overlapping pixel position determined at Step S700, as a determination process at Step S702.

When it is determined that priority is given to the gloss-control plane data at Step S702 (Step S702: YES), the process goes to Step S704. At Step S704, the clear toner plane generating unit 6082 employs pixel data at a corresponding pixel position of the gloss-control plane data as the pixel data at the overlapping pixel position determined at Step S700 through an exclusive process (Step S704). Then, the process goes to Step S710 to be described below.

On the other hand, when it is determined that priority is not given to the gloss-control plane data at Step S702 (Step S702: NO), the process goes to Step S706. At Step S706, the clear toner plane generating unit 6082 employs pixel data at a corresponding pixel position of the clear plane data as the pixel data at the overlapping position determined at Step S700 through an exclusive process (Step S706). Then, the process goes to Step S710 to be described below.

At Step S700, when it is determined that the clear plane data and the gloss-control plane data do not overlap each other (Step S700: NO), pixel data having a density value (greater than zero) from among the pixel data of the gloss-control plane data and the pixel data of the clear plane data is employed as the pixel data at the overlapping pixel position determined at Step S700. Then, the process goes to Step S710 as described below.

At Step S710, the clear toner plane generating unit 6082 converts 8-bit pixel data formed of the pixel data at each pixel position employed through the process from Step S700 to Step S708 for attaching a clear toner into 2-bit pixel data, thereby generating 2-bit clear plane data (Step S710).

The clear toner plane generating unit 6082 appropriately generates an inverse mask or a solid mask by using the plane data generated by the above exclusive processes and the CMYK 8-bit color plane data, thereby generating 2-bit clear toner plane data for attaching a clear toner (Step S712). Then, the routine is finished.

Similarly to the first embodiment, the clear processing 108B appropriately causes the clear toner plane generating unit 6082 to generate clear toner plane data to be used by the printer device 50, clear plane data to be used by the normal fixing post-processing device 80, and the clear plane data to be used by the low-temperature fixing post-processing device 90, and outputs the pieces of the clear toner plane data and the on/off information indicating on or off of the glosser 70.

As described above, it may be possible to assign the priority information to the gloss-control plane data by the clear processing 108B of the DFE 30B.

Fourth Embodiment

In the first to third embodiments, the host device 11 or the host device 11B generates the document data. However, the present invention is not limited to the above embodiments.

Specifically, any of the processes performed by a single device may be performed one or more devices connected to the single device via a network.

For example, in an information processing system according to a fourth embodiment, a part of the functions of the host device is provided in a server device on a network.

Figure 35:
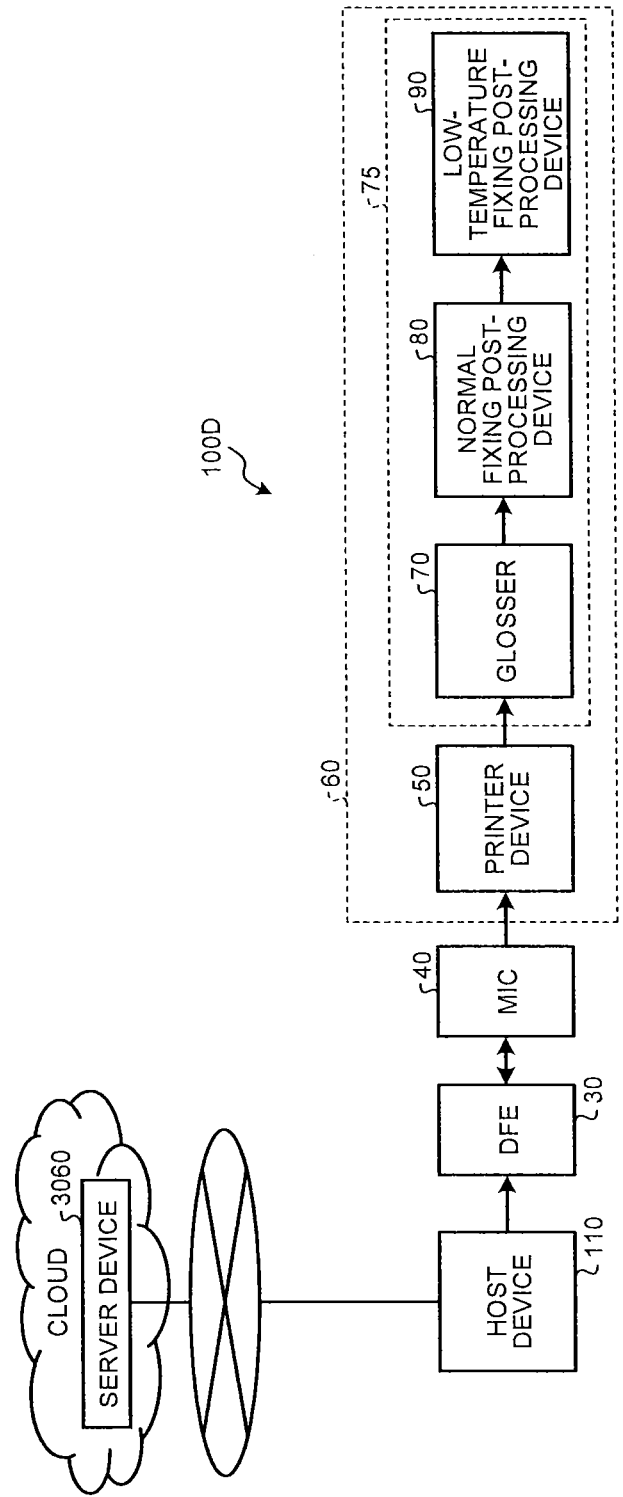
FIG. 35 is a view illustrating a configuration example of an information processing system.

FIG. 35 is a view illustrating a configuration example of the information processing system according to the fourth embodiment. As illustrated in FIG. 35, an information processing system 100D of the fourth embodiment includes the host device 110, the DFE 30, the MIC 40, and the printing apparatus 60.

In the fourth embodiment, the host device 110 is connected to a server device 3060 via a network (cloud), such as the Internet. In the fourth embodiment, the server device 3060 has the functions of the document data generating unit 10 of the host device 11 of the first embodiment.

The connection configuration of the host device 110, the DFE 30, the MIC 40, and the printing apparatus 60 is the same as the first embodiment.

Specifically, in the fourth embodiment, the host device 110 is connected to the single server device 3060 via the network (cloud), such as the Internet, and the server device 3060 has the functions of the document data generating unit 10 of the first embodiment and performs the document data generation process.

Figure 36:
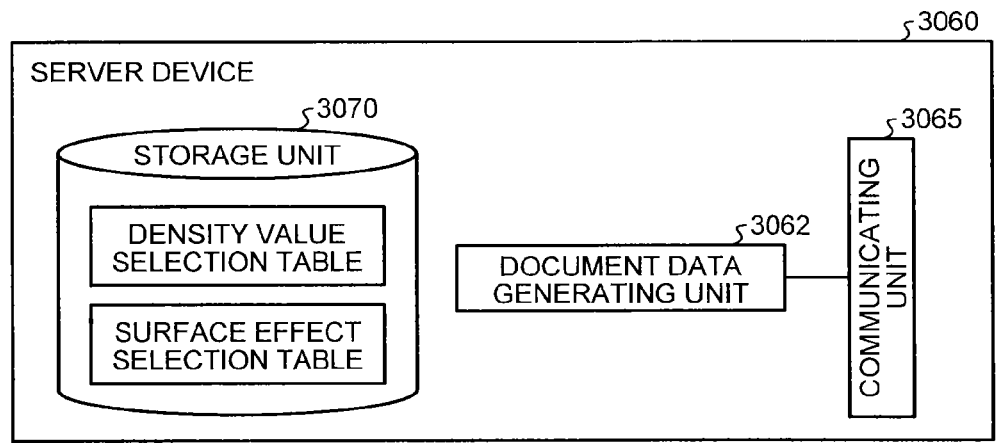
FIG. 36 is a block diagram illustrating a functional configuration of a server device.

The server device 3060 will be explained below. FIG. 36 is a block diagram illustrating a functional configuration of the server device 3060 according to the fourth embodiment. The server device 3060 mainly includes a storage unit 3070, a document data generating unit 3062, and a communicating unit 3065.

The storage unit 3070 is a storage medium, such as an HDD or a memory, and stores therein the density value selection table or the surface effect selection table.

The communicating unit 3065 transmits and receives various types of data and requests to and from the host device 110. Specifically, the communicating unit 3065 receives color plane data, gloss-control plane data with the priority information, and the like from the host device 110. The color plane data and the gloss-control plane data with the priority information are the same as those of the above embodiments. The communicating unit 3065 transmits generated document data to the host device 110.

The document data generating unit 3062 has the same functions as those of the document data generating unit 10 of the first embodiment, and receives, from an external apparatus via the communicating unit 3065, color plane data, designation information on a surface effect, designation information on a transparent image, a document data generation request, and gloss-control plane data with the priority information. The document data generating unit 3062 generates clear plane data and gloss-control plane data based on the designation information on the surface effect and the designation information on the transparent image thus received. The document data generating unit 3062 generates the clear plane data and the gloss-control plane data in the same manner as the document data generating unit 10. Thus, the document data generating unit 3062 generates the document data. When receiving the gloss-control plane data with the priority information from the host device 11, the document data generating unit 3062 generates document data containing the clear-toner gloss-control plane data with the priority information, the gloss-control plane data, and the color plane data, and transmits the document data to the host device 110.

The host device 110 will be explained below.

Figure 37:
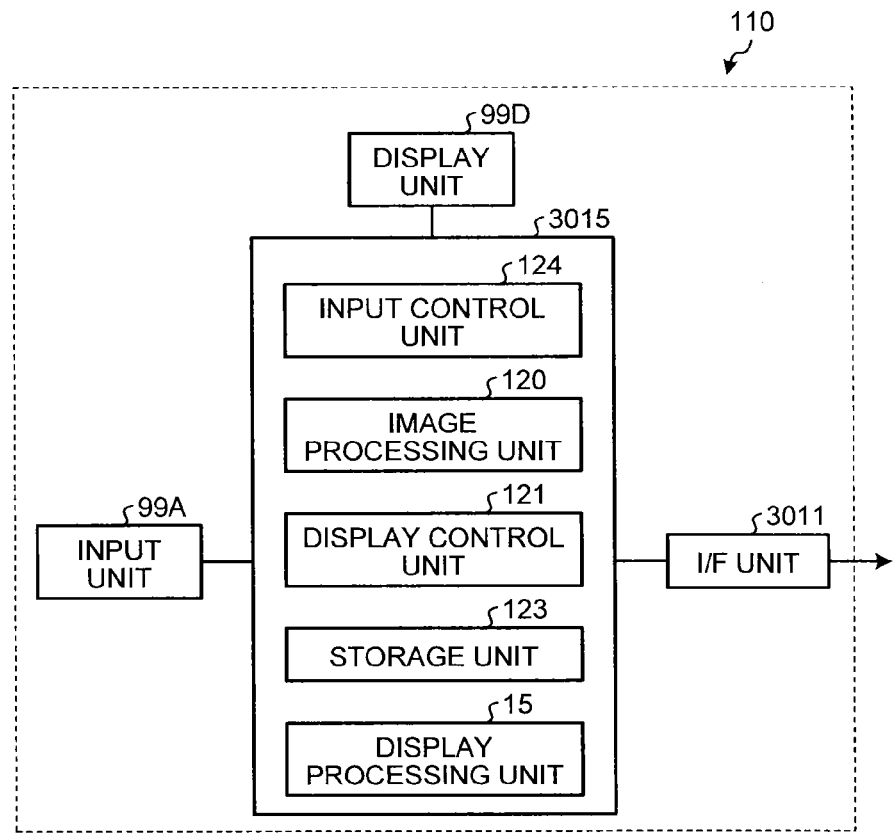
FIG. 37 is a functional block diagram of a host device.

FIG. 37 is a functional block diagram of the host device 110. The host device 110 includes the display unit 99D, the input unit 99A, a control unit 3015, and an I/F unit 3011. The control unit 3015 includes the input control unit 124, the image processing unit 120, the display control unit 121, the storage unit 123, and the display processing unit 15. The input control unit 124, the image processing unit 120, the display control unit 121, the storage unit 123, and the display processing unit 15 of the control unit 3015 are the same as those of the first embodiment.

The I/F unit 3011 transmits and receives various types of data to and from the DFE 30 and the server device 3060.

Figure 38:
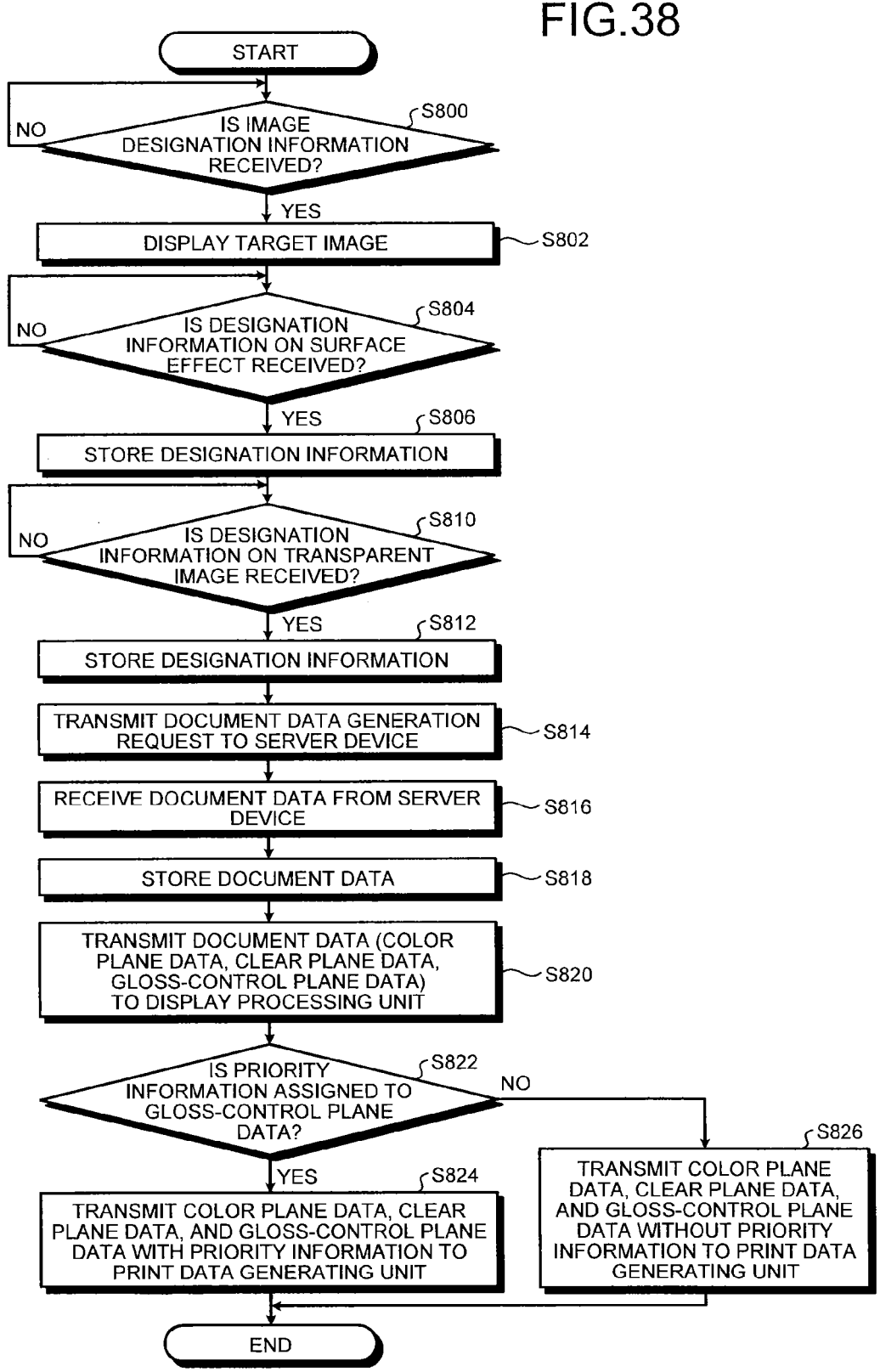
FIG. 38 is a flowchart illustrating the flow of a document data generation process.

FIG. 38 is a flowchart illustrating the flow of a document data generation process performed by the control unit 3015 of the host device 110. In the fourth embodiment, a case will be explained that both of the clear plane data and the gloss-control plane data are generated.

When the input control unit 124 receives image designation information (Step S800: YES), the display control unit 121 causes the display unit 99D to display an image specified by the image designation information (Step S802). When the input control unit 124 receives designation information on a surface effect (Step S804: YES), the designation information is stored in the storage unit 123 (Step S806).

When the input control unit 124 receives designation information on a transparent image (Step S810: YES), the plane data generating unit 122 stores the received designation information in the storage unit 123 (Step S812).

The control unit 3015 transmits, to the server device 3060, the designation information on the transparent image and the designation information on the surface effect that are stored in the storage unit 123 and transmits a document data generation request (Step S814).

The control unit 3015 receives the document data from the server device 3060 (Step S816). The control unit 3015 stores the document data received from the server device 3060 in the storage unit 123 (Step S818).

The display control unit 121 sends the document data stored in the storage unit 123 at Step S818 to the display processing unit 15 (Step S820). The display processing unit 15 generates gloss-control plane data to which the order of priority is assigned similarly to the first embodiment.

The control unit 3015 determines whether the order of priority is assigned to the gloss-control plane data through the process by the display processing unit 15 (Step S822). When it is determined that the order of priority is assigned at Step S822 (Step S822: YES), the process goes to Step S824.

At Step S824, the control unit 3015 transmits the document data containing the color plane data, the clear plane data, and the gloss-control plane data with the priority information generated by the display processing unit 15 to the print data generating unit 20 (Step S824). Then, the routine is finished.

On the other hand, when it is determined that the order of priority is not assigned at Step S822 (Step S822: NO), the process goes to Step S826. At Step S826, the control unit 3015 transmits the document data containing the color plane data, the clear plane data, and the gloss-control plane data without the priority information to the print data generating unit 20 (Step S826). Then, the routine is finished.

A process performed by the document data generating unit 3062 of a server device 4060 will be explained below.

Figure 39:
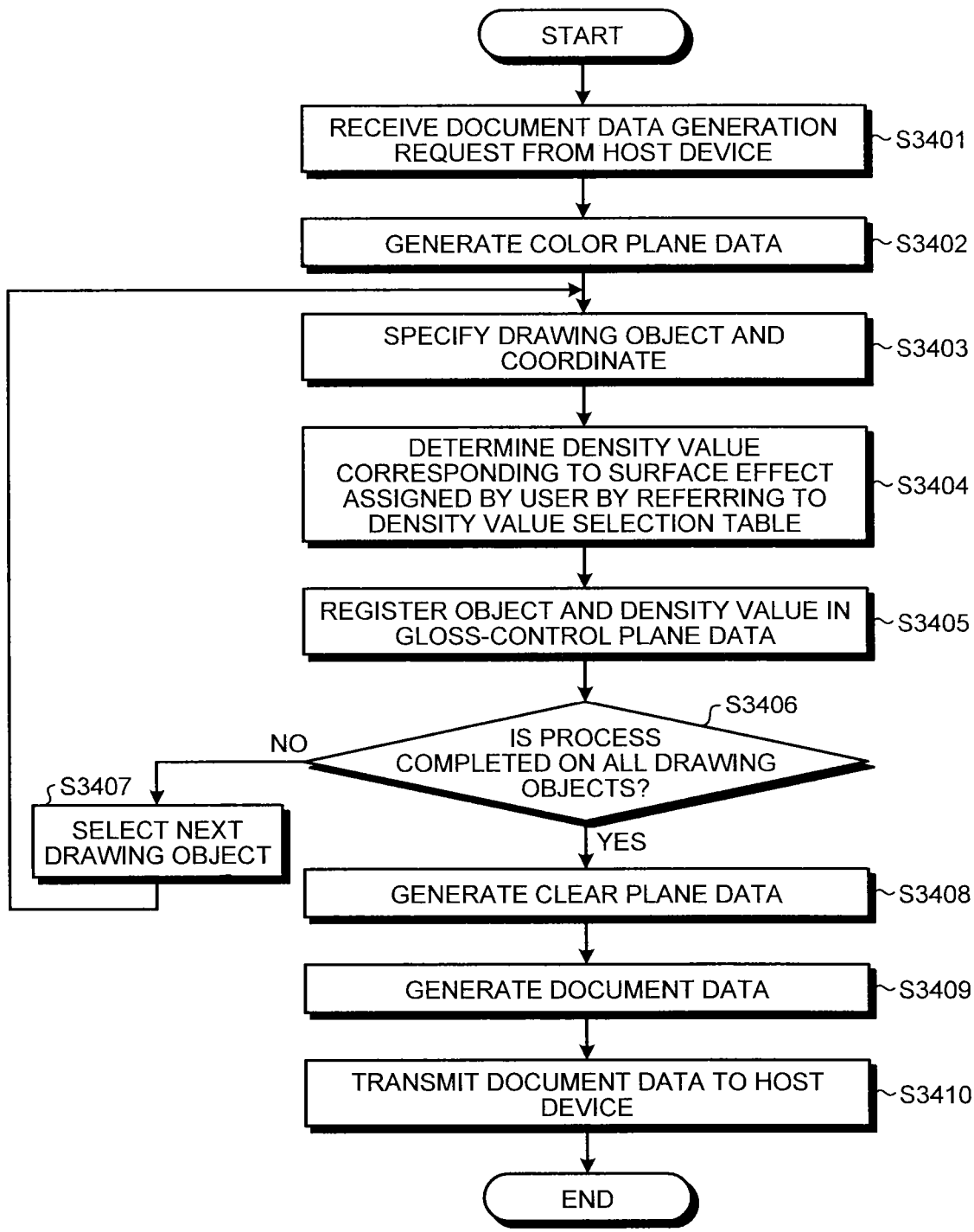
FIG. 39 is a flowchart illustrating the flow of a document data generation process performed by the server device.

FIG. 39 is a flowchart illustrating the flow of the document data generation process performed by the server device 3060 according to the fourth embodiment. When the communicating unit 3065 receives a document data generation request, the image destination information, and the destination information on a surface effect from the host device 110 (Step S3401), the document data generating unit 3062 generates color plane data based on the image designation information (Step S3402).

The document data generating unit 3062 specifies an object of a target image to which a surface effect is applied by the designation information on the surface effect and specifies a coordinate of the object by using a drawing command provided by an operating system or the like and a coordinate value set by the drawing command (Step S3403).

The document data generating unit 3062 determines a density value corresponding to the surface effect specified by the user by the designation information, with reference to the density value selection table stored in the storage unit 3070 (Step S3404).

The document data generating unit 3062 registers the object and the density value that is determined according to the surface effect in gloss-control plane data (initially, blank data) in an associated manner (Step S3405).

The document data generating unit 3062 determines whether the process from Step S3402 to Step S3404 is completed on all of objects of the color plane data (Step S3406). When the process is not completed, (Step S3406: NO), the document data generating unit 3062 selects an unprocessed next object from the color plane image data (Step S3407), and repeats the process from Step S3403 to Step S3405.

At Step S3406, when it is determined that the process from Step S3403 to Step S3405 is completed on all of the objects of the color plane image data (Step S3406: YES), the gloss-control plane data generation process is finished.

The document data generating unit 3062 generates clear plane data based on a transparent image designated in the designation information (Step S3408).

The document data generating unit 3062 generates document data by integrating the color plane data, the gloss-control plane data, and the clear plane data (Step S3409). The document data generating unit 3062 transmits the generated document data to the host device 110 (Step S3410). Then, the routine is finished.

The other configurations are the same as those of the first embodiment.

As described above, according to the fourth embodiment, the document data is generated by a server device 300 on the cloud system. Therefore, in addition to the advantageous effects of the first embodiment, it is possible to collectively generate document data even when a plurality of host devices 3010 and 110 are provided. Consequently, it is possible to improve the convenience of administrators.

In the fourth embodiment, the document data generating unit 3062 is provided on the single server device 3060 on the cloud system. However, the present invention is not limited to this example.

Figure 40:
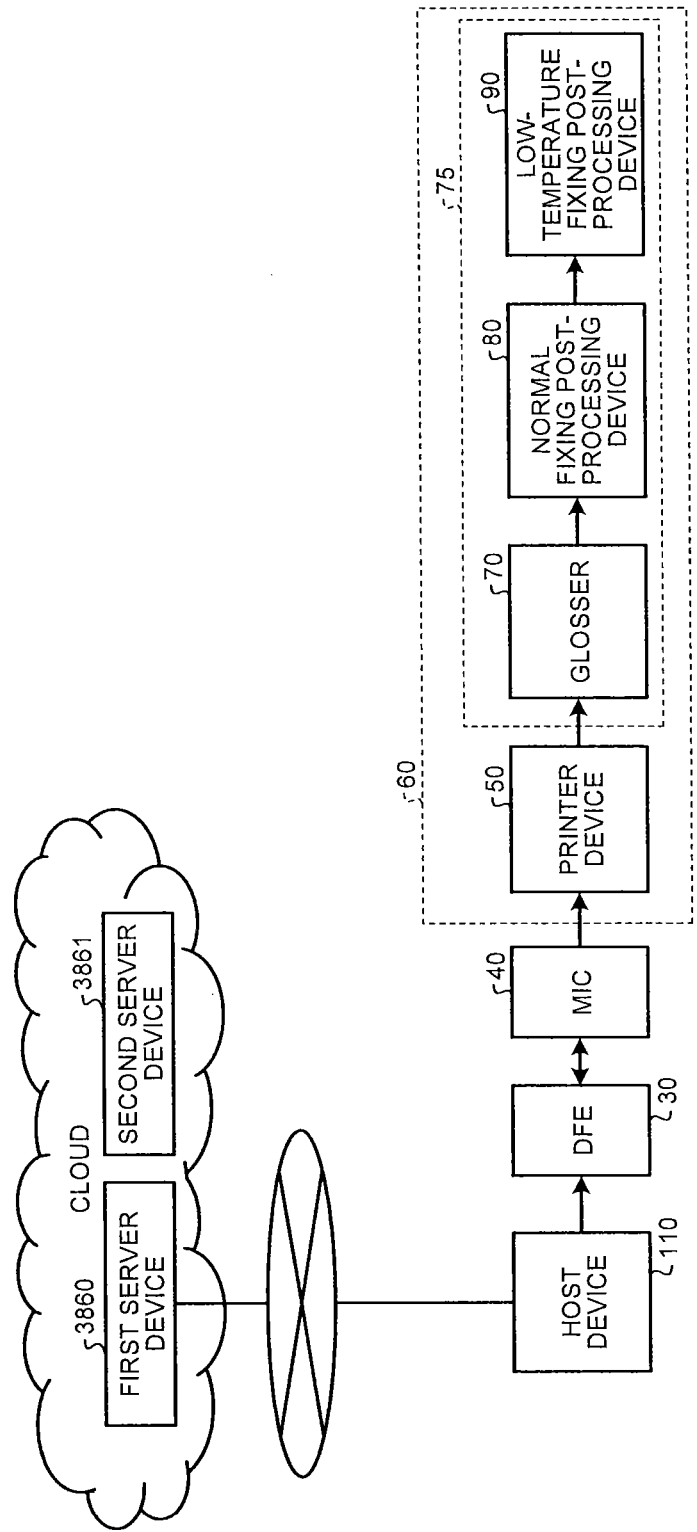
FIG. 40 is a network configuration diagram when two servers are provided on a cloud system.

For example, it may be possible to provide two or more server devices on the cloud system and cause the two or more server devices to perform the above processes in a distributed manner. FIG. 40 is a network configuration diagram when two servers (a first server device 3860 and a second server device 3861) are provided on a cloud system. In the example in FIG. 40, the first server device 3860 and the second server device 3861 generate document data in a distributed manner.

The way to distribute the processes to each of the server devices is not limited to the above example, and the processes may be distributed in an arbitrary manner.

Specifically, if the host device 110 is provided with minimum components such as the input unit 99A, the input control unit 124, the image processing unit 120, the display control unit 121, and the display unit 99D, it is possible to arbitrarily cause a single server device on the cloud system to perform a part or the whole of the processes or to cause a plurality of server devices to perform the processes in a distributed manner.

In other words, as explained with the above example, it is possible to cause one or more devices connected to a single device via a network to perform any of the processes performed by the single device.

In the configuration where one or more devices connected to the single device via the network perform any of the processes, it is necessary to include a process for outputting data (information) generated through a process performed by the single device to the other devices, a process for causing the other devices to receive the data, and a process for inputting and outputting data between the other devices.

Specifically, when the number of the other devices is one, a process for inputting and outputting data between the single device and the single other device is included. When the number of the other devices is two or more, a process for inputting and outputting data between the single device and the other device or between the other devices such as the first other device and the second other device is included.

Furthermore, in the fourth embodiment, the server device 3060 or a plurality of server devices such as the first server device 3860 and the second server device 3861 are provided on the cloud system. However, the present invention is not limited to this example. For example, a plurality of server devices such as the server device 3060, the first server device 3860, and the second server device 3861 may be provided on any of networks, such as an intranet.

Figure 41:
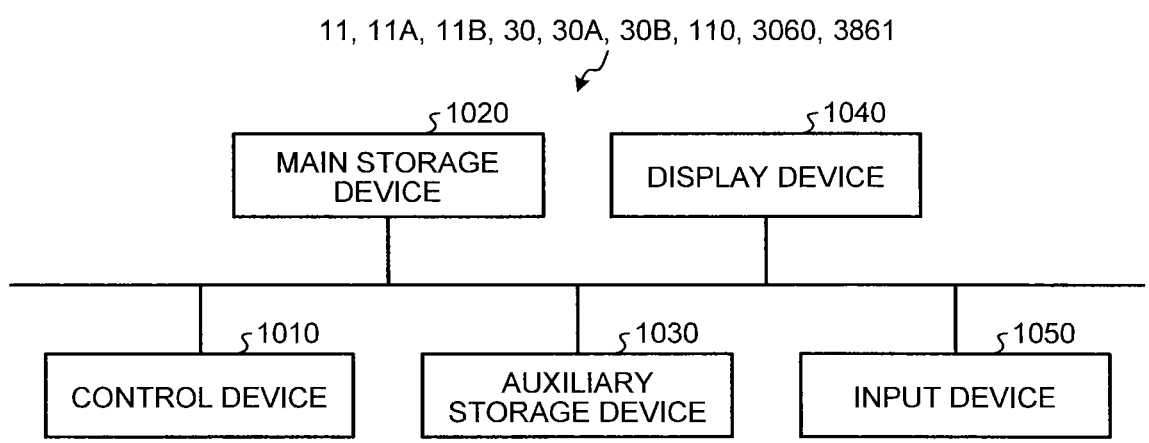
FIG. 41 is a hardware configuration diagram of the host devices and the server devices.

A hardware configuration of the host devices 11, 11A, 11B, and 110, the DFEs 30, 30A, and 30B, the server device 3060, the first server device 3860, and the second server device 3861 will be explained below. FIG. 41 is the hardware configuration diagram of the host devices 11, 11A, 11B, and 110, the DFEs 30, 30A, and 30B, the server device 3060, the first server device 3860, and the second server device 3861. Each of the host devices 11, 11A, 11B, and 110, the DFEs 30, 30A, and 30B, the server device 3060, the first server device 3860, and the second server device 3861 has a hardware configuration using a normal computer, and mainly includes a control device 1010, such as a CPU, for controlling the entire device, a main storage device 1020, such as a ROM or a RAM, for storing various types of data and programs, an auxiliary storage device 1030, such as an HDD, for storing various types of data and programs, an input device 1050, such as a keyboard or a mouse, and a display device 1040, such as a display.

A program executed by the host devices 11, 11A, 11B, and 110, the DFEs 30, 30A, and 30B, the server device 3060, the first server device 3860, and the second server device 3861 of the above embodiments is provided as a computer program product by being stored in a computer-readable recording medium, such as a CD-ROM, a flexible disk (FD), a CD-R, a DVD (Digital Versatile Disk), in a computer-installable or a computer-executable file format.

The program executed by the host devices 11, 11A, 11B, and 110, the DFEs 30, 30A, and 30B, the server device 3060, the first server device 3860, and the second server device 3861 of the above embodiments may be stored in a computer connected to a network, such as the Internet, and may be downloaded via the network. The program executed by the host devices 11, 11A, 11B, and 110, the DFEs 30, 30A, and 30B, the server device 3060, the first server device 3860, and the second server device 3861 of the above embodiments may be provided or distributed via a network, such as the Internet.

The image processing program executed by the host devices 11, 11A, 11B, and 110, the DFEs 30, 30A, and 30B, the server device 3060, the first server device 3860, and the second server device 3861 of the above embodiments may be provided by being stored in a ROM or the like in advance.

The program executed by the host devices 11, 11A, 11B, and 110, the DFEs 30, 30A, and 30B, the server device 3060, the first server device 3860, and the second server device 3861 of the above embodiments has a module structure including the above units. As actual hardware, a CPU (processor) reads the program from the storage medium and executes the program, so that the above units are loaded and generated on the main storage device.

In the above embodiments, the information processing system includes the host device 11, 11A, 11B, or 110, the DFE 30, 30A, or 30B, the MIC 40, the printer device 50, the glosser 70, the normal fixing post-processing device 80, and the low-temperature fixing post-processing device 90. However, the present invention is not limited to this example. For example, the DFE 30, 30A, or 30B, the MIC 40, the printer device 50 may be integrated into a single image forming apparatus. Alternatively, the image forming apparatus may include at least one of the glosser 70, the normal fixing post-processing device 80, and the low-temperature fixing post-processing device 90.

In the information processing system of the above embodiments, an image is formed by using toners of a plurality of colors, i.e., CMYK toners. However, it is possible to form an image by using a toner of a single color.

The printer system of the above embodiments includes the MIC 40. However, the present invention is not limited to this example. It may be possible to omit the MIC 40 by providing the processes and the functions implemented by the MIC 40 in the other device, such as the DFE 30.

According to the embodiments, it is possible to provide an information processing apparatus, an information processing system, an information processing method, and a program capable of easily forming a print image as desired by a user even when an area to which a clear toner is applied overlaps other area of the print image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus connected to a printing apparatus in which color toner and transparent clear toner are loaded, the printing apparatus forming an image on a recording medium based on color plane data for attaching the color toner to the recording medium and clear plane data for attaching the clear toner to the recording medium, the information processing apparatus comprising:

a priority information assigning unit configured to assign priority information indicating priority between each of first objects in a first area of the recording medium and a second object in a second area of the recording medium in an overlapping area of each of the first objects in the first area and the second object in the second area to at least one of gloss-control plane data and clear plane data, the priority information assigning unit storing the priority information in a table such that each of the first objects is associated with priority information, the priority information of one object of the first objects in the first area being different from the priority information of another object of the first objects in the first area, the gloss-control plane data being used for specifying each of the first objects in the first area to which a surface effect is to be applied and specifying a density value corresponding to a type of the surface effect, the clear plane data being used for specifying the second object in the second area in which a transparent image is to be formed and specifying a density value of the transparent image; and a clear toner plane generating unit configured to generate clear toner plane data based on the gloss-control plane data and the clear plane data so that data corresponding to the overlapping area is generated by using a density value of at least one of the first objects in the first area or the second object in the second area to which priority is given by the priority information and data corresponding to an area other than the overlapping area is generated by using a density value of at least one of the first objects in the first area or the second object in the second area in which the density value is specified.

2. The information processing apparatus according to claim 1, wherein the gloss-control plane data is used for specifying the density value corresponding to the surface effect and each of the first objects in the first area for each drawing area, the clear plane data is used for specifying the density value of the transparent image and the second object in the second area for each drawing area, and the priority information assigning unit assigns the priority information indicating priority between each of the first objects in the first area and the second object in the second area to at least one of the drawing area specified by the gloss-control plane data and the drawing area specified by the clear plane data in the overlapping area.

3. The information processing apparatus according to claim 1, wherein the gloss-control plane data is used for specifying the density value corresponding to the surface effect and each of the first objects in the first area for each pixel, the clear plane data is used for specifying the density value of the transparent image and the second object in the second area for each pixel, and the priority information assigning unit assigns the priority information indicating priority between each of the first objects in the first area and the second object in the second area to each pixel of at least one of the gloss-control plane data and the clear plane data in the overlapping area.

4. The information processing apparatus according to claim 1, further comprising:

a receiving unit configured to receive the priority information from a user, wherein the priority information assigning unit assigns the priority information received by the receiving unit to at least one of the clear plane data and the gloss-control plane data in the overlapping area.

5. The information processing apparatus according to claim 1, further comprising:

a preview image generating unit configured to generate a preview image of an estimated print result based on the clear plane data and the gloss-control plane data; and a display unit configured to display the preview image and an input screen for setting the priority information.

6. An information processing system comprising:

the information processing apparatus according to claim 1; and the printing apparatus.

7. An information processing method implemented by an information processing apparatus connected to a printing apparatus in which color toner and transparent clear toner are loaded, the printing apparatus forming an image on a recording medium based on color plane data for attaching the color toner to the recording medium and clear plane data for attaching the clear toner to the recording medium, the information processing method comprising:

assigning priority information indicating priority between each of first objects in a first area of a recording medium and a second object in a second area of the recording medium in an overlapping area of each of the first objects in the first area and the second object in the second area to at least one of gloss-control plane data and clear plane data, the assigning storing the priority information in a table such that each of the first objects is associated with priority information, the priority information of one object of the first objects in the first area being different from the priority information of another object of the first objects in the first area, the gloss-control plane data being used for specifying each of the first objects in the first area to which a surface effect is to be applied and specifying a density value corresponding to a type of the surface effect, the clear plane data being used for specifying the second object in the second area in which a transparent image is to be formed and specifying a density value of the transparent image; and generating clear toner plane data based on the gloss-control plane data and the clear plane data so that data corresponding to the overlapping area is generated by using a density value of at least one of the first objects in the first area or the second object in the second area to which priority is given by the priority information and data corresponding to an area other than the overlapping area is generated by using a density value of at least one of the first objects in the first area or the second object in the second area in which the density value is specified.

8. A non-transitory computer-readable storage medium with an executable program stored thereon and executed by a computer connected to a printing apparatus in which color toner and transparent clear toner are loaded, the printing apparatus forming an image on a recording medium based on color plane data for attaching the color toner to the recording medium and clear plane data for attaching the clear toner to the recording medium, wherein the program instructs the computer to perform:

assigning priority information indicating priority between each of first objects in a first area of a recording medium and a second object in a second area of the recording medium in an overlapping area of each of the first objects in the first area and the second object in the second area to at least one of gloss-control plane data and clear plane data, the assigning storing the priority information in a table such that each of the first objects is associated with priority information, the priority information of one object of the first objects in the first area being different from the priority information of another object of the first objects in the first area the gloss-control plane data being used for specifying each of the first objects in the first area to which a surface effect is to be applied and specifying a density value corresponding to a type of the surface effect, the clear plane data being used for specifying the second object in the second area in which a transparent image is to be formed and specifying a density value of the transparent image; and generating clear toner plane data based on the gloss-control plane data and the clear plane data so that data corresponding to the overlapping area is generated by using a density value of at least one of the first objects in the first area or the second object in the second area to which priority is given by the priority information and data corresponding to an area other than the overlapping area is generated by using a density value of at least one of the first objects in the first area or the second object in the second area in which the density value is specified.

9. The information processing apparatus according to claim 1, further comprising:

an image generating unit configured to generate an image illustrating the first objects in the first area of the recording medium and the second object in the second area of the recording medium; and a display unit configured to display the image and an input screen, the input screen being displayed only when there is an overlap between an object of the first objects and the second object, and the input screen including a check box that once checked designates priority to the object of the first objects.

* * * * *